(12) United States Patent
Tsurushita et al.

(10) Patent No.: US 12,492,231 B2
(45) Date of Patent: Dec. 9, 2025

(54) MULTIMERIC HYBRID Fc PROTEINS FOR REPLACEMENT OF IVIG

(71) Applicant: JN BIOSCIENCES LLC, Mountain View, CA (US)

(72) Inventors: Naoya Tsurushita, Mountain View, CA (US); J. Yun Tso, Mountain View, CA (US)

(73) Assignee: JN BIOSCIENCES LLC, Mountain View, CA (US)

( * ) Notice: Subject to any disclaimer, the term of this patent is extended or adjusted under 35 U.S.C. 154(b) by 1021 days.

(21) Appl. No.: 17/282,382

(22) PCT Filed: Nov. 12, 2019

(86) PCT No.: PCT/US2019/061020
§ 371 (c)(1),
(2) Date: Apr. 1, 2021

(87) PCT Pub. No.: WO2020/102251
PCT Pub. Date: May 22, 2020

(65) Prior Publication Data
US 2022/0002361 A1  Jan. 6, 2022

Related U.S. Application Data

(60) Provisional application No. 62/767,303, filed on Nov. 14, 2018.

(51) Int. Cl.
*A61K 39/395* (2006.01)
*C07K 14/47* (2006.01)
*A61K 38/00* (2006.01)

(52) U.S. Cl.
CPC ............. *C07K 14/47* (2013.01); *A61K 38/00* (2013.01)

(58) Field of Classification Search
None
See application file for complete search history.

(56) References Cited

U.S. PATENT DOCUMENTS

| | | | | |
|---|---|---|---|---|
| 7,217,797 B2 * | 5/2007 | Hinton | ............... | C07K 16/2866 435/69.6 |
| 7,217,798 B2 * | 5/2007 | Hinton | ............... | C07K 14/5437 435/69.6 |
| 7,361,740 B2 * | 4/2008 | Hinton | ................... | C07K 16/00 530/387.3 |
| 7,365,168 B2 * | 4/2008 | Hinton | ............... | C07K 16/2866 530/387.3 |
| 8,952,134 B2 * | 2/2015 | Tso | ........................ | C07K 19/00 530/389.7 |
| 9,382,319 B2 | 7/2016 | Tso et al. | | |
| 2005/0202538 A1 | 9/2005 | Gillies et al. | | |
| 2014/0294825 A1 | 10/2014 | Tso et al. | | |
| 2017/0137530 A1 | 5/2017 | Baehner et al. | | |

FOREIGN PATENT DOCUMENTS

| | | |
|---|---|---|
| CN | 104870055 A | 8/2015 |
| JP | 2015-501291 A | 1/2015 |
| JP | 2017-509335 A | 4/2017 |
| JP | 2017-512063 A | 5/2017 |
| WO | WO 2003/040311 A2 | 5/2003 |
| WO | WO 2011/073692 A1 | 6/2011 |
| WO | WO 2016/024021 A1 | 8/2016 |
| WO | WO 2017/129737 A1 | 8/2017 |
| WO | WO 2020/102251 A1 | 5/2020 |

OTHER PUBLICATIONS

Sorensen, et al., "Effect of th elgM and IgA Secretory Tailpices on Polymerization and Secretion of IgM and IgG1," The Journal of Immunology, vol. 156, No. 8, pp. 2858-2865, (Apr. 1996).
Anthony et al., "Identification of a receptor required for the anti-inflammatory activity of IVIG," PNAS, vol. 105, No. 50, pp. 19571-19578, (Dec. 2008).
Buckner et al., "Sweet SIGNs: IgG glycosylation leads the way in IVIG-mediated resolution of inflammation," International Immunology, vol. 29, No. 11, pp. 499-509, (Oct. 2017).
Crow et al., "The neonatal F receptor (FcRN) is not required for IVIg or anti-CD44 monoclonal antibody-mediated amelioration of murine immune thrombocytopenia," Blood, vol. 118, No. 24, (Dec. 2018).
Czajkowsky et al., "Developing the IVIG biomimetic, Hexa-Fc, for drug and vaccine applications," Scientific Reports, 5: 9526, DOI: 10.1038/srep09526, (Apr. 2015).
Kaneko et al., "Anti-Inflammatory Activity of Immunoglobulin G Resulting from Fc Sialylation," Science, vol. 313, pp. 670-673, (Aug. 2006).
Kiessling et al., "The FcRn inhibitor rozanolixizumab reduces human serum IgG concentration: A randomized phase 1 study," Science Translational Medicine, 9: eaan1208, (2017).
Mitrevski et al., "Immunomodulatory Effects of Intravenous Immunoglobulin—Assembling a Jigsaw Puzzle," International Trends in Immunity, vol. 2, No. 2, 67-73, (2014).
Nitschke "CD22 and Siglec-G regulate inhibition of B-cell signaling by sialic acid ligand binding and control B-cell tolerance," Glycobiology, 24:807-817, (2014).
Nixon et al., "Fully human monoclonal antibody inhibitors of the neonatal Fc receptor reduce circulating IgG in non-human primates," Frontiers in Immunology, 6: Article 176, (2015).
Patel et al., "Neonatal Fc Receptor Blockade by Fc Engineering Ameliorates Arthritis in a Murine Model," Journal of Immunology, 187:1015-1022, (2011).

(Continued)

*Primary Examiner* — Yunsoo Kim
(74) *Attorney, Agent, or Firm* — Alston & Bird LLP

(57) ABSTRACT

The hybrid Fc proteins of this invention include IgG and IgM Fc components. The IgG Fc component includes at least a portion of a hinge region and CH2 and CHS regions. The IgM component includes Cμ3 and Cμ4 regions of a Cμ constant region. The hybrid Fc proteins can form duplexes by interchain disulfide bonding between cysteines in their hinge regions. The hybrid Fc proteins can be used for treating immune disorders mediated by endogenous IgG, such as those previously treated with intravenous immunoglobulin.

11 Claims, 13 Drawing Sheets

Specification includes a Sequence Listing.

(56) References Cited

OTHER PUBLICATIONS

Rath et al, "Regulation of immune responses by the neonatal Fc receptor and its therapeutic implications," Frontiers in Immunology, 5: Article 664, (2015).

Rowley, et al., "Engineered hexavalnt Fc proteins with enhanced Fc-gamma recetor avidity provide insights into immune-complex interactions," Communications Biology, 1:146, pp. 1-12, (2018).

Seite et al., "Intravenous Immunoglobulin and B Cells," Arthritis and Rheumatology, 67:595-603, (2015).

Spirig et al., "rIgG1 Fc Hexamer Inhibits Antibody-Mediated Autoimmune Disease via Effects on Complement and FcgRs," Journal of Immunology, 200: 2542-2553, (2018).

Tam et al., "Correlations between pharmacokinetics of IgG antibodies in primates vs. FcRn-transgenic mice reveal a rodent model with predictive capabilities," mAbs, 5:397-405, (2013).

Ulrichts et al., "Neonatal Fc receptor antagonist efgartigimod safely and sustainably reduces IgGs in humans," Journal of Clinical Investigation, 128:4372-4386, (2018).

Washburn et al., "Controlled tetra-Fc sialylation of IVIg results in a drug candidate with consistent enhanced anti-inflammatory activity," Procedures of the National Academy of Science, U.S.A., 112:E1297-E1306, (2015).

WIPO Application No. PCT/US2019/061020, PCT International Preliminary Report on Patentability mailed May 18, 2021.

WIPO Application No. PCT/US2019/061020, PCT International Search Report and Written Opinion of the International Searching Authority mailed Feb. 27, 2020.

Sorensen et al., "Structural requirements for incorporation of J chain into human IgM and IgA," International Immunology, vol. 12, No. 1, pp. 19-27, (2000).

Sorensen, et al., "Effect of th eIgM and IgA Secretory Tailpices on Polymerization and Secretion of IgM and IgG1," The Journal of Immunology, vol. 156, No. 8, pp. 2858-2865, (Apr. 1996).

EP 19885952.2 Extended European Search Report mailed Jul. 11, 2022.

* cited by examiner

Figs. 9A, B
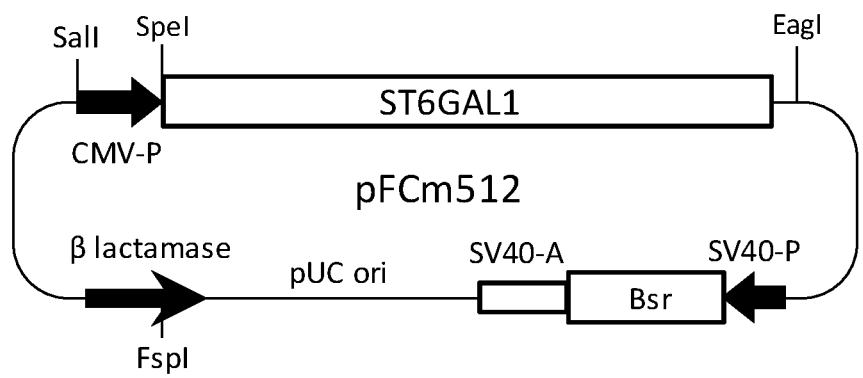
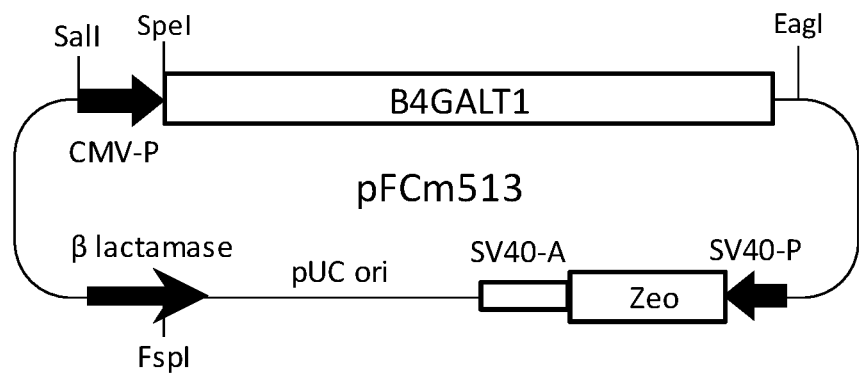

Fig. 10A

Human gamma-1 heavy chain constant region

CH1:ASTKGPSVFPLAPSSKSTSGGTAALGCLVKDYFPEPVTVSWNSGALTSGVHTFPAVLQSS
GLYSLSSVVTVPSSSLGTQTYICNVNHKPSNTKVDKKV

Hinge:EPKSCDKTHTCPPCP

CH2:APELLGGPSVFLFPPKPKDTLMISRTPEVTCVVVDVSHEDPEVKFNWYVDGVEVHNAKTK
PREEQYNSTYRVVSVLTVLHQDWLNGKEYKCKVSNKALPAPIEKTISKAK

CH3:GQPREPQVYTLPPSRDELTKNQVSLTCLVKGFYPSDIAVEWESNGQPENNYKTTPPVLDS
DGSFFLYSKLTVDKSRWQQGNVFSCSVMHEALHNHYTQKSLSLSPGK

Human gamma-2 heavy chain constant region

CH1:ASTKGPSVFPLAPCSRSTSESTAALGCLVKDYFPEPVTVSWNSGALTSGVHTFPAVLQSS
GLYSLSSVVTVPSSNFGTQTYTCNVDHKPSNTKVDKTV

Hinge:ERKCCVECPPCP

CH2:APPVAGPSVFLFPPKPKDTLMISRTPEVTCVVVDVSHEDPEVQFNWYVDGVEVHNAKTKP
REEQFNSTFRVVSVLTVVHQDWLNGKEYKCKVSNKGLPAPIEKTISKTK

CH3:GQPREPQVYTLPPSREEMTKNQVSLTCLVKGFYPSDIAVEWESNGQPENNYKTTPPMLDS
DGSFFLYSKLTVDKSRWQQGNVFSCSVMHEALHNHYTQKSLSLSPGK

Human gamma-3 heavy chain constant region

CH1:ASTKGPSVFPLAPCSRSTSGGTAALGCLVKDYFPEPVTVSWNSGALTSGVHTFPAVLQSS
GLYSLSSVVTVPSSSLGTQTYTCNVNHKPSNTKVDKRV

Hinge:ELKTPLGDTTHTCPRCPEPKSCDTPPPCPRCPEPKSCDTPPPCPRCPEPKSCDTPPPC
PRCP

CH2:APELLGGPSVFLFPPKPKDTLMISRTPEVTCVVVDVSHEDPEVQFKWYVDGVEVHNAKTK
PREEQYNSTFRVVSVLTVLHQDWLNGKEYKCKVSNKALPAPIEKTISKTK

CH3:GQPREPQVYTLPPSREEMTKNQVSLTCLVKGFYPSDIAVEWESSGQPENNYNTTPPMLDS
DGSFFLYSKLTVDKSRWQQGNIFSCSVMHEALHNRFTQKSLSLSPGK

Fig. 10B

Human gamma-4 heavy chain constant region

CH1:ASTKGPSVFPLAPCSRSTSESTAALGCLVKDYFPEPVTVSWNSGALTSGVHTFPAVLQSS
GLYSLSSVVTVPSSSLGTKTYTCNVDHKPSNTKVDKRV

Hinge:ESKYGPPCPSCP

CH2:APEFLGGPSVFLFPPKPKDTLMISRTPEVTCVVVDVSQEDPEVQFNWYVDGVEVHNAKTK
PREEQFNSTYRVVSVLTVLHQDWLNGKEYKCKVSNKGLPSSIEKTISKAK

CH3:GQPREPQVYTLPPSQEEMTKNQVSLTCLVKGFYPSDIAVEWESNGQPENNYKTTPPVLDS
DGSFFLYSRLTVDKSRWQEGNVFSCSVMHEALHNHYTQKSLSLSLGK

Human alpha-1 heavy chain constant region

CH1:ASPTSPKVFPLSLCSTQPDGNVVIACLVQGFFPQEPLSVTWSESGQGVTARNFPPSQDAS
GDLYTTSSQLTLPATQCLAGKSVTCHVKHYTNPSQDVTVPCP

CH2:VPSTPPTPSPSTPPTPSPSCCHPRLSLHRPALEDLLLGSEANLTCTLTGLRDASGVTFTW
TPSSGKSAVQGPPERDLCGCYSVSSVLPGCAEPWNHGKTFTCTAAYPESKTPLTATLSKS

CH3:GNTFRPEVHLLPPPSEELALNELVTLTCLARGFSPKDVLVRWLQGSQELPREKYLTWASR
QEPSQGTTTFAVTSILRVAAEDWKKGDTFSCMVGHEALPLAFTQKTIDRLAGKPTHVNVSVVMA
EVDGTCY

Human alpha-2 heavy chain constant region

CH1:ASPTSPKVFPLSLDSTPQDGNVVVACLVQGFFPQEPLSVTWSESGQNVTARNFPPSQDAS
GDLYTTSSQLTLPATQCPDGKSVTCHVKHYTNPSQDVTVPCP

CH2:VPPPPPCCHPRLSLHRPALEDLLLGSEANLTCTLTGLRDASGATFTWTPSSGKSAVQGPP
ERDLCGCYSVSSVLPGCAQPWNHGETFTCTAAHPELKTPLTANITKS

CH3:GNTFRPEVHLLPPPSEELALNELVTLTCLARGFSPKDVLVRWLQGSQELPREKYLTWASR
QEPSQGTTTFAVTSILRVAAEDWKKGDTFSCMVGHEALPLAFTQKTIDRLAGKPTHVNVSVVMA
EVDGTCY

Fig. 10C

Human mu heavy chain constant region

Cμ1: GSASAPTLFPLVSCENSPSDTSSVAVGCLAQDFLPDSITFSWKYKNNSDISSTRGFPSVL
RGGKYAATSQVLLPSKDVMQGTDEHVVCKVQHPNGNKEKNVPLP

Cμ2: VIAELPPKVSVFVPPRDGFFGNPRKSKLICQATGFSPRQIQVSWLREGKQVGSGVTTDQV
QAEAKESGPTTYKVTSTLTIKESDWLSQSMFTCRVDHRGLTFQQNASSMCVP

Cμ3: DQDTAIRVFAIPPSFASIFLTKSTKLTCLVTDLTTYDSVTISWTRQNGEAVKTHTNISES
HPNATFSAVGEASICEDDWNSGERFTCTVTHTDLPSPLKQTISRPK

Cμ4: GVALHRPDVYLLPPAREQLNLRESATITCLVTGFSPADVFVQWMQRGQPLSPEKYVTSAP
MPEPQAPGRYFAHSILTVSEEEWNTGETYTCVVAHEALPNRVTERTVDKSTGK<u>PTLYNVSLVMS
DTAGTCY</u>

J-Chain (aa1-22=signal peptide)
MKNHLLFWGVLAVFIKAVHVKAQEDERIVLVDNKCKCARITSRIIRSSEDPNEDIVERNI
RIIVPLNNRENISDPTSPLRTRFVYHLSDLCKKCDPTEVELDNQIVTATQSNICDEDSAT
ETCYTYDRNKCYTAVVPLVYGGETKMVETALTPDACYPD Figs. 11A-D
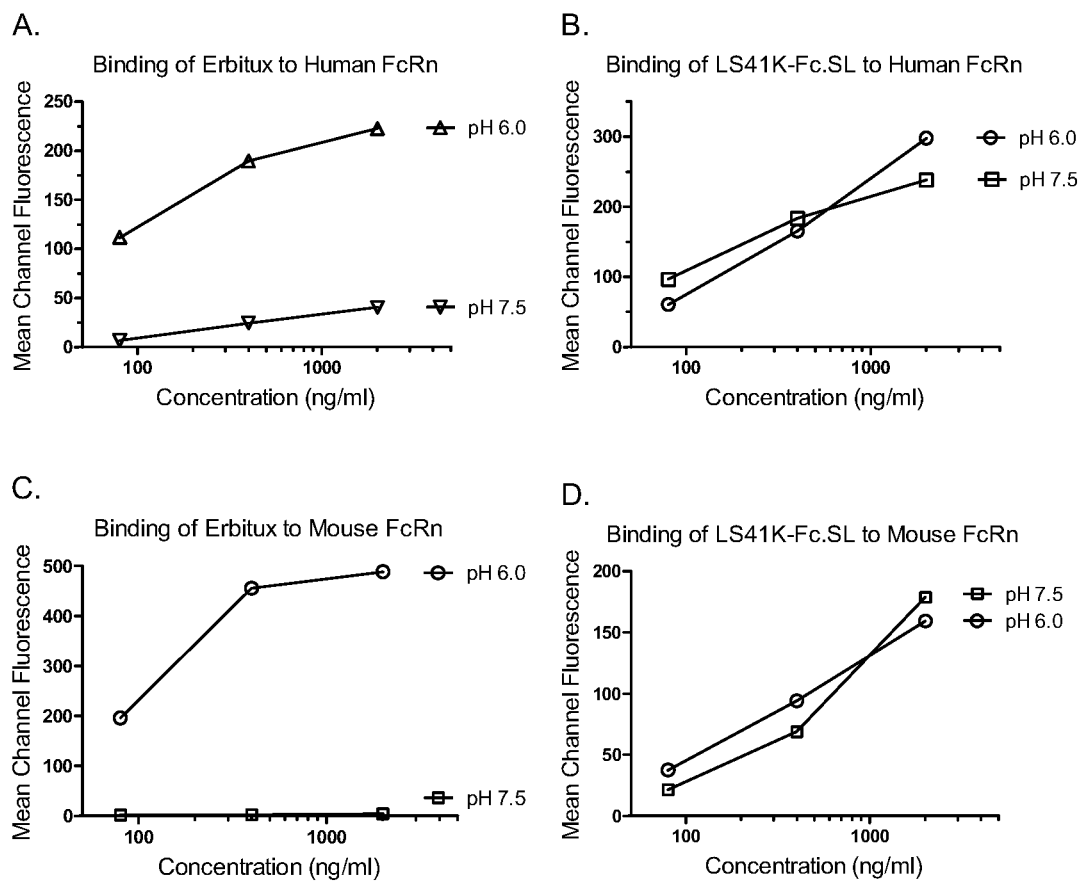

SEQUENCE LISTING

```
<160> NUMBER OF SEQ ID NOS: 55

<210> SEQ ID NO 1
<211> LENGTH: 19
<212> TYPE: PRT
<213> ORGANISM: Artificial sequence
<220> FEATURE:
<223> OTHER INFORMATION: Synthesized

<400> SEQUENCE: 1

Met Gly Trp Ser Trp Ile Phe Phe Phe Leu Leu Ser Gly Thr Ala Ser
1               5                   10                  15

Val Leu Ser

<210> SEQ ID NO 2
<211> LENGTH: 15
<212> TYPE: PRT
<213> ORGANISM: Artificial sequence
<220> FEATURE:
<223> OTHER INFORMATION: Synthesized

<400> SEQUENCE: 2

Glu Pro Lys Ser Cys Asp Lys Thr His Thr Cys Pro Pro Cys Pro
1               5                   10                  15

<210> SEQ ID NO 3
<211> LENGTH: 110
<212> TYPE: PRT
<213> ORGANISM: Artificial sequence
<220> FEATURE:
<223> OTHER INFORMATION: Synthesized
```

<400> SEQUENCE: 3

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
            85                  90                  95

Ala Leu Pro Ala Pro Ile Glu Lys Thr Ile Ser Lys Ala Lys
            100                 105                 110

<210> SEQ ID NO 4
<211> LENGTH: 107
<212> TYPE: PRT
<213> ORGANISM: Artificial sequence
<220> FEATURE:
<223> OTHER INFORMATION: Synthesized

<400> SEQUENCE: 4

Gly Gln Pro Arg Glu Pro Gln Val Tyr Thr Leu Pro Pro Ser Arg Asp
1               5                   10                  15

Glu Leu Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
            85                  90                  95

Thr Gln Lys Ser Leu Ser Leu Ser Pro Gly Lys
            100                 105

<210> SEQ ID NO 5
<211> LENGTH: 106
<212> TYPE: PRT
<213> ORGANISM: Artificial sequence
<220> FEATURE:
<223> OTHER INFORMATION: Synthesized

<400> SEQUENCE: 5

Asp Gln Asp Thr Ala Ile Arg Val Phe Ala Ile Pro Pro Ser Phe Ala
1               5                   10                  15

Ser Ile Phe Leu Thr Lys Ser Thr Lys Leu Thr Cys Leu Val Thr Asp
            20                  25                  30

Leu Thr Thr Tyr Asp Ser Val Thr Ile Ser Trp Thr Arg Gln Asn Gly
        35                  40                  45

Glu Ala Val Lys Thr His Thr Asn Ile Ser Glu Ser His Pro Asn Ala
50                  55                  60

Thr Phe Ser Ala Val Gly Glu Ala Ser Ile Cys Glu Asp Asp Trp Asn
65                  70                  75                  80

```
Ser Gly Glu Arg Phe Thr Cys Thr Val Thr His Thr Asp Leu Pro Ser
                85                  90                  95

Pro Leu Lys Gln Thr Ile Ser Arg Pro Lys
            100                 105

<210> SEQ ID NO 6
<211> LENGTH: 131
<212> TYPE: PRT
<213> ORGANISM: Artificial sequence
<220> FEATURE:
<223> OTHER INFORMATION: Synthesized

<400> SEQUENCE: 6

Gly Val Ala Leu His Arg Pro Asp Val Tyr Leu Leu Pro Pro Ala Arg
1               5                   10                  15

Glu Gln Leu Asn Leu Arg Glu Ser Ala Thr Ile Thr Cys Leu Val Thr
            20                  25                  30

Gly Phe Ser Pro Ala Asp Val Phe Val Gln Trp Met Gln Arg Gly Gln
        35                  40                  45

Pro Leu Ser Pro Glu Lys Tyr Val Thr Ser Ala Pro Met Pro Glu Pro
    50                  55                  60

Gln Ala Pro Gly Arg Tyr Phe Ala His Ser Ile Leu Thr Val Ser Glu
65                  70                  75                  80

Glu Glu Trp Asn Thr Gly Glu Thr Tyr Thr Cys Val Val Ala His Glu
                85                  90                  95

Ala Leu Pro Asn Arg Val Thr Glu Arg Thr Val Asp Lys Ser Thr Gly
            100                 105                 110

Lys Pro Thr Leu Tyr Asn Val Ser Leu Val Met Ser Asp Thr Ala Gly
        115                 120                 125

Thr Cys Tyr
        130

<210> SEQ ID NO 7
<211> LENGTH: 469
<212> TYPE: PRT
<213> ORGANISM: Artificial sequence
<220> FEATURE:
<223> OTHER INFORMATION: Synthesized

<400> SEQUENCE: 7

Glu Pro Lys Ser Cys Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
```

```
                130                 135                 140
Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
                180                 185                 190

Ser Lys Leu Thr Val Asp Lys Ser Arg Trp Gln Gln Gly Asn Val Phe
            195                 200                 205

Ser Cys Ser Val Met His Glu Ala Leu His Asn His Tyr Thr Gln Lys
        210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
                245                 250                 255

Lys Leu Thr Cys Leu Val Thr Asp Leu Thr Thr Tyr Asp Ser Val Thr
                260                 265                 270

Ile Ser Trp Thr Arg Gln Asn Gly Glu Ala Val Lys Thr His Thr Asn
            275                 280                 285

Ile Ser Glu Ser His Pro Asn Ala Thr Phe Ser Ala Val Gly Glu Ala
        290                 295                 300

Ser Ile Cys Glu Asp Asp Trp Asn Ser Gly Glu Arg Phe Thr Cys Thr
305                 310                 315                 320

Val Thr His Thr Asp Leu Pro Ser Pro Leu Lys Gln Thr Ile Ser Arg
                325                 330                 335

Pro Lys Gly Val Ala Leu His Arg Pro Asp Val Tyr Leu Leu Pro Pro
                340                 345                 350

Ala Arg Glu Gln Leu Asn Leu Arg Glu Ser Ala Thr Ile Thr Cys Leu
            355                 360                 365

Val Thr Gly Phe Ser Pro Ala Asp Val Phe Val Gln Trp Met Gln Arg
        370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
                405                 410                 415

Ser Glu Glu Glu Trp Asn Thr Gly Glu Thr Tyr Thr Cys Val Val Ala
                420                 425                 430

His Glu Ala Leu Pro Asn Arg Val Thr Glu Arg Thr Val Asp Lys Ser
            435                 440                 445

Thr Gly Lys Pro Thr Leu Tyr Asn Val Ser Leu Val Met Ser Asp Thr
        450                 455                 460

Ala Gly Thr Cys Tyr
465

<210> SEQ ID NO 8
<211> LENGTH: 5
<212> TYPE: PRT
<213> ORGANISM: Artificial sequence
<220> FEATURE:
<223> OTHER INFORMATION: Synthesized

<400> SEQUENCE: 8

Glu Pro Lys Ser Ser
1               5
```

```
<210> SEQ ID NO 9
<211> LENGTH: 110
<212> TYPE: PRT
<213> ORGANISM: Artificial sequence
<220> FEATURE:
<223> OTHER INFORMATION: Synthesized

<400> SEQUENCE: 9

Ala Pro Glu Ala Ala Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala Lys
            100                 105                 110

<210> SEQ ID NO 10
<211> LENGTH: 106
<212> TYPE: PRT
<213> ORGANISM: Artificial sequence
<220> FEATURE:
<223> OTHER INFORMATION: Synthesized

<400> SEQUENCE: 10

Asp Gln Asp Thr Ala Ile Arg Val Phe Ala Ile Pro Pro Ser Phe Ala
1               5                   10                  15

Ser Ile Phe Leu Thr Lys Ser Thr Lys Leu Thr Cys Leu Val Thr Asp
            20                  25                  30

Leu Thr Thr Tyr Asp Ser Val Thr Ile Ser Trp Thr Arg Gln Asn Gly
        35                  40                  45

Glu Ala Val Lys Thr His Thr Asn Ile Ser Glu Ser His Pro Asn Ala
    50                  55                  60

Thr Phe Ser Ala Val Gly Glu Ala Ser Ile Cys Glu Asp Asp Trp Asn
65                  70                  75                  80

Ser Gly Glu Arg Phe Thr Cys Thr Val Thr His Thr Asp Leu Ala Ser
                85                  90                  95

Ser Leu Lys Gln Thr Ile Ser Arg Pro Lys
            100                 105

<210> SEQ ID NO 11
<211> LENGTH: 469
<212> TYPE: PRT
<213> ORGANISM: Artificial sequence
<220> FEATURE:
<223> OTHER INFORMATION: Synthesized

<400> SEQUENCE: 11

Glu Pro Lys Ser Ser Asp Lys Thr His Thr Cys Pro Pro Cys Pro Ala
1               5                   10                  15

Pro Glu Ala Ala Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45
```

```
Val Asp Val Ser His Glu Asp Pro Glu Val Lys Phe Asn Trp Tyr Val
    50              55                  60

Asp Gly Val Glu Val His Asn Ala Lys Thr Lys Pro Arg Glu Glu Gln
65              70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
    130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
    210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
                245                 250                 255

Lys Leu Thr Cys Leu Val Thr Asp Leu Thr Thr Tyr Asp Ser Val Thr
            260                 265                 270

Ile Ser Trp Thr Arg Gln Asn Gly Glu Ala Val Lys Thr His Thr Asn
        275                 280                 285

Ile Ser Glu Ser His Pro Asn Ala Thr Phe Ser Ala Val Gly Glu Ala
    290                 295                 300

Ser Ile Cys Glu Asp Asp Trp Asn Ser Gly Glu Arg Phe Thr Cys Thr
305                 310                 315                 320

Val Thr His Thr Asp Leu Ala Ser Ser Leu Lys Gln Thr Ile Ser Arg
                325                 330                 335

Pro Lys Gly Val Ala Leu His Arg Pro Asp Val Tyr Leu Leu Pro Pro
            340                 345                 350

Ala Arg Glu Gln Leu Asn Leu Arg Glu Ser Ala Thr Ile Thr Cys Leu
        355                 360                 365

Val Thr Gly Phe Ser Pro Ala Asp Val Phe Val Gln Trp Met Gln Arg
    370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
                405                 410                 415

Ser Glu Glu Glu Trp Asn Thr Gly Glu Thr Tyr Thr Cys Val Val Ala
            420                 425                 430

His Glu Ala Leu Pro Asn Arg Val Thr Glu Arg Thr Val Asp Lys Ser
        435                 440                 445

Thr Gly Lys Pro Thr Leu Tyr Asn Val Ser Leu Val Met Ser Asp Thr
    450                 455                 460
```

Ala Gly Thr Cys Tyr
465

<210> SEQ ID NO 12
<211> LENGTH: 107
<212> TYPE: PRT
<213> ORGANISM: Artificial sequence
<220> FEATURE:
<223> OTHER INFORMATION: Synthesized

<400> SEQUENCE: 12

Gly Gln Pro Arg Glu Pro Gln Val Tyr Thr Leu Pro Pro Ser Arg Asp
1               5                   10                  15

Glu Leu Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Leu His Glu Ala Leu His Asn His Tyr
                85                  90                  95

Thr Gln Lys Ser Leu Ser Leu Ser Pro Gly Lys
            100                 105

<210> SEQ ID NO 13
<211> LENGTH: 469
<212> TYPE: PRT
<213> ORGANISM: Artificial sequence
<220> FEATURE:
<223> OTHER INFORMATION: Synthesized

<400> SEQUENCE: 13

Glu Pro Lys Ser Ser Asp Lys Thr His Thr Cys Pro Pro Cys Pro Ala
1               5                   10                  15

Pro Glu Ala Ala Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
    130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
            195                 200                 205

Ser Cys Ser Val Leu His Glu Ala Leu His Asn His Tyr Thr Gln Lys
210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
            245                 250                 255

Lys Leu Thr Cys Leu Val Thr Asp Leu Thr Thr Tyr Asp Ser Val Thr
            260                 265                 270

Ile Ser Trp Thr Arg Gln Asn Gly Glu Ala Val Lys Thr His Thr Asn
            275                 280                 285

Ile Ser Glu Ser His Pro Asn Ala Thr Phe Ser Ala Val Gly Glu Ala
            290                 295                 300

Ser Ile Cys Glu Asp Asp Trp Asn Ser Gly Glu Arg Phe Thr Cys Thr
305                 310                 315                 320

Val Thr His Thr Asp Leu Ala Ser Ser Leu Lys Gln Thr Ile Ser Arg
            325                 330                 335

Pro Lys Gly Val Ala Leu His Arg Pro Asp Val Tyr Leu Leu Pro Pro
            340                 345                 350

Ala Arg Glu Gln Leu Asn Leu Arg Glu Ser Ala Thr Ile Thr Cys Leu
            355                 360                 365

Val Thr Gly Phe Ser Pro Ala Asp Val Phe Val Gln Trp Met Gln Arg
            370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
            405                 410                 415

Ser Glu Glu Glu Trp Asn Thr Gly Glu Thr Tyr Thr Cys Val Val Ala
            420                 425                 430

His Glu Ala Leu Pro Asn Arg Val Thr Glu Arg Thr Val Asp Lys Ser
            435                 440                 445

Thr Gly Lys Pro Thr Leu Tyr Asn Val Ser Leu Val Met Ser Asp Thr
            450                 455                 460

Ala Gly Thr Cys Tyr
465

<210> SEQ ID NO 14
<211> LENGTH: 227
<212> TYPE: PRT
<213> ORGANISM: Artificial sequence
<220> FEATURE:
<223> OTHER INFORMATION: Synthesized

<400> SEQUENCE: 14

Ser Ala Ala Val Asn Gly Thr Ser Gln Phe Thr Cys Phe Tyr Asn Ser
1               5                   10                  15

Arg Ala Asn Ile Ser Cys Val Trp Ser Gln Asp Gly Ala Leu Gln Asp
            20                  25                  30

Thr Ser Cys Gln Val His Ala Trp Pro Asp Arg Arg Trp Asn Gln
            35                  40                  45

Thr Cys Glu Leu Leu Pro Val Ser Gln Ala Ser Trp Ala Cys Asn Leu
50                  55                  60

Ile Leu Gly Ala Pro Asp Ser Gln Lys Leu Thr Thr Val Asp Ile Val
65                  70                  75                  80

```
Thr Leu Arg Val Leu Cys Arg Glu Gly Val Arg Trp Arg Val Met Ala
                85                  90                  95
Ile Gln Asp Phe Lys Pro Phe Glu Asn Leu Arg Leu Met Ala Pro Ile
            100                 105                 110
Ser Leu Gln Val Val His Val Glu Thr His Arg Cys Asn Ile Ser Trp
        115                 120                 125
Glu Ile Ser Gln Ala Ser His Tyr Phe Glu Arg His Leu Glu Phe Glu
    130                 135                 140
Ala Arg Thr Leu Ser Pro Gly His Thr Trp Glu Glu Ala Pro Leu Leu
145                 150                 155                 160
Thr Leu Lys Gln Lys Gln Glu Trp Ile Cys Leu Glu Thr Leu Thr Pro
                165                 170                 175
Asp Thr Gln Tyr Glu Phe Gln Val Arg Val Lys Pro Leu Gln Gly Glu
            180                 185                 190
Phe Thr Thr Trp Ser Pro Trp Ser Gln Pro Leu Ala Phe Arg Thr Lys
        195                 200                 205
Pro Ala Ala Leu Gly Lys Asp Thr Thr Gly Gly Ala His His His
    210                 215                 220
His His His
225

<210> SEQ ID NO 15
<211> LENGTH: 469
<212> TYPE: PRT
<213> ORGANISM: Artificial sequence
<220> FEATURE:
<223> OTHER INFORMATION: Synthesized

<400> SEQUENCE: 15

Glu Pro Lys Ser Ser Asp Lys Thr His Thr Cys Pro Pro Cys Pro Ala
1               5                   10                  15
Pro Glu Ala Ala Gly Gly Pro Ser Val Ala Leu Phe Pro Pro Lys Pro
            20                  25                  30
Lys Asp Thr Leu Met Ile Ser Arg Thr Pro Glu Val Thr Cys Val Val
        35                  40                  45
Val Asp Val Ser His Glu Asp Pro Glu Val Lys Phe Asn Trp Tyr Val
    50                  55                  60
Asp Gly Val Glu Val His Asn Ala Lys Thr Lys Pro Arg Glu Glu Gln
65                  70                  75                  80
Tyr Asn Ser Thr Tyr Arg Val Val Ser Val Leu Thr Val Leu His Gln
                85                  90                  95
Asp Trp Leu Asn Gly Lys Glu Tyr Lys Cys Lys Val Ser Asn Lys Ala
            100                 105                 110
Leu Pro Ala Pro Ile Glu Lys Thr Ile Ser Lys Ala Lys Gly Gln Pro
        115                 120                 125
Arg Glu Pro Gln Val Tyr Thr Leu Pro Pro Ser Arg Asp Glu Leu Thr
    130                 135                 140
Lys Asn Gln Val Ser Leu Thr Cys Leu Val Lys Gly Phe Tyr Pro Ser
145                 150                 155                 160
Asp Ile Ala Val Glu Trp Glu Ser Asn Gly Gln Pro Glu Asn Asn Tyr
                165                 170                 175
Lys Thr Thr Pro Pro Val Leu Asp Ser Asp Gly Ser Phe Phe Leu Tyr
            180                 185                 190
Ser Lys Leu Thr Val Asp Lys Ser Arg Trp Gln Gln Gly Asn Val Phe
        195                 200                 205
```

Ser Cys Ser Val Leu His Glu Ala Leu His Asn His Tyr Thr Gln Lys
    210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
                245                 250                 255

Lys Leu Thr Cys Leu Val Thr Asp Leu Thr Thr Tyr Asp Ser Val Thr
                260                 265                 270

Ile Ser Trp Thr Arg Gln Asn Gly Glu Ala Val Lys Thr His Thr Asn
            275                 280                 285

Ile Ser Glu Ser His Pro Asn Ala Thr Phe Ser Ala Val Gly Glu Ala
        290                 295                 300

Ser Ile Cys Glu Asp Asp Trp Asn Ser Gly Glu Arg Phe Thr Cys Thr
305                 310                 315                 320

Val Thr His Thr Asp Leu Ala Ser Ser Leu Lys Gln Thr Ile Ser Arg
                325                 330                 335

Pro Lys Gly Val Ala Leu His Arg Pro Asp Val Tyr Leu Leu Pro Pro
                340                 345                 350

Ala Arg Glu Gln Leu Asn Leu Arg Glu Ser Ala Thr Ile Thr Cys Leu
            355                 360                 365

Val Thr Gly Phe Ser Pro Ala Asp Val Phe Val Gln Trp Met Gln Arg
        370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
                405                 410                 415

Ser Glu Glu Glu Trp Asn Thr Gly Glu Thr Tyr Thr Cys Val Val Ala
            420                 425                 430

His Glu Ala Leu Pro Asn Arg Val Thr Glu Arg Thr Val Asp Lys Ser
        435                 440                 445

Thr Gly Lys Pro Thr Leu Tyr Asn Val Ser Leu Val Met Ser Asp Thr
    450                 455                 460

Ala Gly Thr Cys Tyr
465

<210> SEQ ID NO 16
<211> LENGTH: 469
<212> TYPE: PRT
<213> ORGANISM: Artificial sequence
<220> FEATURE:
<223> OTHER INFORMATION: Synthesized

<400> SEQUENCE: 16

Glu Pro Lys Ser Ser Asp Lys Thr His Thr Cys Pro Pro Cys Pro Ala
1               5                   10                  15

Pro Glu Ala Ala Gly Gly Pro Ser Val Phe Leu Ala Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
            115                 120                 125

Arg Glu Pro Gln Val Tyr Thr Leu Pro Pro Ser Arg Asp Glu Leu Thr
130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
            195                 200                 205

Ser Cys Ser Val Leu His Glu Ala Leu His Asn His Tyr Thr Gln Lys
            210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
                245                 250                 255

Lys Leu Thr Cys Leu Val Thr Asp Leu Thr Thr Tyr Asp Ser Val Thr
            260                 265                 270

Ile Ser Trp Thr Arg Gln Asn Gly Glu Ala Val Lys Thr His Thr Asn
            275                 280                 285

Ile Ser Glu Ser His Pro Asn Ala Thr Phe Ser Ala Val Gly Glu Ala
            290                 295                 300

Ser Ile Cys Glu Asp Asp Trp Asn Ser Gly Glu Arg Phe Thr Cys Thr
305                 310                 315                 320

Val Thr His Thr Asp Leu Ala Ser Ser Leu Lys Gln Thr Ile Ser Arg
                325                 330                 335

Pro Lys Gly Val Ala Leu His Arg Pro Asp Val Tyr Leu Leu Pro Pro
            340                 345                 350

Ala Arg Glu Gln Leu Asn Leu Arg Glu Ser Ala Thr Ile Thr Cys Leu
            355                 360                 365

Val Thr Gly Phe Ser Pro Ala Asp Val Phe Val Gln Trp Met Gln Arg
            370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
                405                 410                 415

Ser Glu Glu Glu Trp Asn Thr Gly Glu Thr Tyr Thr Cys Val Val Ala
            420                 425                 430

His Glu Ala Leu Pro Asn Arg Val Thr Glu Arg Thr Val Asp Lys Ser
            435                 440                 445

Thr Gly Lys Pro Thr Leu Tyr Asn Val Ser Leu Val Met Ser Asp Thr
450                 455                 460

Ala Gly Thr Cys Tyr
465

<210> SEQ ID NO 17
<211> LENGTH: 406
<212> TYPE: PRT
<213> ORGANISM: Artificial sequence
<220> FEATURE:

<223> OTHER INFORMATION: Synthesized

<400> SEQUENCE: 17

```
Met Ile His Thr Asn Leu Lys Lys Phe Ser Cys Cys Val Leu Val
1               5                   10                  15

Phe Leu Leu Phe Ala Val Ile Cys Val Trp Lys Glu Lys Lys Gly
            20                  25                  30

Ser Tyr Tyr Asp Ser Phe Lys Leu Gln Thr Lys Glu Phe Gln Val Leu
        35                  40                  45

Lys Ser Leu Gly Lys Leu Ala Met Gly Ser Asp Ser Gln Ser Val Ser
    50                  55                  60

Ser Ser Ser Thr Gln Asp Pro His Arg Gly Arg Gln Thr Leu Gly Ser
65                  70                  75                  80

Leu Arg Gly Leu Ala Lys Ala Lys Pro Glu Ala Ser Phe Gln Val Trp
                85                  90                  95

Asn Lys Asp Ser Ser Ser Lys Asn Leu Ile Pro Arg Leu Gln Lys Ile
            100                 105                 110

Trp Lys Asn Tyr Leu Ser Met Asn Lys Tyr Lys Val Ser Tyr Lys Gly
        115                 120                 125

Pro Gly Pro Gly Ile Lys Phe Ser Ala Glu Ala Leu Arg Cys His Leu
    130                 135                 140

Arg Asp His Val Asn Val Ser Met Val Glu Val Thr Asp Phe Pro Phe
145                 150                 155                 160

Asn Thr Ser Glu Trp Glu Gly Tyr Leu Pro Lys Glu Ser Ile Arg Thr
                165                 170                 175

Lys Ala Gly Pro Trp Gly Arg Cys Ala Val Val Ser Ser Ala Gly Ser
            180                 185                 190

Leu Lys Ser Ser Gln Leu Gly Arg Glu Ile Asp Asp His Asp Ala Val
        195                 200                 205

Leu Arg Phe Asn Gly Ala Pro Thr Ala Asn Phe Gln Gln Asp Val Gly
    210                 215                 220

Thr Lys Thr Thr Ile Arg Leu Met Asn Ser Gln Leu Val Thr Thr Glu
225                 230                 235                 240

Lys Arg Phe Leu Lys Asp Ser Leu Tyr Asn Glu Gly Ile Leu Ile Val
                245                 250                 255

Trp Asp Pro Ser Val Tyr His Ser Asp Ile Pro Lys Trp Tyr Gln Asn
            260                 265                 270

Pro Asp Tyr Asn Phe Phe Asn Asn Tyr Lys Thr Tyr Arg Lys Leu His
        275                 280                 285

Pro Asn Gln Pro Phe Tyr Ile Leu Lys Pro Gln Met Pro Trp Glu Leu
    290                 295                 300

Trp Asp Ile Leu Gln Glu Ile Ser Pro Glu Ile Gln Pro Asn Pro
305                 310                 315                 320

Pro Ser Ser Gly Met Leu Gly Ile Ile Ile Met Met Thr Leu Cys Asp
                325                 330                 335

Gln Val Asp Ile Tyr Glu Phe Leu Pro Ser Lys Arg Lys Thr Asp Val
            340                 345                 350

Cys Tyr Tyr Tyr Gln Lys Phe Phe Asp Ser Ala Cys Thr Met Gly Ala
        355                 360                 365

Tyr His Pro Leu Leu Tyr Glu Lys Asn Leu Val Lys His Leu Asn Gln
    370                 375                 380

Gly Thr Asp Glu Asp Ile Tyr Leu Leu Gly Lys Ala Thr Leu Pro Gly
385                 390                 395                 400
```

Phe Arg Thr Ile His Cys
            405

<210> SEQ ID NO 18
<211> LENGTH: 398
<212> TYPE: PRT
<213> ORGANISM: Artificial sequence
<220> FEATURE:
<223> OTHER INFORMATION: Synthesized

<400> SEQUENCE: 18

Met Arg Leu Arg Glu Pro Leu Leu Ser Gly Ser Ala Ala Met Pro Gly
1               5                   10                  15

Ala Ser Leu Gln Arg Ala Cys Arg Leu Leu Val Ala Val Cys Ala Leu
            20                  25                  30

His Leu Gly Val Thr Leu Val Tyr Tyr Leu Ala Gly Arg Asp Leu Ser
        35                  40                  45

Arg Leu Pro Gln Leu Val Gly Val Ser Thr Pro Leu Gln Gly Gly Ser
    50                  55                  60

Asn Ser Ala Ala Ala Ile Gly Gln Ser Ser Gly Glu Leu Arg Thr Gly
65                  70                  75                  80

Gly Ala Arg Pro Pro Pro Leu Gly Ala Ser Ser Gln Pro Arg Pro
                85                  90                  95

Gly Gly Asp Ser Ser Pro Val Val Asp Ser Gly Pro Gly Pro Ala Ser
            100                 105                 110

Asn Leu Thr Ser Val Pro Val Pro His Thr Thr Ala Leu Ser Leu Pro
        115                 120                 125

Ala Cys Pro Glu Glu Ser Pro Leu Leu Val Gly Pro Met Leu Ile Glu
    130                 135                 140

Phe Asn Met Pro Val Asp Leu Glu Leu Val Ala Lys Gln Asn Pro Asn
145                 150                 155                 160

Val Lys Met Gly Gly Arg Tyr Ala Pro Arg Asp Cys Val Ser Pro His
                165                 170                 175

Lys Val Ala Ile Ile Ile Pro Phe Arg Asn Arg Gln Glu His Leu Lys
            180                 185                 190

Tyr Trp Leu Tyr Tyr Leu His Pro Val Leu Gln Arg Gln Gln Leu Asp
        195                 200                 205

Tyr Gly Ile Tyr Val Ile Asn Gln Ala Gly Asp Thr Ile Phe Asn Arg
    210                 215                 220

Ala Lys Leu Leu Asn Val Gly Phe Gln Glu Ala Leu Lys Asp Tyr Asp
225                 230                 235                 240

Tyr Thr Cys Phe Val Phe Ser Asp Val Asp Leu Ile Pro Met Asn Asp
                245                 250                 255

His Asn Ala Tyr Arg Cys Phe Ser Gln Pro Arg His Ile Ser Val Ala
            260                 265                 270

Met Asp Lys Phe Gly Phe Ser Leu Pro Tyr Val Gln Tyr Phe Gly Gly
        275                 280                 285

Val Ser Ala Leu Ser Lys Gln Gln Phe Leu Thr Ile Asn Gly Phe Pro
    290                 295                 300

Asn Asn Tyr Trp Gly Trp Gly Gly Glu Asp Asp Asp Ile Phe Asn Arg
305                 310                 315                 320

Leu Val Phe Arg Gly Met Ser Ile Ser Arg Pro Asn Ala Val Val Gly
                325                 330                 335

Arg Cys Arg Met Ile Arg His Ser Arg Asp Lys Lys Asn Glu Pro Asn
            340                 345                 350

Pro Gln Arg Phe Asp Arg Ile Ala His Thr Lys Glu Thr Met Leu Ser
            355                 360                 365

Asp Gly Leu Asn Ser Leu Thr Tyr Gln Val Leu Asp Val Gln Arg Tyr
        370                 375                 380

Pro Leu Tyr Thr Gln Ile Thr Val Asp Ile Gly Thr Pro Ser
385                 390                 395

<210> SEQ ID NO 19
<211> LENGTH: 297
<212> TYPE: PRT
<213> ORGANISM: Artificial sequence
<220> FEATURE:
<223> OTHER INFORMATION: Synthesized

<400> SEQUENCE: 19

Met Gly Val Pro Arg Pro Gln Pro Trp Ala Leu Gly Leu Leu Leu Phe
1               5                   10                  15

Leu Leu Pro Gly Ser Leu Gly Ala Glu Ser His Leu Ser Leu Leu Tyr
            20                  25                  30

His Leu Thr Ala Val Ser Ser Pro Ala Pro Gly Thr Pro Ala Phe Trp
        35                  40                  45

Val Ser Gly Trp Leu Gly Pro Gln Gln Tyr Leu Ser Tyr Asn Ser Leu
50                  55                  60

Arg Gly Glu Ala Glu Pro Cys Gly Ala Trp Val Trp Glu Asn Gln Val
65                  70                  75                  80

Ser Trp Tyr Trp Glu Lys Glu Thr Thr Asp Leu Arg Ile Lys Glu Lys
                85                  90                  95

Leu Phe Leu Glu Ala Phe Lys Ala Leu Gly Gly Lys Gly Pro Tyr Thr
            100                 105                 110

Leu Gln Gly Leu Leu Gly Cys Glu Leu Gly Pro Asp Asn Thr Ser Val
        115                 120                 125

Pro Thr Ala Lys Phe Ala Leu Asn Gly Glu Glu Phe Met Asn Phe Asp
130                 135                 140

Leu Lys Gln Gly Thr Trp Gly Gly Asp Trp Pro Glu Ala Leu Ala Ile
145                 150                 155                 160

Ser Gln Arg Trp Gln Gln Asp Lys Ala Ala Asn Lys Glu Leu Thr
                165                 170                 175

Phe Leu Leu Phe Ser Cys Pro His Arg Leu Arg Glu His Leu Glu Arg
            180                 185                 190

Gly Arg Gly Asn Leu Glu Trp Lys Glu Pro Pro Ser Met Arg Leu Lys
        195                 200                 205

Ala Arg Pro Ser Ser Pro Gly Phe Ser Val Leu Thr Cys Ser Ala Phe
210                 215                 220

Ser Phe Tyr Pro Pro Glu Leu Gln Leu Arg Phe Leu Arg Asn Gly Leu
225                 230                 235                 240

Ala Ala Gly Thr Gly Gln Gly Asp Phe Gly Pro Asn Ser Asp Gly Ser
                245                 250                 255

Phe His Ala Ser Ser Ser Leu Thr Val Lys Ser Gly Asp Glu His His
            260                 265                 270

Tyr Cys Cys Ile Val Gln His Ala Gly Leu Ala Gln Pro Leu Arg Val
        275                 280                 285

Glu Leu Glu Ser Pro Ala Lys Ser Ser
290                 295

<210> SEQ ID NO 20
<211> LENGTH: 8

```
<212> TYPE: PRT
<213> ORGANISM: Artificial sequence
<220> FEATURE:
<223> OTHER INFORMATION: Synthesized

<400> SEQUENCE: 20

Asp Tyr Lys Asp Asp Asp Lys
1               5

<210> SEQ ID NO 21
<211> LENGTH: 37
<212> TYPE: PRT
<213> ORGANISM: Artificial sequence
<220> FEATURE:
<223> OTHER INFORMATION: Synthesized

<400> SEQUENCE: 21

Pro Asn Lys Gly Ser Gly Thr Thr Ser Gly Thr Thr Arg Leu Leu Ser
1               5                   10                  15

Gly His Thr Cys Phe Thr Leu Thr Gly Leu Leu Gly Thr Leu Val Thr
                20                  25                  30

Met Gly Leu Leu Thr
            35

<210> SEQ ID NO 22
<211> LENGTH: 349
<212> TYPE: PRT
<213> ORGANISM: Artificial sequence
<220> FEATURE:
<223> OTHER INFORMATION: Synthesized

<400> SEQUENCE: 22

Met Gly Val Pro Arg Pro Gln Pro Trp Ala Leu Gly Leu Leu Leu Phe
1               5                   10                  15

Leu Leu Pro Gly Ser Leu Gly Ala Glu Ser His Leu Ser Leu Leu Tyr
                20                  25                  30

His Leu Thr Ala Val Ser Ser Pro Ala Pro Gly Thr Pro Ala Phe Trp
            35                  40                  45

Val Ser Gly Trp Leu Gly Pro Gln Gln Tyr Leu Ser Tyr Asn Ser Leu
    50                  55                  60

Arg Gly Glu Ala Glu Pro Cys Gly Ala Trp Val Trp Glu Asn Gln Val
65                  70                  75                  80

Ser Trp Tyr Trp Glu Lys Glu Thr Thr Asp Leu Arg Ile Lys Glu Lys
                85                  90                  95

Leu Phe Leu Glu Ala Phe Lys Ala Leu Gly Gly Lys Gly Pro Tyr Thr
                100                 105                 110

Leu Gln Gly Leu Leu Gly Cys Glu Leu Gly Pro Asp Asn Thr Ser Val
            115                 120                 125

Pro Thr Ala Lys Phe Ala Leu Asn Gly Glu Glu Phe Met Asn Phe Asp
    130                 135                 140

Leu Lys Gln Gly Thr Trp Gly Gly Asp Trp Pro Glu Ala Leu Ala Ile
145                 150                 155                 160

Ser Gln Arg Trp Gln Gln Gln Asp Lys Ala Ala Asn Lys Glu Leu Thr
                165                 170                 175

Phe Leu Leu Phe Ser Cys Pro His Arg Leu Arg Glu His Leu Glu Arg
                180                 185                 190

Gly Arg Gly Asn Leu Glu Trp Lys Glu Pro Ser Met Arg Leu Lys
            195                 200                 205

Ala Arg Pro Ser Ser Pro Gly Phe Ser Val Leu Thr Cys Ser Ala Phe
```

```
            210                 215                 220
Ser Phe Tyr Pro Pro Glu Leu Gln Leu Arg Phe Leu Arg Asn Gly Leu
225                 230                 235                 240

Ala Ala Gly Thr Gly Gln Gly Asp Phe Gly Pro Asn Ser Asp Gly Ser
                245                 250                 255

Phe His Ala Ser Ser Ser Leu Thr Val Lys Ser Gly Asp Glu His His
            260                 265                 270

Tyr Cys Cys Ile Val Gln His Ala Gly Leu Ala Gln Pro Leu Arg Val
        275                 280                 285

Glu Leu Glu Ser Pro Ala Lys Ser Ser Thr Gly Gly Asp Tyr Lys
290                 295                 300

Asp Asp Asp Asp Lys Gly Gly Pro Asn Lys Gly Ser Gly Thr Thr
305                 310                 315                 320

Ser Gly Thr Thr Arg Leu Leu Ser Gly His Thr Cys Phe Thr Leu Thr
                325                 330                 335

Gly Leu Leu Gly Thr Leu Val Thr Met Gly Leu Leu Thr
                340                 345

<210> SEQ ID NO 23
<211> LENGTH: 119
<212> TYPE: PRT
<213> ORGANISM: Homo sapiens

<400> SEQUENCE: 23

Met Ser Arg Ser Val Ala Leu Ala Val Leu Ala Leu Leu Ser Leu Ser
1               5                   10                  15

Gly Leu Glu Ala Ile Gln Arg Thr Pro Lys Ile Gln Val Tyr Ser Arg
            20                  25                  30

His Pro Ala Glu Asn Gly Lys Ser Asn Phe Leu Asn Cys Tyr Val Ser
        35                  40                  45

Gly Phe His Pro Ser Asp Ile Glu Val Asp Leu Leu Lys Asn Gly Glu
    50                  55                  60

Arg Ile Glu Lys Val Glu His Ser Asp Leu Ser Phe Ser Lys Asp Trp
65                  70                  75                  80

Ser Phe Tyr Leu Leu Tyr Tyr Thr Glu Phe Thr Pro Thr Glu Lys Asp
                85                  90                  95

Glu Tyr Ala Cys Arg Val Asn His Val Thr Leu Ser Gln Pro Lys Ile
            100                 105                 110

Val Lys Trp Asp Arg Asp Met
        115

<210> SEQ ID NO 24
<211> LENGTH: 297
<212> TYPE: PRT
<213> ORGANISM: Artificial sequence
<220> FEATURE:
<223> OTHER INFORMATION: Synthesized

<400> SEQUENCE: 24

Met Gly Met Pro Leu Pro Trp Ala Leu Ser Leu Leu Leu Val Leu Leu
1               5                   10                  15

Pro Gln Thr Trp Gly Ser Glu Thr Arg Pro Pro Leu Met Tyr His Leu
            20                  25                  30

Thr Ala Val Ser Asn Pro Ser Thr Gly Leu Pro Ser Phe Trp Ala Thr
        35                  40                  45

Gly Trp Leu Gly Pro Gln Gln Tyr Leu Thr Tyr Asn Ser Leu Arg Gln
    50                  55                  60
```

Glu Ala Asp Pro Cys Gly Ala Trp Met Trp Glu Asn Gln Val Ser Trp
65                  70                  75                  80

Tyr Trp Glu Lys Glu Thr Thr Asp Leu Lys Ser Lys Glu Gln Leu Phe
            85                  90                  95

Leu Glu Ala Leu Lys Thr Leu Glu Lys Ile Leu Asn Gly Thr Tyr Thr
            100                 105                 110

Leu Gln Gly Leu Leu Gly Cys Glu Leu Ala Ser Asp Asn Ser Ser Val
            115                 120                 125

Pro Thr Ala Val Phe Ala Leu Asn Gly Glu Glu Phe Met Lys Phe Asn
130                 135                 140

Pro Arg Ile Gly Asn Trp Thr Gly Glu Trp Pro Glu Thr Glu Ile Val
145                 150                 155                 160

Ala Asn Leu Trp Met Lys Gln Pro Asp Ala Ala Arg Lys Glu Ser Glu
                165                 170                 175

Phe Leu Leu Asn Ser Cys Pro Glu Arg Leu Leu Gly His Leu Glu Arg
                180                 185                 190

Gly Arg Arg Asn Leu Glu Trp Lys Glu Pro Pro Ser Met Arg Leu Lys
            195                 200                 205

Ala Arg Pro Gly Asn Ser Gly Ser Ser Val Leu Thr Cys Ala Ala Phe
210                 215                 220

Ser Phe Tyr Pro Pro Glu Leu Lys Phe Arg Phe Leu Arg Asn Gly Leu
225                 230                 235                 240

Ala Ser Gly Ser Gly Asn Cys Ser Thr Gly Pro Asn Gly Asp Gly Ser
                245                 250                 255

Phe His Ala Trp Ser Leu Leu Glu Val Lys Arg Gly Asp Glu His His
                260                 265                 270

Tyr Gln Cys Gln Val Glu His Glu Gly Leu Ala Gln Pro Leu Thr Val
            275                 280                 285

Asp Leu Asp Ser Ser Ala Arg Ser Ser
            290                 295

<210> SEQ ID NO 25
<211> LENGTH: 349
<212> TYPE: PRT
<213> ORGANISM: Artificial sequence
<220> FEATURE:
<223> OTHER INFORMATION: Synthesized

<400> SEQUENCE: 25

Met Gly Met Pro Leu Pro Trp Ala Leu Ser Leu Leu Leu Val Leu Leu
1               5                   10                  15

Pro Gln Thr Trp Gly Ser Glu Thr Arg Pro Pro Leu Met Tyr His Leu
            20                  25                  30

Thr Ala Val Ser Asn Pro Ser Thr Gly Leu Pro Ser Phe Trp Ala Thr
            35                  40                  45

Gly Trp Leu Gly Pro Gln Gln Tyr Leu Thr Tyr Asn Ser Leu Arg Gln
50                  55                  60

Glu Ala Asp Pro Cys Gly Ala Trp Met Trp Glu Asn Gln Val Ser Trp
65                  70                  75                  80

Tyr Trp Glu Lys Glu Thr Thr Asp Leu Lys Ser Lys Glu Gln Leu Phe
            85                  90                  95

Leu Glu Ala Leu Lys Thr Leu Glu Lys Ile Leu Asn Gly Thr Tyr Thr
            100                 105                 110

Leu Gln Gly Leu Leu Gly Cys Glu Leu Ala Ser Asp Asn Ser Ser Val
            115                 120                 125

```
Pro Thr Ala Val Phe Ala Leu Asn Gly Glu Glu Phe Met Lys Phe Asn
    130                 135                 140

Pro Arg Ile Gly Asn Trp Thr Gly Glu Trp Pro Glu Thr Glu Ile Val
145                 150                 155                 160

Ala Asn Leu Trp Met Lys Gln Pro Asp Ala Ala Arg Lys Glu Ser Glu
                165                 170                 175

Phe Leu Leu Asn Ser Cys Pro Glu Arg Leu Leu Gly His Leu Glu Arg
            180                 185                 190

Gly Arg Arg Asn Leu Glu Trp Lys Glu Pro Pro Ser Met Arg Leu Lys
        195                 200                 205

Ala Arg Pro Gly Asn Ser Gly Ser Ser Val Leu Thr Cys Ala Ala Phe
    210                 215                 220

Ser Phe Tyr Pro Pro Glu Leu Lys Phe Arg Phe Leu Arg Asn Gly Leu
225                 230                 235                 240

Ala Ser Gly Ser Gly Asn Cys Ser Thr Gly Pro Asn Gly Asp Gly Ser
                245                 250                 255

Phe His Ala Trp Ser Leu Leu Glu Val Lys Arg Gly Asp Glu His His
            260                 265                 270

Tyr Gln Cys Gln Val Glu His Glu Gly Leu Ala Gln Pro Leu Thr Val
        275                 280                 285

Asp Leu Asp Ser Ser Ala Arg Ser Ser Thr Gly Gly Gly Asp Tyr Lys
    290                 295                 300

Asp Asp Asp Asp Lys Gly Gly Pro Asn Lys Gly Ser Gly Thr Thr
305                 310                 315                 320

Ser Gly Thr Thr Arg Leu Leu Ser Gly His Thr Cys Phe Thr Leu Thr
                325                 330                 335

Gly Leu Leu Gly Thr Leu Val Thr Met Gly Leu Leu Thr
            340                 345

<210> SEQ ID NO 26
<211> LENGTH: 465
<212> TYPE: PRT
<213> ORGANISM: Artificial sequence
<220> FEATURE:
<223> OTHER INFORMATION: Synthesized

<400> SEQUENCE: 26

Glu Arg Lys Cys Cys Val Glu Cys Pro Pro Cys Pro Ala Pro Pro Val
1               5                   10                  15

Ala Gly Pro Ser Val Phe Leu Phe Pro Pro Lys Pro Lys Asp Thr Leu
            20                  25                  30

Met Ile Ser Arg Thr Pro Glu Val Thr Trp Val Val Asp Val Ser
        35                  40                  45

His Glu Asp Pro Glu Val Gln Phe Asn Trp Tyr Val Asp Gly Val Glu
    50                  55                  60

Val His Asn Ala Lys Thr Lys Pro Arg Glu Glu Gln Phe Asn Ser Thr
65                  70                  75                  80

Phe Cys Val Val Ser Val Leu Thr Val His Gln Asp Trp Leu Asn
                85                  90                  95

Gly Lys Glu Tyr Lys Cys Lys Val Ser Asn Lys Gly Leu Pro Ala Pro
            100                 105                 110

Ile Glu Lys Thr Ile Ser Lys Thr Lys Gly Gln Pro Arg Glu Pro Gln
        115                 120                 125

Val Tyr Thr Leu Pro Pro Ser Arg Glu Glu Met Thr Lys Asn Gln Val
    130                 135                 140
```

```
Ser Leu Thr Cys Leu Val Lys Gly Phe Tyr Pro Ser Asp Ile Ala Val
145                 150                 155                 160

Glu Trp Glu Ser Asn Gly Gln Pro Glu Asn Asn Tyr Lys Thr Thr Pro
            165                 170                 175

Pro Met Leu Asp Ser Asp Gly Ser Phe Phe Leu Tyr Ser Lys Leu Thr
        180                 185                 190

Val Asp Lys Ser Arg Trp Gln Gln Gly Asn Val Phe Ser Cys Ser Val
            195                 200                 205

Met His Glu Ala Leu His Asn His Tyr Thr Gln Lys Ser Leu Ser Leu
    210                 215                 220

Ser Pro Gly Lys Asp Gln Asp Thr Ala Ile Arg Val Phe Ala Ile Pro
225                 230                 235                 240

Pro Ser Phe Ala Ser Ile Phe Leu Thr Lys Ser Thr Lys Leu Thr Cys
                245                 250                 255

Leu Val Thr Asp Leu Thr Thr Tyr Asp Ser Val Thr Ile Ser Trp Thr
            260                 265                 270

Arg Gln Asn Gly Glu Ala Val Lys Thr His Thr Asn Ile Ser Glu Ser
            275                 280                 285

His Pro Asn Ala Thr Phe Ser Ala Val Gly Glu Ala Ser Ile Cys Glu
    290                 295                 300

Asp Asp Trp Asn Ser Gly Glu Arg Phe Thr Cys Thr Val Thr His Thr
305                 310                 315                 320

Asp Leu Ala Ser Ser Leu Lys Gln Thr Ile Ser Arg Pro Lys Gly Val
                325                 330                 335

Ala Leu His Arg Pro Asp Val Tyr Leu Leu Pro Pro Ala Arg Glu Gln
            340                 345                 350

Leu Asn Leu Arg Glu Ser Ala Thr Ile Thr Cys Leu Val Thr Gly Phe
            355                 360                 365

Ser Pro Ala Asp Val Phe Val Gln Trp Met Gln Arg Gly Gln Pro Leu
    370                 375                 380

Ser Pro Glu Lys Tyr Val Thr Ser Ala Pro Met Pro Glu Pro Gln Ala
385                 390                 395                 400

Pro Gly Arg Tyr Phe Ala His Ser Ile Leu Thr Val Ser Glu Glu Glu
                405                 410                 415

Trp Asn Thr Gly Glu Thr Tyr Thr Cys Val Val Ala His Glu Ala Leu
            420                 425                 430

Pro Asn Arg Val Thr Glu Arg Thr Val Asp Lys Ser Thr Gly Lys Pro
            435                 440                 445

Thr Leu Tyr Asn Val Ser Leu Val Met Ser Asp Thr Ala Gly Thr Cys
    450                 455                 460

Tyr
465

<210> SEQ ID NO 27
<211> LENGTH: 469
<212> TYPE: PRT
<213> ORGANISM: Artificial sequence
<220> FEATURE:
<223> OTHER INFORMATION: Synthesized

<400> SEQUENCE: 27

Glu Pro Lys Ser Cys Asp Thr Pro Pro Cys Pro Arg Cys Pro Ala
1               5                   10                  15

Pro Glu Leu Leu Gly Gly Pro Ser Val Phe Leu Phe Pro Pro Lys Pro
            20                  25                  30
```

```
Lys Asp Thr Leu Met Ile Ser Arg Thr Pro Glu Val Thr Cys Val Val
        35                  40                  45

Val Asp Val Ser His Glu Asp Pro Glu Val Gln Phe Lys Trp Tyr Val
 50                  55                  60

Asp Gly Val Glu Val His Asn Ala Lys Thr Lys Pro Arg Glu Glu Gln
 65                  70                  75                  80

Tyr Asn Ser Thr Phe Arg Val Val Ser Val Leu Thr Val Leu His Gln
                 85                  90                  95

Asp Trp Leu Asn Gly Lys Glu Tyr Lys Cys Lys Val Ser Asn Lys Ala
                100                 105                 110

Leu Pro Ala Pro Ile Glu Lys Thr Ile Ser Lys Thr Lys Gly Gln Pro
                115                 120                 125

Arg Glu Pro Gln Val Tyr Thr Leu Pro Pro Ser Arg Glu Glu Met Thr
        130                 135                 140

Lys Asn Gln Val Ser Leu Thr Cys Pro Val Lys Gly Phe Tyr Pro Ser
145                 150                 155                 160

Asp Ile Ala Val Glu Trp Glu Ser Ser Gly Gln Pro Glu Asn Asn Tyr
                165                 170                 175

Asn Thr Thr Pro Pro Met Leu Asp Ser Asp Gly Ser Phe Phe Leu Tyr
                180                 185                 190

Ser Lys Leu Thr Val Asp Lys Ser Arg Trp Gln Gln Gly Asn Ile Phe
        195                 200                 205

Ser Cys Ser Val Met His Glu Ala Leu His Asn Arg Phe Thr Gln Lys
        210                 215                 220

Ser Leu Ser Leu Ser Pro Gly Lys Asp Gln Asp Thr Ala Ile Arg Val
225                 230                 235                 240

Phe Ala Ile Pro Pro Ser Phe Ala Ser Ile Phe Leu Thr Lys Ser Thr
                245                 250                 255

Lys Leu Thr Cys Leu Val Thr Asp Leu Thr Thr Tyr Asp Ser Val Thr
            260                 265                 270

Ile Ser Trp Thr Arg Gln Asn Gly Glu Ala Val Lys Thr His Thr Asn
        275                 280                 285

Ile Ser Glu Ser His Pro Asn Ala Thr Phe Ser Ala Val Gly Glu Ala
        290                 295                 300

Ser Ile Cys Glu Asp Asp Trp Asn Ser Gly Glu Arg Phe Thr Cys Thr
305                 310                 315                 320

Val Thr His Thr Asp Leu Ala Ser Ser Leu Lys Gln Thr Ile Ser Arg
                325                 330                 335

Pro Lys Gly Val Ala Leu His Arg Pro Asp Val Tyr Leu Leu Pro Pro
            340                 345                 350

Ala Arg Glu Gln Leu Asn Leu Arg Glu Ser Ala Thr Ile Thr Cys Leu
        355                 360                 365

Val Thr Gly Phe Ser Pro Ala Asp Val Phe Val Gln Trp Met Gln Arg
370                 375                 380

Gly Gln Pro Leu Ser Pro Glu Lys Tyr Val Thr Ser Ala Pro Met Pro
385                 390                 395                 400

Glu Pro Gln Ala Pro Gly Arg Tyr Phe Ala His Ser Ile Leu Thr Val
            405                 410                 415

Ser Glu Glu Glu Trp Asn Thr Gly Glu Thr Tyr Thr Cys Val Val Ala
            420                 425                 430

His Glu Ala Leu Pro Asn Arg Val Thr Glu Arg Thr Val Asp Lys Ser
        435                 440                 445
```

Thr Gly Lys Pro Thr Leu Tyr Asn Val Ser Leu Val Met Ser Asp Thr
            450                 455                 460
Ala Gly Thr Cys Tyr
465

<210> SEQ ID NO 28
<211> LENGTH: 466
<212> TYPE: PRT
<213> ORGANISM: Artificial sequence
<220> FEATURE:
<223> OTHER INFORMATION: Synthesized

<400> SEQUENCE: 28

Glu Ser Lys Tyr Gly Pro Pro Cys Pro Ser Cys Pro Ala Pro Glu Phe
1               5                   10                  15
Leu Gly Gly Pro Ser Val Phe Leu Phe Pro Pro Lys Pro Lys Asp Thr
            20                  25                  30
Leu Met Ile Ser Arg Thr Pro Glu Val Thr Cys Val Val Val Asp Val
        35                  40                  45
Ser Gln Glu Asp Pro Glu Val Gln Phe Asn Trp Tyr Val Asp Gly Val
    50                  55                  60
Glu Val His Asn Ala Lys Thr Lys Pro Arg Glu Glu Gln Phe Asn Ser
65                  70                  75                  80
Thr Tyr Arg Val Val Arg Val Leu Thr Val Leu His Gln Asp Trp Leu
                85                  90                  95
Asn Gly Lys Glu Tyr Lys Cys Lys Val Ser Asn Lys Gly Leu Pro Ser
            100                 105                 110
Ser Ile Glu Lys Thr Ile Ser Lys Ala Lys Gly Gln Pro Arg Glu Pro
        115                 120                 125
Gln Val Tyr Thr Leu Pro Pro Ser Gln Glu Glu Met Thr Lys Asn Gln
    130                 135                 140
Val Ser Leu Thr Cys Leu Val Lys Gly Phe Tyr Pro Ser Asp Ile Ala
145                 150                 155                 160
Val Glu Trp Glu Ser Asn Gly Gln Pro Glu Asp Asn Tyr Lys Thr Thr
                165                 170                 175
Pro Pro Val Leu Asp Ser Asp Gly Ser Phe Phe Leu Tyr Ser Arg Leu
            180                 185                 190
Thr Val Asp Lys Ser Arg Trp Gln Glu Gly Asn Val Phe Ser Cys Ser
        195                 200                 205
Val Met His Glu Ala Leu His Asn His Tyr Thr Gln Lys Ser Leu Ser
    210                 215                 220
Leu Ser Pro Gly Lys Asp Gln Asp Thr Ala Ile Arg Val Phe Ala Ile
225                 230                 235                 240
Pro Pro Ser Phe Ala Ser Ile Phe Leu Thr Lys Ser Thr Lys Leu Thr
                245                 250                 255
Cys Leu Val Thr Asp Leu Thr Thr Tyr Asp Ser Val Thr Ile Ser Trp
            260                 265                 270
Thr Arg Gln Asn Gly Glu Ala Val Lys Thr His Thr Asn Ile Ser Glu
        275                 280                 285
Ser His Pro Asn Ala Thr Phe Ser Ala Val Gly Glu Ala Ser Ile Cys
    290                 295                 300
Glu Asp Asp Trp Asn Ser Gly Glu Arg Phe Thr Cys Thr Val Thr His
305                 310                 315                 320
Thr Asp Leu Ala Ser Ser Leu Lys Gln Thr Ile Ser Arg Pro Lys Gly
                325                 330                 335

```
Val Ala Leu His Arg Pro Asp Val Tyr Leu Pro Ala Arg Glu
            340                 345                 350

Gln Leu Asn Leu Arg Glu Ser Ala Thr Ile Thr Cys Leu Val Thr Gly
            355                 360                 365

Phe Ser Pro Ala Asp Val Phe Val Gln Trp Met Gln Arg Gly Gln Pro
            370                 375                 380

Leu Ser Pro Glu Lys Tyr Val Thr Ser Ala Pro Met Pro Glu Pro Gln
385                 390                 395                 400

Ala Pro Gly Arg Tyr Phe Ala His Ser Ile Leu Thr Val Ser Glu Glu
            405                 410                 415

Glu Trp Asn Thr Gly Glu Thr Tyr Thr Cys Val Val Ala His Glu Ala
            420                 425                 430

Leu Pro Asn Arg Val Thr Glu Arg Thr Val Asp Lys Ser Thr Gly Lys
            435                 440                 445

Pro Thr Leu Tyr Asn Val Ser Leu Val Met Ser Asp Thr Ala Gly Thr
            450                 455                 460

Cys Tyr
465

<210> SEQ ID NO 29
<211> LENGTH: 98
<212> TYPE: PRT
<213> ORGANISM: Homo sapiens

<400> SEQUENCE: 29

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val

<210> SEQ ID NO 30
<211> LENGTH: 15
<212> TYPE: PRT
<213> ORGANISM: Homo sapiens

<400> SEQUENCE: 30

Glu Pro Lys Ser Cys Asp Lys Thr His Thr Cys Pro Pro Cys Pro
1               5                   10                  15

<210> SEQ ID NO 31
<211> LENGTH: 110
<212> TYPE: PRT
<213> ORGANISM: Homo sapiens

<400> SEQUENCE: 31

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
                20                  25                  30
```

-continued

Val Val Asp Val Ser His Glu Asp Pro Glu Val Lys Phe Asn Trp Tyr
            35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala Lys
            100                 105                 110

<210> SEQ ID NO 32
<211> LENGTH: 107
<212> TYPE: PRT
<213> ORGANISM: Homo sapiens

<400> SEQUENCE: 32

Gly Gln Pro Arg Glu Pro Gln Val Tyr Thr Leu Pro Pro Ser Arg Asp
1               5                   10                  15

Glu Leu Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Pro Gly Lys
            100                 105

<210> SEQ ID NO 33
<211> LENGTH: 98
<212> TYPE: PRT
<213> ORGANISM: Homo sapiens

<400> SEQUENCE: 33

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val

<210> SEQ ID NO 34
<211> LENGTH: 12
<212> TYPE: PRT
<213> ORGANISM: Homo sapiens

```
<400> SEQUENCE: 34

Glu Arg Lys Cys Cys Val Glu Cys Pro Pro Cys Pro
1               5                   10

<210> SEQ ID NO 35
<211> LENGTH: 109
<212> TYPE: PRT
<213> ORGANISM: Homo sapiens

<400> SEQUENCE: 35

Ala Pro Pro Val Ala Gly Pro Ser Val Phe Leu Phe Pro Pro Lys Pro
1               5                   10                  15

Lys Asp Thr Leu Met Ile Ser Arg Thr Pro Glu Val Thr Cys Val Val
            20                  25                  30

Val Asp Val Ser His Glu Asp Pro Glu Val Gln Phe Asn Trp Tyr Val
        35                  40                  45

Asp Gly Val Glu Val His Asn Ala Lys Thr Lys Pro Arg Glu Glu Gln
    50                  55                  60

Phe Asn Ser Thr Phe Arg Val Val Ser Val Leu Thr Val Val His Gln
65                  70                  75                  80

Asp Trp Leu Asn Gly Lys Glu Tyr Lys Cys Lys Val Ser Asn Lys Gly
                85                  90                  95

Leu Pro Ala Pro Ile Glu Lys Thr Ile Ser Lys Thr Lys
            100                 105

<210> SEQ ID NO 36
<211> LENGTH: 107
<212> TYPE: PRT
<213> ORGANISM: Homo sapiens

<400> SEQUENCE: 36

Gly Gln Pro Arg Glu Pro Gln Val Tyr Thr Leu Pro Pro Ser Arg Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Met Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Pro Gly Lys
            100                 105

<210> SEQ ID NO 37
<211> LENGTH: 98
<212> TYPE: PRT
<213> ORGANISM: Homo sapiens

<400> SEQUENCE: 37

Ala Ser Thr Lys Gly Pro Ser Val Phe Pro Leu Ala Pro Cys Ser Arg
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45
```

Gly Val His Thr Phe Pro Ala Val Leu Gln Ser Ser Gly Leu Tyr Ser
            50                  55                  60

Leu Ser Ser Val Val Thr Val Pro Ser Ser Ser Leu Gly Thr Gln Thr
 65                  70                  75                  80

Tyr Thr Cys Asn Val Asn His Lys Pro Ser Asn Thr Lys Val Asp Lys
                 85                  90                  95

Arg Val

<210> SEQ ID NO 38
<211> LENGTH: 62
<212> TYPE: PRT
<213> ORGANISM: Homo sapiens

<400> SEQUENCE: 38

Glu Leu Lys Thr Pro Leu Gly Asp Thr Thr His Thr Cys Pro Arg Cys
 1               5                  10                  15

Pro Glu Pro Lys Ser Cys Asp Thr Pro Pro Cys Pro Arg Cys Pro
                 20                  25                  30

Glu Pro Lys Ser Cys Asp Thr Pro Pro Cys Pro Arg Cys Pro Glu
             35                  40                  45

Pro Lys Ser Cys Asp Thr Pro Pro Cys Pro Arg Cys Pro
         50                  55                  60

<210> SEQ ID NO 39
<211> LENGTH: 110
<212> TYPE: PRT
<213> ORGANISM: Homo sapiens

<400> SEQUENCE: 39

Ala Pro Glu Leu Leu Gly Gly Pro Ser Val Phe Leu Phe Pro Pro Lys
 1               5                  10                  15

Pro Lys Asp Thr Leu Met Ile Ser Arg Thr Pro Glu Val Thr Cys Val
                 20                  25                  30

Val Val Asp Val Ser His Glu Asp Pro Glu Val Gln Phe Lys Trp Tyr
             35                  40                  45

Val Asp Gly Val Glu Val His Asn Ala Lys Thr Lys Pro Arg Glu Glu
         50                  55                  60

Gln Tyr Asn Ser Thr Phe Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Ala Leu Pro Ala Pro Ile Glu Lys Thr Ile Ser Lys Thr Lys
            100                 105                 110

<210> SEQ ID NO 40
<211> LENGTH: 107
<212> TYPE: PRT
<213> ORGANISM: Homo sapiens

<400> SEQUENCE: 40

Gly Gln Pro Arg Glu Pro Gln Val Tyr Thr Leu Pro Pro Ser Arg Glu
 1               5                  10                  15

Glu Met Thr Lys Asn Gln Val Ser Leu Thr Cys Leu Val Lys Gly Phe
                 20                  25                  30

Tyr Pro Ser Asp Ile Ala Val Glu Trp Glu Ser Ser Gly Gln Pro Glu
             35                  40                  45

Asn Asn Tyr Asn Thr Thr Pro Pro Met Leu Asp Ser Asp Gly Ser Phe

```
            50                  55                  60
Phe Leu Tyr Ser Lys Leu Thr Val Asp Lys Ser Arg Trp Gln Gln Gly
 65                  70                  75                  80

Asn Ile Phe Ser Cys Ser Val Met His Glu Ala Leu His Asn Arg Phe
                 85                  90                  95

Thr Gln Lys Ser Leu Ser Leu Ser Pro Gly Lys
            100                 105

<210> SEQ ID NO 41
<211> LENGTH: 98
<212> TYPE: PRT
<213> ORGANISM: Homo sapiens

<400> SEQUENCE: 41

Ala Ser Thr Lys Gly Pro Ser Val Phe Pro Leu Ala Pro Cys Ser Arg
 1               5                  10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
     50                  55                  60

Leu Ser Ser Val Val Thr Val Pro Ser Ser Leu Gly Thr Lys Thr
 65                  70                  75                  80

Tyr Thr Cys Asn Val Asp His Lys Pro Ser Asn Thr Lys Val Asp Lys
                 85                  90                  95

Arg Val

<210> SEQ ID NO 42
<211> LENGTH: 12
<212> TYPE: PRT
<213> ORGANISM: Homo sapiens

<400> SEQUENCE: 42

Glu Ser Lys Tyr Gly Pro Pro Cys Pro Ser Cys Pro
 1               5                  10

<210> SEQ ID NO 43
<211> LENGTH: 110
<212> TYPE: PRT
<213> ORGANISM: Homo sapiens

<400> SEQUENCE: 43

Ala Pro Glu Phe Leu Gly Gly Pro Ser Val Phe Leu Phe Pro Pro Lys
 1               5                  10                  15

Pro Lys Asp Thr Leu Met Ile Ser Arg Thr Pro Glu Val Thr Cys Val
                20                  25                  30

Val Val Asp Val Ser Gln Glu Asp Pro Glu Val Gln Phe Asn Trp Tyr
            35                  40                  45

Val Asp Gly Val Glu Val His Asn Ala Lys Thr Lys Pro Arg Glu Glu
     50                  55                  60

Gln Phe Asn Ser Thr Tyr Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Gly Leu Pro Ser Ser Ile Glu Lys Thr Ile Ser Lys Ala Lys
            100                 105                 110
```

<210> SEQ ID NO 44
<211> LENGTH: 107
<212> TYPE: PRT
<213> ORGANISM: Homo sapiens

<400> SEQUENCE: 44

Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105

<210> SEQ ID NO 45
<211> LENGTH: 102
<212> TYPE: PRT
<213> ORGANISM: Homo sapiens

<400> SEQUENCE: 45

Ala Ser Pro Thr Ser Pro Lys Val Phe Pro Leu Ser Leu Cys Ser Thr
1               5                   10                  15

Gln Pro Asp Gly Asn Val Val Ile Ala Cys Leu Val Gln Gly Phe Phe
            20                  25                  30

Pro Gln Glu Pro Leu Ser Val Thr Trp Ser Glu Ser Gly Gln Gly Val
        35                  40                  45

Thr Ala Arg Asn Phe Pro Pro Ser Gln Asp Ala Ser Gly Asp Leu Tyr
    50                  55                  60

Thr Thr Ser Ser Gln Leu Thr Leu Pro Ala Thr Gln Cys Leu Ala Gly
65                  70                  75                  80

Lys Ser Val Thr Cys His Val Lys His Tyr Thr Asn Pro Ser Gln Asp
                85                  90                  95

Val Thr Val Pro Cys Pro
            100

<210> SEQ ID NO 46
<211> LENGTH: 120
<212> TYPE: PRT
<213> ORGANISM: Homo sapiens

<400> SEQUENCE: 46

Val Pro Ser Thr Pro Pro Thr Pro Ser Pro Ser Thr Pro Pro Thr Pro
1               5                   10                  15

Ser Pro Ser Cys Cys His Pro Arg Leu Ser Leu His Arg Pro Ala Leu
            20                  25                  30

Glu Asp Leu Leu Leu Gly Ser Glu Ala Asn Leu Thr Cys Thr Leu Thr
        35                  40                  45

Gly Leu Arg Asp Ala Ser Gly Val Thr Phe Thr Trp Thr Pro Ser Ser
    50                  55                  60

Gly Lys Ser Ala Val Gln Gly Pro Pro Glu Arg Asp Leu Cys Gly Cys

```
                65                  70                  75                  80
Tyr Ser Val Ser Ser Val Leu Pro Gly Cys Ala Glu Pro Trp Asn His
                    85                  90                  95
Gly Lys Thr Phe Thr Cys Thr Ala Ala Tyr Pro Glu Ser Lys Thr Pro
                100                 105                 110
Leu Thr Ala Thr Leu Ser Lys Ser
                115                 120
```

<210> SEQ ID NO 47
<211> LENGTH: 131
<212> TYPE: PRT
<213> ORGANISM: Homo sapiens

<400> SEQUENCE: 47

```
Gly Asn Thr Phe Arg Pro Glu Val His Leu Leu Pro Pro Ser Glu
1               5                   10                  15
Glu Leu Ala Leu Asn Glu Leu Val Thr Leu Thr Cys Leu Ala Arg Gly
                20                  25                  30
Phe Ser Pro Lys Asp Val Leu Val Arg Trp Leu Gln Gly Ser Gln Glu
                35                  40                  45
Leu Pro Arg Glu Lys Tyr Leu Thr Trp Ala Ser Arg Gln Glu Pro Ser
    50                  55                  60
Gln Gly Thr Thr Thr Phe Ala Val Thr Ser Ile Leu Arg Val Ala Ala
65                  70                  75                  80
Glu Asp Trp Lys Lys Gly Asp Thr Phe Ser Cys Met Val Gly His Glu
                85                  90                  95
Ala Leu Pro Leu Ala Phe Thr Gln Lys Thr Ile Asp Arg Leu Ala Gly
                100                 105                 110
Lys Pro Thr His Val Asn Val Ser Val Val Met Ala Glu Val Asp Gly
                115                 120                 125
Thr Cys Tyr
    130
```

<210> SEQ ID NO 48
<211> LENGTH: 102
<212> TYPE: PRT
<213> ORGANISM: Homo sapiens

<400> SEQUENCE: 48

```
Ala Ser Pro Thr Ser Pro Lys Val Phe Pro Leu Ser Leu Asp Ser Thr
1               5                   10                  15
Pro Gln Asp Gly Asn Val Val Val Ala Cys Leu Val Gln Gly Phe Phe
                20                  25                  30
Pro Gln Glu Pro Leu Ser Val Thr Trp Ser Glu Ser Gly Gln Asn Val
                35                  40                  45
Thr Ala Arg Asn Phe Pro Pro Ser Gln Asp Ala Ser Gly Asp Leu Tyr
    50                  55                  60
Thr Thr Ser Ser Gln Leu Thr Leu Pro Ala Thr Gln Cys Pro Asp Gly
65                  70                  75                  80
Lys Ser Val Thr Cys His Val Lys His Tyr Thr Asn Pro Ser Gln Asp
                85                  90                  95
Val Thr Val Pro Cys Pro
                100
```

<210> SEQ ID NO 49
<211> LENGTH: 107
<212> TYPE: PRT

<213> ORGANISM: Homo sapiens

<400> SEQUENCE: 49

Val Pro Pro Pro Pro Cys Cys His Pro Arg Leu Ser Leu His Arg
1               5                   10                  15

Pro Ala Leu Glu Asp Leu Leu Leu Gly Ser Glu Ala Asn Leu Thr Cys
            20                  25                  30

Thr Leu Thr Gly Leu Arg Asp Ala Ser Gly Ala Thr Phe Thr Trp Thr
        35                  40                  45

Pro Ser Ser Gly Lys Ser Ala Val Gln Gly Pro Pro Glu Arg Asp Leu
    50                  55                  60

Cys Gly Cys Tyr Ser Val Ser Val Leu Pro Gly Cys Ala Gln Pro
65                  70                  75                  80

Trp Asn His Gly Glu Thr Phe Thr Cys Thr Ala Ala His Pro Glu Leu
                85                  90                  95

Lys Thr Pro Leu Thr Ala Asn Ile Thr Lys Ser
            100                 105

<210> SEQ ID NO 50
<211> LENGTH: 131
<212> TYPE: PRT
<213> ORGANISM: Homo sapiens

<400> SEQUENCE: 50

Gly Asn Thr Phe Arg Pro Glu Val His Leu Leu Pro Pro Ser Glu
1               5                   10                  15

Glu Leu Ala Leu Asn Glu Leu Val Thr Leu Thr Cys Leu Ala Arg Gly
            20                  25                  30

Phe Ser Pro Lys Asp Val Leu Val Arg Trp Leu Gln Gly Ser Gln Glu
        35                  40                  45

Leu Pro Arg Glu Lys Tyr Leu Thr Trp Ala Ser Arg Gln Glu Pro Ser
    50                  55                  60

Gln Gly Thr Thr Thr Phe Ala Val Thr Ser Ile Leu Arg Val Ala Ala
65                  70                  75                  80

Glu Asp Trp Lys Lys Gly Asp Thr Phe Ser Cys Met Val Gly His Glu
                85                  90                  95

Ala Leu Pro Leu Ala Phe Thr Gln Lys Thr Ile Asp Arg Leu Ala Gly
            100                 105                 110

Lys Pro Thr His Val Asn Val Ser Val Val Met Ala Glu Val Asp Gly
        115                 120                 125

Thr Cys Tyr
    130

<210> SEQ ID NO 51
<211> LENGTH: 104
<212> TYPE: PRT
<213> ORGANISM: Homo sapiens

<400> SEQUENCE: 51

Gly Ser Ala Ser Ala Pro Thr Leu Phe Pro Leu Val Ser Cys Glu Asn
1               5                   10                  15

Ser Pro Ser Asp Thr Ser Ser Val Ala Val Gly Cys Leu Ala Gln Asp
            20                  25                  30

Phe Leu Pro Asp Ser Ile Thr Phe Ser Trp Lys Tyr Lys Asn Asn Ser
        35                  40                  45

Asp Ile Ser Ser Thr Arg Gly Phe Pro Ser Val Leu Arg Gly Gly Lys
    50                  55                  60

Tyr Ala Ala Thr Ser Gln Val Leu Leu Pro Ser Lys Asp Val Met Gln
65                  70                  75                  80

Gly Thr Asp Glu His Val Val Cys Lys Val Gln His Pro Asn Gly Asn
                85                  90                  95

Lys Glu Lys Asn Val Pro Leu Pro
            100

<210> SEQ ID NO 52
<211> LENGTH: 112
<212> TYPE: PRT
<213> ORGANISM: Homo sapiens

<400> SEQUENCE: 52

Val Ile Ala Glu Leu Pro Pro Lys Val Ser Val Phe Val Pro Pro Arg
1               5                   10                  15

Asp Gly Phe Phe Gly Asn Pro Arg Lys Ser Lys Leu Ile Cys Gln Ala
                20                  25                  30

Thr Gly Phe Ser Pro Arg Gln Ile Gln Val Ser Trp Leu Arg Glu Gly
            35                  40                  45

Lys Gln Val Gly Ser Gly Val Thr Thr Asp Gln Val Gln Ala Glu Ala
50                  55                  60

Lys Glu Ser Gly Pro Thr Thr Tyr Lys Val Thr Ser Thr Leu Thr Ile
65                  70                  75                  80

Lys Glu Ser Asp Trp Leu Ser Gln Ser Met Phe Thr Cys Arg Val Asp
                85                  90                  95

His Arg Gly Leu Thr Phe Gln Gln Asn Ala Ser Ser Met Cys Val Pro
            100                 105                 110

<210> SEQ ID NO 53
<211> LENGTH: 106
<212> TYPE: PRT
<213> ORGANISM: Homo sapiens

<400> SEQUENCE: 53

Asp Gln Asp Thr Ala Ile Arg Val Phe Ala Ile Pro Pro Ser Phe Ala
1               5                   10                  15

Ser Ile Phe Leu Thr Lys Ser Thr Lys Leu Thr Cys Leu Val Thr Asp
                20                  25                  30

Leu Thr Thr Tyr Asp Ser Val Thr Ile Ser Trp Thr Arg Gln Asn Gly
            35                  40                  45

Glu Ala Val Lys Thr His Thr Asn Ile Ser Glu Ser His Pro Asn Ala
50                  55                  60

Thr Phe Ser Ala Val Gly Glu Ala Ser Ile Cys Glu Asp Asp Trp Asn
65                  70                  75                  80

Ser Gly Glu Arg Phe Thr Cys Thr Val Thr His Thr Asp Leu Pro Ser
                85                  90                  95

Pro Leu Lys Gln Thr Ile Ser Arg Pro Lys
            100                 105

<210> SEQ ID NO 54
<211> LENGTH: 131
<212> TYPE: PRT
<213> ORGANISM: Homo sapiens
<220> FEATURE:
<221> NAME/KEY: MISC_FEATURE
<222> LOCATION: (114)..(131)
<223> OTHER INFORMATION: mu tailpiece

<400> SEQUENCE: 54

```
Gly Val Ala Leu His Arg Pro Asp Val Tyr Leu Pro Pro Ala Arg
1               5                   10                  15

Glu Gln Leu Asn Leu Arg Glu Ser Ala Thr Ile Thr Cys Leu Val Thr
                20                  25                  30

Gly Phe Ser Pro Ala Asp Val Phe Val Gln Trp Met Gln Arg Gly Gln
            35                  40                  45

Pro Leu Ser Pro Glu Lys Tyr Val Thr Ser Ala Pro Met Pro Glu Pro
        50                  55                  60

Gln Ala Pro Gly Arg Tyr Phe Ala His Ser Ile Leu Thr Val Ser Glu
65                  70                  75                  80

Glu Glu Trp Asn Thr Gly Glu Thr Tyr Thr Cys Val Val Ala His Glu
                85                  90                  95

Ala Leu Pro Asn Arg Val Thr Glu Arg Thr Val Asp Lys Ser Thr Gly
            100                 105                 110

Lys Pro Thr Leu Tyr Asn Val Ser Leu Val Met Ser Asp Thr Ala Gly
            115                 120                 125

Thr Cys Tyr
        130

<210> SEQ ID NO 55
<211> LENGTH: 159
<212> TYPE: PRT
<213> ORGANISM: Homo sapiens
<220> FEATURE:
<221> NAME/KEY: SIGNAL
<222> LOCATION: (1)..(22)

<400> SEQUENCE: 55

Met Lys Asn His Leu Leu Phe Trp Gly Val Leu Ala Val Phe Ile Lys
1               5                   10                  15

Ala Val His Val Lys Ala Gln Glu Asp Glu Arg Ile Val Leu Val Asp
                20                  25                  30

Asn Lys Cys Lys Cys Ala Arg Ile Thr Ser Arg Ile Ile Arg Ser Ser
            35                  40                  45

Glu Asp Pro Asn Glu Asp Ile Val Glu Arg Asn Ile Arg Ile Ile Val
        50                  55                  60

Pro Leu Asn Asn Arg Glu Asn Ile Ser Asp Pro Thr Ser Pro Leu Arg
65                  70                  75                  80

Thr Arg Phe Val Tyr His Leu Ser Asp Leu Cys Lys Lys Cys Asp Pro
                85                  90                  95

Thr Glu Val Glu Leu Asp Asn Gln Ile Val Thr Ala Thr Gln Ser Asn
            100                 105                 110

Ile Cys Asp Glu Asp Ser Ala Thr Glu Thr Cys Tyr Thr Tyr Asp Arg
            115                 120                 125

Asn Lys Cys Tyr Thr Ala Val Val Pro Leu Val Tyr Gly Gly Glu Thr
            130                 135                 140

Lys Met Val Glu Thr Ala Leu Thr Pro Asp Ala Cys Tyr Pro Asp
145                 150                 155
```

MULTIMERIC HYBRID Fc PROTEINS FOR REPLACEMENT OF IVIG

CROSS-REFERENCE TO RELATED APPLICATION

This application is a national stage entry of PCT/US2019/061020 filed Nov. 12, 2019, which claims the benefit of U.S. 62/767,303 filed Nov. 14, 2018, which is incorporated by reference in its entirety for all purposes.

SEQUENCE LISTING

The application includes sequences in a txt file named 557167SEQLST.TXT of 88,075 bytes created Mar. 31, 2021, which is incorporated by reference.

BACKGROUND

Intravenous immunoglobulin (IVIG), which is a pooled IgG preparation from thousands of healthy human donors, has been used as human therapeutics for treatment of immunodeficiency and immune-mediated disease (Nimmerjahn et al., Annu. Rev. Immunol. 26:513-533, 2008; Nagelkerke et al., Front. Immunol. 5: Article 674, 2015; Mitrevski et al., Front. Immunol. 6: Article 4, 2015; Seite et al., Arthritis Rheum. 67:595-603, 2015; Afonso et al., Biomolecules 6:15, 2016; Lazarus, Chapter 6 in Imbach (eds), Antibody Therapy, Springer, 2018). IVIG administered with the dosing range of 200 to 500 mg per kg of body weight provides immunodeficient patients with pathogen-specific IgG antibodies derived from the donors for protection against infectious disease. As such protective IgG antibodies are cleared eventually in the circulation, IVIG needs to be administered constantly, typically every three to four weeks, to maintain the protection in the patient.

A high-dose administration of IVIG (typically 1 to 3 g per kg of body weight) has been used as an anti-inflammatory agent for treatment of acute and chronic immune-mediated diseases such as idiopathic thrombocytopenic purpura (ITP), Kawasaki disease, Guillain-Barre syndrome and chronic inflammatory demyelinating polyneuropathy. Off-label use of IVIG for treatment of immune-mediated diseases includes systemic lupus erythematosus, multiple sclerosis and autoimmune neutropenia. The following two MOAs have been proposed and are supported by scientific observations: (i) saturation of neonatal Fc receptors and (ii) suppression of B cell functions (Nagelkerke et al., Front. Immunol. 5: Article 674, 2015; Seite et al., Arthritis Rheum. 67:595-603, 2015).

The neonatal Fc receptor (FcRn) is a heterodimer that is composed of a transmembrane α chain and β2-microglubulin (β2m). FcRn expressed in endothelial cells mediates both transcytosis of maternal IgG to the fetus and IgG homeostasis in adults. Pinocytosed IgG antibodies are captured by FcRn in acidified endosomes, rescued from degradation in lysosomes, recycled back to the cell surface, and returned to the circulation. Binding of IgG to FcRn is saturable. When the serum IgG concentration rises above the normal level, excess IgG unable to bind to FcRn gets degraded in the lysosomes (Roopenian et al., Nat. Rev. Immunol. 7:715-725, 2007; Kuo et al., J. Clin. Immunol. 30:777-789, 2010; Rath et al., Front. Immunol. 5: Article 664, 2015). IVIG administered at a high level (usually 1 to 3 gram/kg) competes for FcRn binding with pathogenic IgG antibodies present in autoimmune disease patients, which results in acceleration of clearance of such pathogenic antibodies in the circulation (Nimmerjahn et al., Annu. Rev. Immunol. 26:513-533, 2008; Seite et al., Arthritis Rheum. 67:595-603, 2015).

CD22, a member of the Siglec family of type I transmembrane proteins, binds specifically to a sialic acid attached to glycans with the affinity of 32 μM (Powell et al., J. Biol. Chem. 13:7523-7532, 1995; Fearon et al., Annu. Rev. Immunol. 18:393-442, 2000; Pillai et al., Annu. Rev. Immunol. 30:357-392, 2012; Nitschke, Glycobiol. 24:807-817, 2014). CD22 has a critical regulatory role to establish the threshold of B-cell activation. Multivalent cross-linking of CD22 induces intracellular signaling via the immunoreceptor tyrosine-based inhibition motifs (ITIMs) located in its cytoplasmic domain, which leads to functional suppression of B cells. A sialylated portion of IVIG has been shown to bind to CD22 and negatively modulate immune responses of B cells (Mitrevski et al. Int. Trends Immun. 2:67, 2014; Seite et al., Blood 116:1698-1704, 2010). The positive correlation between the level of sialylation of IVIG (or Fc proteins) and its activity of immune suppression has been reported (Schwab et al., Clin. Exp. Immunol. 178:97-99, 2014; Washburn et al., Proc. Natl. Acad. Sci. 112: E1297-E1306, 2015; Bruckner et al., Int. Immunol. 29:499-509, 2017), indicating the importance of the engagement of CD22 in the therapeutic activity of IVIG for treatment of inflammatory diseases.

Involvement of CD32B (also called Fcγ receptor IIB), a type I transmembrane protein expressed on B cells and myeloid dendritic cells, has also been implicated in the MOA of IVIG. Unlike CD64 (Fcγ receptor I), CD32A (Fcγ receptor IIA) and CD16 (Fcγ receptor III) that have immunoreceptor tyrosine-based activation motifs (ITAM) in the cytoplasmic domain, CD32B contains an ITIM motif in the cytoplasmic domain and functions as a negative regulator of immune responses. Cross-linking of CD32B induces intracellular signal transduction that leads to downregulation of antibody production in B cells. IVIG showed no therapeutic effects in mouse models of ITP, rheumatoid arthritis, and nephrotoxis nephritis when the mice used in the studies were deficient in CD32B. It is still unclear, however, if IVIG directly interacts with CD32B for immune suppression. Instead of CD32B, DC-SIGN (dendritic-cell-specific ICAM-3 grabbing nonintegrin; also known as CD209), a human ortholog of mouse SIGN-R1 (specific ICAM-3 grabbing nonintegrin-related 1), that are expressed on macrophages and dendritic cells, has been reported to be a primary action site of IVIG. Interaction of sialylated IVIG (or Fc proteins) with DC-SIGN on macrophages and dendritic cells induces expression of certain cytokines, such as IL-33, that leads to upregulation of and signaling through CD32B in antigen-presenting cells to suppress immune responses. For review, see Samuelsson et al., Science 291:484-486, 2001; Crow et al., Blood 102:558-560, 2003; Bruhns et al., Immunity 18:573-581, 2003; Akilesh et al., J. Clin. Invest. 113: 1328-1333, 2004; Zhou et al., Cell. Mol. Immunol. 4:279-283, 2006; Kaneko et al., Science 313:670-673, 2006; Kaneko et al., J. Exp. Med. 203:789-797, 2006; Anthony et al., Proc. Natl. Acad. Sci. 105:19571-19578, 2008; Anthony et al., Nature 475:110-113, 2013; Pagan et al., Cell 172:564-577, 2018.

Despite that IVIG has been used widely for treatment of immunodeficiency and various immune-mediated diseases in humans, IVIG has an intrinsic shortcoming that it is derived from human pooled blood. Although the blood source is screened for infectious disease and other conditions unsuitable for blood donation, there always remains a remote possibility that unknown infectious agents can contaminate IVIG products. In addition, batch-to-batch variation of IVIG is unavoidable. Furthermore, decrease of blood donation results in shortage of the supply of IVIG. It is therefore critical to develop a recombinant product, which is clean and supplied constantly, that functionally substitutes IVIG for treatment of the patients of immune-mediated diseases.

There have been several attempts to use a recombinant anti-FcRn monoclonal antibody to block the interaction between IgG and FcRn for enhanced catabolism and reduction of the concentration of IgG molecules in the circulation. Nixon et al. (Front. Immunol. 6: Article 176, 2015) generated a human anti-FcRn antibody that caused a prolonged reduction of IgG levels in cynomolgus monkeys. Kiessling et al. (Sci. Transl. Med. 9: eaan1208, 2017) reported the use of a humanized anti-FcRn monoclonal antibody, rozanolixizumab, as a replacement of IVIG. In both cynomolgus monkeys and humans, rozanolixizumab decreased the IgG concentration in the circulation. Severe treatment-emergent adverse events were observed in several human subjects who received 7 mg/kg of rozanolixizumab intravenously. Neither of the Kiessling and Nixon papers show the data of suppression of B cell-mediated immune responses by an anti-FcRn antibody.

As an alternative approach to block the interaction between IgG and FcRn, Patel et al. (J. Immunol. 187:1015-1022, 2011) reported that an engineered human IgG1 antibody with enhanced FcRn binding, which has substitutions of Met at 252 to Tyr, Ser at 254 to Thr, Thr at 256 to Glu, His at 433 to Lys, and Asn at 434 to Phe (MST-HN; positions are based on Eu numbering) in the Fc region, reduced the serum IgG level in mice. Ulrichts et al. (J. Clin. Invest. JCI97911, 2018) used a human IgG1-derived Fc fragment carrying the same five amino acid substitutions (MST-HN) described above (efgartigimod) as an antagonist of FcRn and showed that efgartigimod reduced IgG levels up to 50% in humans.

Czajkowsky et al. (Sci. Reports 5: 9526, 2015) reported generation of hexameric Fc fragments (Hexa-Fc), in which a leucine residue at position 309 (Eu numbering) was changed to a cysteine residue and the 18-amino acid-long p tail-piece was attached at the end of the human IgG1 Fc fragment for hexamer formation, as a possible antagonist of FcRn. However, no animal data with Hexa-Fc for modulation of serum IgG levels was shown in this paper. The authors also noted a possibility that Hexa-Fc's unique three-dimensional structure could hinder its interaction with FcRn.

Spirig et al. (J. Immunol. 200: 2542-2553, 2018) also generated hexameric IgG1 Fc fragments (Fc-µTP-L309C) by introducing a leucine-to-cysteine substitution at position 309 (Eu numbering) and the µ tail-piece at the end of the Fc region. Although Fc-µTP-L309C was effective for suppression of inflammatory arthritis and ITP in mice, it had a short serum half-life in human FcRn transgenic mice (3.1 hours) and rats (2.5 to 3 hours). In contrast, the serum half-life of human IgG in human FcRn transgenic mice was reported to be roughly 10 days (Tam et al., mAbs 5:397-405, 2013). No data of the effect of Fc-µTP-L309C on the serum IgG level nor the suppression of immune responses were reported in the Spirig paper.

U.S. Pat. No. 9,382,319 reports antibodies or Fc fusion proteins linked to a hybrid heavy chain constant region having IgG or IgA and IgM components. Antibody variable regions or a heterologous polypeptide form a binding site for a target site in a subject, and the hybrid constant region results in multimerization and activation of cells expressing the target on the surface.

SUMMARY OF THE CLAIMED INVENTION

The invention provides a hybrid Fc protein comprising in order from N- to C-terminus an IgG Fc region comprising at least a portion of a hinge region, CH2 and CH3 regions, each of which is of IgG isotype, and an IgM Fc region comprising Cµ3 and Cµ4 regions, wherein the at least a portion of a hinge region is not linked to (a) an antibody variable region, or (b) a heterologous polypeptide binding a target, wherein molecules of the hybrid Fc protein can form a duplex via interchain disulfide bonding between cysteine residues in the at least a portion of the hinge region, and the duplexes can multimerize with one another via the Cµ3 and Cµ4 regions.

Optionally, the IgG Fc region is of human IgG1, IgG2, IgG3 or IgG4 isotype and the Cµ3 and Cµ4 regions are each human Cµ3 and Cµ4 regions. Optionally, at least a portion of a hinge region is not linked to a polypeptide of over 25 amino acids. Optionally, the at least a portion of a hinge region differs from a natural human hinge region by replacement of a cysteine residue not engaged in formation of Fc duplexes in natural antibodies. Optionally, the protein consists essentially of the at least a portion of a hinge region, the CH2 and CH3 regions, and the Cµ3 and Cµ4 regions and optionally a peptide of up to 25 amino acids linked to the at least a portion of a hinge region. Optionally, the at least a portion of a hinge region comprises a peptide of Glu-Pro-Lys-Ser-Ser (SEQ ID NO:8) at its N-terminus. Optionally, the IgG Fc region and/or the IgM Fc region include one or more mutations to reduce ADCC, ADP or CDC. Optionally, the IgG Fc region includes one or more mutations to increase FcRn binding. Optionally, the IgG Fc region and/or the IgM Fc region includes one or more mutations to increase sialyation.

Optionally, positions 234 and 235 in the IgG Fc region (Eu numbering) are alanine residues (e.g., SEQ ID NO:9). Optionally, positions 433 and 435 in the IgM Fc region (Eu numbering) are alanine and serine residues, respectively (e.g., SEQ ID NO:10). Optionally, position 428 in the IgG Fc region (Eu numbering) is a leucine residue (e.g., SEQ ID NO: 13). Optionally position 241 or 243 in the IgG Fc region (Eu numbering) is an alanine residue (e.g., SEQ ID NOS:15 and 16, respectively).

Optionally, molecules of the hybrid Fc protein have formed a duplex via interchain disulfide bonding between cysteine residues in the at least a portion of the hinge region, and the duplexes have multimerized with one another via the Cµ3 and Cµ4 regions. Optionally, the multimer is a hexamer.

Optionally, the hybrid Fc protein is at least 99% w/w pure.

The invention further provides a pharmaceutical composition comprising any of the hybrid Fc proteins described above and a pharmaceutically acceptable carrier.

The invention further provides a method of treating an immune disorder comprising administering an effective regime of a hybrid Fc protein of any preceding claim to subject, in need thereof. Optionally, the hybrid Fc protein reduces the half-life of IgG molecules in the circulation. Optionally, the hybrid Fc protein reduces the concentration of IgG molecules in the circulation. Optionally, the hybrid Fc fusion protein suppresses immune responses of B cells. Optionally, the subject has an immune disorder.

The invention further provides for the use of the hybrid Fc protein of any preceding claim in the manufacture of a medicament for treating an inflammatory disorder, rejection following organ transplantation, a hematological disorder, a dermatological disorder, or a neuromuscular disorder.

The invention further provides for the use of the hybrid Fc protein of any preceding claim in the manufacture of a medicament for treating an autoimmune disorder. Optionally, the disorder is idiopathic thrombocytopenic purpura, Kawasaki disease, Guillain-Barre syndrome, or chronic inflammatory demyelinating polyneuropathy. Optionally, the disorder is systemic lupus erythematosus, multiple sclerosis, or autoimmune neutropenia.

BRIEF DESCRIPTION OF THE DRAWINGS

FIG. 9A, B: Schematic structure of the expression vectors for (A) ST6GAL1 and (B) B4GALT1.

FIGS. 10A, B, C: Sequences of (A) gamma-1 (SEQ ID NOS:29-32), gamma-2 (SEQ ID NOS:33-36), gamma-3 (SEQ ID NOS:37-40), (B) gamma-4 (SEQ ID NOS:41-44), alpha-1 (SEQ ID NOS:45-47), alpha-2 (SEQ ID NOS:48-50), and (C) mu heavy chain constant regions (SEQ ID NOS:51-54), and a J chain (SEQ ID NO:55). The 18 amino acid mu tailpiece is underlined in the Cmu sequence. The first 22 amino acids shown of the J chain are a cleaved signal peptide.

FIGS. 11A-D: FACS analysis of the binding to human and mouse FcRn: (A) Binding of Erbitux (mouse-human chimeric IgG1 antibody) to human FcRn at pH 6.0 and pH 7.5, (B) binding of LS41K-Fc.SL to human FcRn at pH 6.0 and pH 7.5, (C) binding of Erbitux to mouse FcRn at pH 6.0 and pH 7.5, and (D) binding of LS41K-Fc.SL to mouse FcRn at pH 6.0 and pH 7.5.

DEFINITIONS

Figure 1:
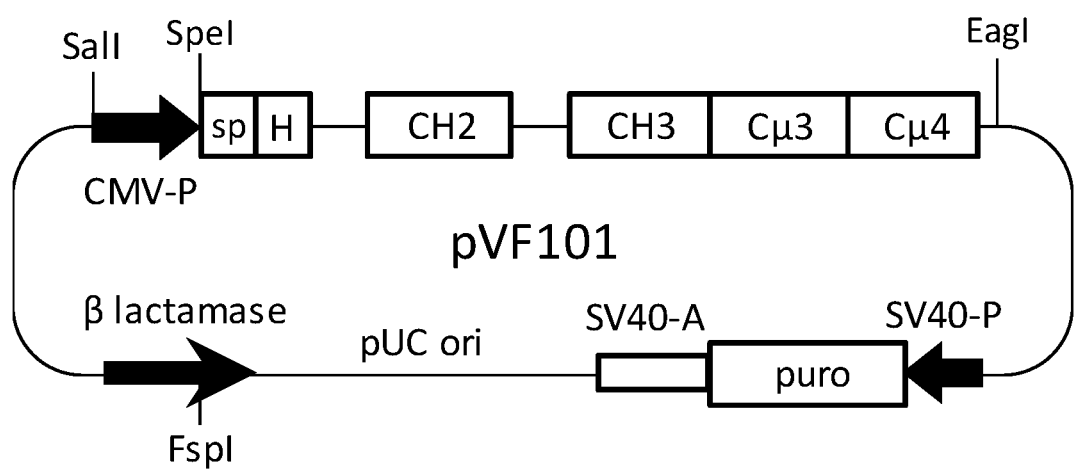
FIG. 1: Schematic structure of the expression vector pVF101.

The present hybrid Fc proteins are typically provided in isolated form. This means that the hybrid Fc proteins are typically at least 50% w/w pure of interfering proteins and other contaminants arising from its production or purification but does not exclude the possibility that the hybrid Fc protein is combined with an excess of pharmaceutical acceptable carrier(s) or other vehicle intended to facilitate its use. Sometimes hybrid Fc proteins are at least 60, 70, 80, 90, 95 or 99% w/w pure of interfering proteins and contaminants from production or purification. Often a hybrid Fc protein is the predominant macromolecular species remaining after its purification.

The hybrid Fc proteins specifically bind to FcRn. Specific binding is detectably higher in magnitude and distinguishable from non-specific binding occurring to at least one unrelated target. Specific binding can be the result of formation of bonds between particular functional groups or particular spatial fit (e.g., lock and key type) whereas nonspecific binding is usually the result of van der Waals forces. Specific binding does not however necessarily imply that the hybrid Fc proteins bind one and only one target. For example, they may also specifically bind to CD22 through sialyation.

A basic antibody structural unit is a tetramer of subunits. Each tetramer includes two identical pairs of polypeptide chains, each pair having one "light" (about 25 kDa) and one "heavy" chain (about 50-70 kDa). The amino-terminal portion of each chain includes a variable region of about 100 to 110 or more amino acids primarily responsible for antigen recognition. This variable region is initially expressed linked to a cleavable signal peptide. The variable region without the signal peptide is sometimes referred to as a mature variable region. Thus, for example, a light chain mature variable region means a light chain variable region without the light chain signal peptide. However, reference to a variable region does not mean that a signal sequence is necessarily present; and in fact signal sequences are cleaved once the antibodies or fusion proteins of the invention have been expressed and secreted. A pair of heavy and light chain variable regions defines a binding region of an antibody. The carboxy-terminal portion of the light and heavy chains respectively defines light and heavy chain constant regions. The heavy chain constant region is primarily responsible for effector function. In IgG antibodies, the heavy chain constant region is divided into CH1, hinge, CH2, and CH3 regions. In IgA, the heavy constant region is divided into CH1, CH2 and CH3. The CH1 region binds to the light chain constant region by disulfide and noncovalent bonding. The hinge region provides flexibility between the binding and effector regions of an antibody and also provides sites for intermolecular disulfide bonding between the two heavy chain constant regions in a tetramer subunit. The CH2 and CH3 regions are the primary site of effector functions and FcRn binding. In IgM antibodies, the μ heavy chain constant region (Cμ) is subdivided into four regions Cμ1, Cμ2, Cμ3 and Cμ4. The Cμ3 and Cμ4 regions, sometimes in combination with one or more J chains, provide a multimerization function in natural IgM antibodies and hybrid Fc proteins of the present invention. The mu tailpiece is a 18 amino-acid-long polypeptide located at the C-terminus of a IgM heavy chain constant region. IgM multimerizes to form a pentameric structure in the presence of J chains and a hexameric structure in their absence.

Light chains are classified as either kappa or lambda. Heavy chains are classified as gamma, mu, alpha, delta, or epsilon, and define the antibody's isotype as IgG, IgM, IgA, IgD and IgE, respectively. Within light and heavy chains, the variable and constant regions are joined by a "J" segment of about 12 or more amino acids, with the heavy chain also including a "D" segment of about 10 or more amino acids. (See generally, *Fundamental Immunology* (Paul, W., ed., 2nd ed. Raven Press, N.Y., 1989), Ch. 7) (incorporated by reference in its entirety for all purposes).

The mature variable regions of each light/heavy chain pair form the antibody binding site. Thus, an intact antibody has two binding sites, i.e., is divalent. In natural antibodies, the binding sites are the same. However, bispecific antibodies can be made in which the two binding sites are different (see, e.g., Songsivilai and Lachmann, Clin. Exp. Immunol., 79:315-321 (1990); Kostelny et al., J. Immunol., 148:1547-53 (1992)). The variable regions all exhibit the same general structure of relatively conserved framework regions (FR) joined by three hypervariable regions, also called complementarity determining regions or CDRs. The CDRs from the two chains of each pair are aligned by the framework regions, enabling binding to a specific epitope. From N-terminal to C-terminal, both light and heavy chains comprise the domains FR1, CDR1, FR2, CDR2, FR3, CDR3 and FR4. The assignment of amino acids to each domain is in accordance with the definitions of Kabat, *Sequences of Proteins of Immunological Interest* (National Institutes of Health, Bethesda, MD, 1987 and 1991), or Chothia & Lesk, *J. Mol. Biol.* 196:901-917 (1987); Chothia et al., *Nature* 342:878-883 (1989). Kabat also provides a widely used numbering convention (Kabat numbering) in which corresponding residues between different heavy chain variable regions or between different light chain variable regions are assigned the same number. Although Kabat numbering can be used for antibody constant regions, the EU index is more commonly used, as is the case in this application.

A multimerization unit of the hybrid Fc protein is typically a duplex of two such proteins linked by interchain disulfide bonding between one or more cysteines in their respective hinge regions.

Multimerization means the association of at least two multimerization units and more typically five or six such units via the Cμ portion of a hybrid constant region. Multimerization of hybrid Fc protein units may sometimes form higher or lower order structures than the pentameric or hexameric structure of normal IgM. Such is sometimes indicated by characterizing a complex formed by multimerization as having at least about five or six units.

A heterologous polypeptide in a fusion protein is a polypeptide not naturally linked to an immunoglobulin constant region. Such a polypeptide can be a full-length protein or any fragment thereof of sufficient length to retain specific binding to the antigen bound by the full-length protein. For example, a heterologous polypeptide can be a receptor extracellular domain or ligand thereto.

The term "subject" includes humans and non-human animals receiving therapeutic or prophylactic treatment. Other non-human animals include animal models of a human condition (e.g., rodent, non-human primate) and veterinary subjects.

The term "target" indicates a target molecule (e.g., protein, nucleic acid or carbohydrate) present in a subject to which a drug, such as an antibody or Fc fusion protein, can specifically bind to effect treatment or prophylaxis of a condition in the subject.

For purposes of classifying amino acids substitutions as conservative or nonconservative, amino acids are grouped as follows: Group I (hydrophobic side chains): met, ala, val, leu, ile; Group II (neutral hydrophilic side chains): cys, ser, thr; Group III (acidic side chains): asp, glu; Group IV (basic side chains): asn, gln, his, lys, arg; Group V (residues influencing chain orientation): gly, pro; and Group VI (aromatic side chains): trp, tyr, phe. Conservative substitutions involve substitutions between amino acids in the same class. Non-conservative substitutions constitute exchanging a member of one of these classes for a member of another.

Percentage sequence identities are determined with antibody sequences maximally aligned by the Kabat numbering convention for a variable region or EU numbering for a constant region. After alignment, if a subject antibody region (e.g., the entire mature variable region of a heavy or light chain) is being compared with the same region of a reference antibody, the percentage sequence identity between the subject and reference antibody regions is the number of positions occupied by the same amino acid in both the subject and reference antibody region divided by the total number of aligned positions of the two regions, with gaps not counted, multiplied by 100 to convert to percentage.

Compositions or methods "comprising" one or more recited elements may include other elements not specifically recited. For example, a composition that comprises antibody may contain the antibody alone or in combination with other ingredients.

"Consisting essentially of" is used in accordance with convention to indicate the basic and novel features of a composition or method and does not exclude that other components or steps not materially affecting the basic and novel characteristics may be present.

pH-dependent binding of an antibody to an FcRn receptor means that the antibody binds more strongly to such a receptor at pH 6.0 than at pH 7.5. Binding of FcRn at a low pH in endosomes after internalization by pinocytosis rescues IgG antibodies from catabolic degradation in lysosomes. Rescued IgG antibodies are then released from FcRn at a neutral pH and recycled to the circulation. Such pH-dependent FcRn binding is the basis of the molecular mechanism for a long serum half-life of IgG antibodies (Ghetie et al., Annu. Rev. Immunol. 18:739-766, 2000). For example, human IgG antibodies bind to human neonatal Fc receptors (FcRn) at pH 6.0 while they bind only weakly to FcRn at pH 7.5. The FcRn binding site in IgG antibodies lies at the junction of the CH2 and CH3 domains. Because a μ heavy chain does not bind to FcRn at pH 6.0 or 7.5, natural IgM cannot take advantage of the FcRn-mediated pathway to rescue antibodies from degradation in lysosomes and therefore in general have shorter half-lives than natural IgG antibodies. Some hybrid Fc proteins of the invention show little if any significant difference in binding to FcRn at pH 6.0 and 7.5, which contributes to their ability to compete with IgG for binding to FcRn.

DETAILED DESCRIPTION

I. General

The hybrid Fc proteins of this invention include IgG and IgM Fc components. The IgG Fc component includes at least a portion of a hinge region and CH2 and CH3 regions. The IgM component includes Cμ3 and Cμ4 regions of a Cμ constant region. The hybrid Fc proteins can form duplexes by interchain disulfide bonding between cysteines in their hinge regions. The duplexes can in turn multiplex through disulfide bonding of the IgM Fc portion. The IgG portion of the hybrid Fc protein like other IgG molecules has specific affinity for the FcRn receptor. However, the avidity of this binding is increased as a result of the IgM Fc mediated multimerization. Although an understanding of mechanism is not required for practice of the invention, it is believed that binding of the hybrid Fc proteins to FcRn competes with binding of endogenous IgG to FcRn thus decreasing the half-life of endogenous IgG. Reduction of the half-life of endogenous IgG is useful in treatment of immune disorders mediated by endogenous IgG, such as those previously treated with intravenous immunoglobulin. In contrast to the previously described antibodies or fusion proteins of U.S. Pat. No. 9,382,319, this mechanism of action does not require treatment be effected in a subject via target engagement by a binding region provided by antibody variable regions or a heterologous polypeptide linked to a hybrid Fc region. The above advantages can be achieved without in vitro manipulations other than those involved in making nucleic acid constructs for expression of the hybrid Fc proteins.

II. Components of Hybrid Fc Regions

The hybrid Fc proteins include an IgG Fc portion and an IgM Fc portion. The IgG Fc portion includes at least a portion of a hinge region and CH2 and CH3 regions. The CH2 and CH3 regions are responsible or at least in part for FcRn binding, protein A and G binding, ADCC (antibody-dependent cellular cytotoxicity), CDC (complement-dependent cytotoxicity) and opsonization. The role of the at least a portion of a hinge region is to supply cysteine residues to form interchain disulfide bonds duplexing IgG Fc regions. The at least a portion of a hinge region includes at least one and usually 2 or more cysteines of a natural hinge region and flanking residues sufficient to support the desired interchain disulfide bonding that forms duplexes. However, not all cysteine residues in natural hinge regions contribute to duplex formation between Fc regions, and any or all of such other cysteine residues can be removed or substituted with another residue, such as serine or alanine or glycine, to avoid the cysteine participating in unnatural disulfide bonding. Thus, part of the hinge region, usually, the N-terminal portion can be replaced with a synthetic peptide, of typically no more than 25, 20, 15, 10 or 5 residues. As well as providing cysteine residues, the hinge region including any synthetic peptide provides flexibility for duplexes and multimers to form. Gly, ala and ser are exemplary residues for this purpose. The synthetic peptide is synthetic in the sense that it does not occur as an isolated peptide in nature and has a sequence not naturally linked to the hinge or portion thereof to which it is attached, although the synthetic peptide, can as in the present examples, be a mutant version of part of a hinge region, particularly the N-terminal portion. Synthetic peptides are often overrepresented in ala, gly and/or ser (i.e., at least 25, 35 or 50% of all residues in the synthetic peptide are ala, gly and/or ser).

The Cµ portion includes Cµ3 and Cµ4 of a Cµ constant region. The Cµ portion is responsible for multimerizing multiple monovalent or divalent binding units into a multivalent complex. Although understanding of mechanism is not required for practice of the invention, it is believed that multimerization of the hybrid Fc fusion proteins occurs in similar fashion as in natural IgM antibodies through interchain disulfide bonding between the Cµ3 regions of different monomers and between the mu tailpieces of different monomers. Some multimers of IgM also contain one or more J chains bound to the mu tailpiece. In the presence of one or more J chains IgM can form a pentameric structure and in the absence of J chains can form a hexameric structure. Hexameric IgM has been reported to have stronger CDC than pentameric. Although hybrid Fc proteins of the invention are believed to form pentameric or hexameric complexes as for IgM, other multiplicities greater or smaller may form as well or instead of pentameric and hexameric forms.

The components mentioned above are arranged from N-terminus to C-terminus in the order: synthetic peptide (if present), at least a portion of an IgG hinge region, IgG CH2 region, IgG CH3 region, Cµ3 region, and Cµ4 region.

Usually, all of the IgG regions are of the same isotype and subtype. That is, all IgG regions are either from IgG1, IgG2, IgG3 or IgG4. Optionally, the IgG CH2 and CH3 regions of the hybrid Fc proteins comprise different isotypes and subtypes.

Preferably, the IgG regions are human IgG. Likewise, the Cµ3 and Cµ4 regions are preferably human. Exemplary sequences for human IgG1, IgG2, IgG3, IgG4, IgM heavy chain constant regions with delineation into components (CH1, hinge, CH2, CH3, Cµ1, Cµ2, Cµ3 and Cµ4 and a J-chain are shown in FIGS. 10 A, B, C. However, regions from other species including nonhuman primates, camelids, cartilaginous fish, mice or rats can also be used. Exemplary sequences of human IgG1 hybrid Fc proteins are SEQ ID NOS. 7, 11, 13, 15 and 16. Exemplary sequences of IgG2, IgG3 and IgG4 hybrid Fc proteins are SEQ ID NOS. 26-28 respectively.

Other components typically found in therapeutic proteins or fusion proteins may or may not be present but are not necessary. For example, the hybrid Fc proteins of the invention need not include an IgG CH1 constant region (because there is no light chain to pair with), heavy or light chain variable regions forming a binding site specifically binding to a target present in humans or other subjects, or a heterologous polypeptide, such as a receptor ECD or ligand, typically found in Fc fusion proteins, specifically binding to a target present in humans or other subjects.

Reference to a human IgG, IgA or IgM region (i.e., CH1, hinge, CH2, CH3, Cµ3 and Cµ4) or J-chain including hybrid Fc proteins of the invention refers to the exemplified sequences or allotypes or isoallotypes thereof or other variant sequence having at least 90, 95, 98 or 99% sequence identity with an exemplified sequence and/or differing from the exemplified sequence by up to 1, 2, 3, 4, 5, 10 or 15 amino acid deletions, substitution or internal insertions in the case of CH1, CH2, CH3, Cµ3 and Cµ4 and a J-chain and 1, 2 or 3 deletions, substitutions or internal substitutions for IgG1, 2 or 4 hinge regions and up to 1, 2, 3, 4, 5, or 6 deletions for IgG3 hinge. Substitutions, if present, are preferably conservative. Human constant regions show allotypic variation and isoallotypic variation between different individuals, that is, the constant regions can differ in different individuals at one or more polymorphic positions. Isoallotypes differ from allotypes in that sera recognizing an isoallotype bind to a non-polymorphic region of a one or more other isotypes. Reference to a human constant region includes a constant region with any natural allotype (including isoallotypes) or any permutation of residues occupying polymorphic positions in natural allotypes. Sequences of non-human constant regions are provided by e.g., the Swiss-Prot or Genbank databases. Reference to a non-human constant region likewise includes allotypic or isoallotypic variants, and permutations of the same, or other variants sequences differing from natural sequences. The scope of variations is defined by sequence identity and/or number of substitutions with respect to natural sequences of non-human constant regions in analogous fashion to the above description of variants with respect to human constant regions. The Eu numbering convention is used in defining corresponding positions among isotypes or different species, or defining mutated positions.

Various substitutions can be made in the IgG or IgM Fc regions or both for various purposes. For example, there are many known mutations in IgG Fc that increase FcRn binding. Exemplary substitutions include a Gln at position 250 and/or a Leu at position 428, Ser or Asn at position 434, Tyr at position 252, Thr at position 254, and Glu at position 256 (EU numbering). Increased FcRn binding is advantageous in making the hybrid Fc proteins of the present invention compete more strongly with endogenous IgG for binding to FcRn. Also numerous mutations are known in both IgG and IgM Fc for reducing any of ADCC, ADP (antibody-dependent phagocytosis) or CDC. (see, e.g., Winter et al., U.S. Pat. No. 5,624,821; Tso et al., U.S. Pat. No. 5,834,597; and Lazar et al., Proc. Natl. Acad. Sci. USA 103:4005, 2006). For example, substitution any of positions 234, 235, 236 and/or 237 reduce affinity for Fcγ receptors, particularly FcγRI receptor (see, e.g., U.S. Pat. No. 6,624,821). Optionally, positions 234, 236 and/or 237 in human IgG2 are substituted with alanine and position 235 with glutamine or glutamic acid. (See, e.g., U.S. Pat. No. 5,624,821.) Other substitutions reducing effector function include, Ala at position 268, Gly or Ala at position 297, Leu at position 309, Ala at position 322, Gly at position 327, Ser at position 330, Ser at position 331, Ser at position 238, Ala at position 268, Leu at position 309 (Eu numbering). Other substitutions in IgG or IgM Fc are advantageous in stimulating sialyation, which is useful for increasing binding to CD22. For example, each of the substitutions of Phe by Ala at position 241, Phe by Ala at position 243, Val by Glu at position 262, and Val by Glu at position 264 in the IgG Fc region (Eu numbering) is known to enhance sialylation of IgG molecules (Yu et al, J. Am. Chem. Soc. 2013 135:9723-9732). Other IgG Fc mutants that enhance sialylation of IgG molecules are reported in U.S. Pat. Nos. 9,187,552, 9,328,170 and 9,663,581.

With the possible exception of a synthetic linker replacing part or all of a hinge region and one or a few amino acid substitutions to enhance or suppress effector functions or FcRn binding as discussed further below, it is preferred that hybrid Fc proteins contain no sequences other than the hinge, CH2, CH3, Cμ3 and Cμ4 regions mentioned above. As previously mentioned, there is no need for a CH1 regions, or heavy or light chain variable regions. Nevertheless, other sequences, such as for example, a hexa-histidine tag, can be added but are not necessary. Thus, preferred hybrid Fc proteins consist of or consist essentially of a complete or partial hinge, CH2, CH3, Cμ3 and Cμ4 regions as mentioned above, optionally a further peptide, such as the synthetic peptides discussed above, of up to 5, 10, 15, 20 or 25 residues, and optionally a J-chain. Some hybrid Fc proteins consist of or consist essentially of a complete or partial hinge, optionally modified to remove one or more cysteine residues involved in light chain pairing, CH2, CH3, Cμ3 and Cμ4 regions as mentioned above. Some hybrid Fc proteins consist of or consistent essentially of entirely human IgG hinge, CH2, CH3 and Cμ3 and Cμ4 regions, and optionally a J-chain, with the possible exception of one or more mutated cysteine residues in the hinge region. Hybrid Fc proteins formed entirely or substantially from human sequences have little if any immunogenic potential in humans. Any additional sequences present preferably do not increase the immunogenicity of the hybrid Fc proteins in humans.

A standard immunoglobulin structure including two heavy chains has a maximum of four sialic residues (two per chain). The present hybrid Fc proteins can have more than 2 both because of their multiplicity (e.g., hexamers) and because Cmu3 and Cmu4 regions provide further sialic acid attachment sites. For example, the present hybrid Fc fusions can a mean of 2.1 or more sialic acid per protein molecule (e.g., 2.1-5). Thus, hexamers of present hybrid Fc molecules can have a mean of more than 12, 15 or 20 sialic acid molecules per hexamer (e.g. 12.1-30). Higher sialyation is advantageous for immune suppression via binding to CD22.

III. Genetic Engineering and Expression

Hybrid Fc proteins are produced by recombinant expression. A hybrid Fc protein is achieved by fusing a DNA segment encoding the IgG Fc portion in-frame with a DNA segment encoding the Cμ portion. Preferably, the last amino acid of a CH3 exon of the IgG is fused in frame to the first amino acid of a Cμ3 exon.

The order in which fusions of genetic elements is performed in building a construct encoding several components is not important. The segments can also be linked simultaneously by joining overlapping oligonucleotides encoding the respective segments in an overlapping PCR-type reaction. In practice, once an expression vector encoding a hybrid constant region has been produced, the same vector can be used to insert any heavy chain variable region or other binding region in the case of a fusion protein (and sometimes a light chain variable region) without recreating the DNA segment encoding the hybrid constant region.

Mammalian cells are one host for expressing nucleotide segments encoding hybrid Fc proteins of the invention (see Winnacker, From Genes to Clones, (VCH Publishers, N Y, 1987)). A number of suitable host cell lines capable of secreting intact heterologous proteins have been developed in the art, and include CHO cell lines, various COS cell lines, HeLa cells, HEK293 cells, L cells, and non-antibody-producing myelomas including Sp2/0 and NS0. Preferably, the cells are nonhuman. The cells used for producing antibodies may or may not endogenously express J chains. If endogenous J chains are not expressed or are expressed at an insufficient level, host cells can be genetically modified to express J chains (i.e., by introducing a construct encoding such). However, host cells not expressing J chains can also be used. Selection of cells with or without J chains affects valency with which antibodies or fusion proteins are produced (e.g., pentamer with J chains and hexamer without). Preferably, a hybrid Fc protein is expressed from a monoclonal cell line.

Expression vectors for these cells can include expression control sequences, such as an origin of replication, a promoter, an enhancer (Queen et al., Immunol. Rev. 89:49 (1986)), and necessary processing information sites, such as ribosome binding sites, RNA splice sites, polyadenylation sites, and transcriptional terminator sequences. Preferred expression control sequences are promoters derived from endogenous genes, cytomegalovirus, SV40, adenovirus, bovine papillomavirus, and the like. See Co et al., J. Immunol. 148:1149 (1992).

Cells are transfected with a vector encoding the hybrid Fc protein to be expressed. Hybrid Fc proteins are expressed, processed to remove signal peptides, assembled and secreted from host cells. It is believed that multimerization and association with J chains occur at least predominantly within cells so that hybrid Fc proteins are secreted primarily as multimers, particularly multimers in which five or six units are associated via the Cμ portion of the hybrid constant region.

Hybrid Fc proteins can be purified from cell culture supernatants by conventional antibody purification methods. The purification can include a chromatography step using protein A or protein G as the affinity reagent. Conventional antibody purification procedures, such as ion exchange, hydroxyapatite chromatograph or HPLC can also be used (see generally, Scopes, Protein Purification (Springer-Verlag, N.Y., 1982)).

IV. Methods of Treatment and Pharmaceutical Compositions

Hybrid Fc proteins of the invention are useful for treating a variety of conditions mediated by antibodies or B cell functions, particularly those previously treated by IVIG as indicated in the Background. Such conditions include immune disorders, inflammatory disorders, rejection following organ transplantation, hematological disorders, dermatological disorders or neuromuscular disorders. The designations of conditions are not mutually exclusive. Thus an immune disorder can also be an inflammatory disorder for example. The hybrid Fc proteins can treat such conditions by reducing half-life of endogenous IgG molecules in the circulation, suppressing immune response of endogenous B cells, reducing the concentration of endogenous IgG molecules in the circulation.

One category of immune disorders treatable by the hybrid Fc proteins of the invention is transplant rejection. When allogeneic cells or organs (e.g., skin, kidney, liver, heart, lung, pancreas and bone marrow) are transplanted into a host (i.e., the donor and donee are different individual from the same species), the host immune system is likely to mount an immune response to foreign antigens in the transplant (host-versus-graft disease) leading to destruction of the transplanted tissue. The hybrid Fc proteins of the present invention are useful, inter alia, to block alloantigen-induced immune responses in the donee.

A related use for hybrid Fc proteins of the present invention is in modulating the immune response involved in "graft versus host" disease (GVHD). GVHD is a potentially fatal disease that occurs when immunologically competent cells are transferred to an allogeneic recipient. In this situation, the donor's immunocompetent cells may attack tissues in the recipient. Tissues of the skin, gut epithelia and liver are frequent targets and may be destroyed during the course of GVHD. The disease presents an especially severe problem when immune tissue is being transplanted, such as in bone marrow transplantation; but less severe GVHD has also been reported in other cases as well, including heart and liver transplants.

A further situation in which immune suppression is desirable is in treatment of autoimmune diseases such as idiopathic thrombocytopenic purpura, Kawasaki disease, Guillain-Barre syndrome, and chronic inflammatory demyelinating systemic lupus erythematosus, multiple sclerosis, and autoimmune neutropenia type 1 diabetes, Crohn's disease, ulcerative colitis, multiple sclerosis, stiff man syndrome, rheumatoid arthritis, myasthenia gravis and lupus erythematosus. Other disorders which can be treated include acute disseminated encephalomyelitis, acute motor axonal neuropathy, Addison's disease, adiposis dolorosa, adult-onset Still's disease, alopecia areata, ankylosing spondylitis, anti-glomerular basement membrane nephritis, anti-neutrophil cytoplasmic antibody-associated vasculitis, anti-N-methyl-D-aspartate receptor encephalitis, antiphospholipid syndrome, antisynthetase syndrome, aplastic anemia, autoimmune angioedema, autoimmune encephalitis, autoimmune enteropathy, autoimmune hemolytic anemia, autoimmune hepatitis, autoimmune inner ear disease, autoimmune lymphoproliferative syndrome, autoimmune oophoritis, autoimmune orchitis, autoimmune pancreatitis, autoimmune polyendocrine syndrome, autoimmune polyendocrine syndrome type 2, autoimmune polyendocrine syndrome type 3, autoimmune progesterone dermatitis, autoimmune retinopathy, autoimmune thrombocytopenic purpura, autoimmune thyroiditis, autoimmune urticaria, autoimmune uveitis, Balo concentric sclerosis, Behçet's disease, Bickerstaffs encephalitis, bullous pemphigoid, celiac disease, chronic fatigue syndrome, Churg-Strauss syndrome, cicatricial pemphigoid, Cogan syndrome, cold agglutinin disease, complex regional pain syndrome, CREST syndrome, Crohn's disease, dermatitis herpetiformis, dermatomyositis, diabetes mellitus type 1, discoid lupus erythematosus, endometriosis, enthesitis, enthesitis-related arthritis, eosinophilic esophagitis, eosinophilic fasciitis, epidermolysis bullosa acquisita, erythema nodosum, essential mixed cryoglobulinemia, Evans syndrome, Felty syndrome, fibromyalgia, gastritis, gestational pemphigoid, giant cell arteritis, Goodpasture syndrome, Graves' disease, Graves ophthalmopathy, Hashimoto's encephalopathy, Hashimoto thyroiditis, Henoch-Schonlein purpura, hidradenitis suppurativa, idiopathic dilated cardiomyopathy, idiopathic inflammatory demyelinating diseases, IgA nephropathy, IgG4-related systemic disease, inclusion body myositis, inflammatory bowel disease (IBD), intermediate uveitis, interstitial cystitis, juvenile arthritis, Kawasaki's disease, Lambert-Eaton myasthenic syndrome, leukocytoclastic vasculitis, lichen planus, lichen sclerosus, ligneous conjunctivitis, linear IgA disease, lupus nephritis, lupus vasculitis, Lyme disease, Meniere's disease, microscopic colitis, microscopic polyangiitis, mixed connective tissue disease, Mooren's ulcer, morphea, Mucha-Habermann disease, myasthenia gravis, myocarditis, myositis, neuromyelitis optica, neuromyotonia, opsoclonus myoclonus syndrome, optic neuritis, Ord's thyroiditis, palindromic rheumatism, paraneoplastic cerebellar degeneration, Parry Romberg syndrome, Parsonage-Turner syndrome, pediatric autoimmune neuropsychiatric disorder associated with *Streptococcus*, pemphigus vulgaris, pernicious anemia, pityriasis lichenoides et varioliformis acuta, POEMS syndrome, polyarteritis nodosa, polymyalgia rheumatica, polymyositis, postmyocardial infarction syndrome, postpericardiotomy syndrome, primary biliary cirrhosis, primary immunodeficiency, primary sclerosing cholangitis, progressive inflammatory neuropathy, psoriasis, psoriatic arthritis, pure red cell aplasia, pyoderma gangrenosum, Raynaud's phenomenon, reactive arthritis, relapsing polychondritis, restless leg syndrome, retroperitoneal fibrosis, rheumatic fever, rheumatoid arthritis, rheumatoid vasculitis, sarcoidosis, Schnitzler syndrome, scleroderma, Sjogren's syndrome, stiff person syndrome, subacute bacterial endocarditis, Susac's syndrome, Sydenham chorea, sympathetic ophthalmia, systemic scleroderma, thrombocytopenia, Tolosa-Hunt syndrome, transverse myelitis, ulcerative colitis, undifferentiated connective tissue disease, urticaria, urticarial vasculitis, vasculitis, and vitiligo.

In any of these diseases, the body develops a humoral immune response against one of its own antigens leading to destruction of cells expressing that antigen, and potentially crippling and/or fatal consequences. Autoimmune diseases are treated by administering a hybrid Fc protein.

Other immune disorders treatable by hybrid Fc proteins of the invention include asthma, allergies, celiac disease, psoriasis, and uveitis. Celiac disease, psoriasis and uveitis are autoimmune diseases.

Hybrid Fc proteins are administered in an effective regime meaning a dosage, route of administration and frequency of administration that delays the onset, reduces the severity, inhibits further deterioration, and/or ameliorates at least one sign or symptom of a disorder. If a subject is already suffering from a disorder, the regime can be referred to as a therapeutically effective regime. If the subject is at elevated risk of the disorder relative to the general population but is not yet experiencing symptoms, the regime can be referred to as a prophylactically effective regime. In some instances, therapeutic or prophylactic efficacy can be observed in an individual subject relative to historical controls or past experience in the same patient. In other instances, therapeutic or prophylactic efficacy can be demonstrated in a preclinical or clinical trial in a population of treated subjects relative to a control population of untreated subjects.

Exemplary dosages for hybrid Fc proteins are 0.01-20, or 0.5-5, or 0.01-1, or 0.01-0.5 or 0.05-0.5 mg/kg body weight (e.g., 0.1, 0.5, 1, 2, 3, 4 or 5 mg/kg) or 10-1500 mg as a fixed dosage. The dosage depends on the condition of the patient and response to prior treatment, if any, whether the treatment is prophylactic or therapeutic and whether the disorder is acute or chronic, among other factors.

Administration can be parenteral, intravenous, oral, subcutaneous, intra-arterial, intracranial, intrathecal, intraperitoneal, topical, intranasal or intramuscular. Administration into the systemic circulation by intravenous or subcutaneous administration is preferred. Intravenous administration can be, for example, by infusion over a period such as 30-90 min.

The frequency of administration depends on the half-life of hybrid Fc protein in the circulation, the condition of the patient and the route of administration among other factors. The frequency can be daily, weekly, monthly, quarterly, or at irregular intervals in response to changes in the patient's condition or progression of the disorder being treated. An exemplary frequency for intravenous administration is between weekly and quarterly over a continuous cause of treatment, although more or less frequent dosing is also possible. For subcutaneous administration, an exemplary dosing frequency is daily to monthly, although more or less frequent dosing is also possible.

The number of dosages administered depends on whether the disorder is acute or chronic and the response of the disorder to the treatment. For acute disorders or acute exacerbations of chronic disorders between 1 and 10 doses are often sufficient. Sometimes a single bolus dose, optionally in divided form, is sufficient for an acute disorder or acute exacerbation of a chronic disorder. Treatment can be repeated for recurrence of an acute disorder or acute exacerbation. For chronic disorders, the hybrid Fc protein of the invention can be administered at regular intervals, e.g., weekly, fortnightly, monthly, quarterly, every six months for at least 1, 5 or 10 years, or the life of the patient.

Pharmaceutical compositions are preferably suitable for parenteral administration to humans. Such compositions are preferably sterile and substantially isotonic and manufactured under GMP conditions. Pharmaceutical compositions can be provided in unit dosage form (i.e., the dosage for a single administration). Pharmaceutical compositions can be formulated using one or more pharmaceutically acceptable carriers, diluents, excipients or auxiliaries. Pharmaceutically acceptable means suitable for parenteral administration in humans, e.g., approved or approval by the FDA. The formulation depends on the route of administration chosen. For injection, hybrid Fc proteins of the invention can be formulated in aqueous solutions, preferably in physiologically compatible buffers such as Hank's solution, Ringer's solution, or physiological saline or acetate buffer (to reduce discomfort at the site of injection). The solution can contain formulatory agents such as suspending, stabilizing and/or dispersing agents. Alternatively, hybrid Fc proteins of the invention can be in lyophilized form for constitution with a suitable vehicle, e.g., sterile pyrogen-free water, before use.

Treatment with the hybrid Fc proteins of the invention can be combined with other treatments effective against the disorder being treated. For treatment of immune disorders, conventional treatments include mast cell degranulation inhibitors, corticosteroids, nonsteroidal anti-inflammatory drugs, and stronger anti-inflammatory drugs such as azathioprine, cyclophosphamide, leukeran, FK506 and cyclosporine. Biologic anti-inflammatory agents, such as Tysabri® (natalizumab) or Humira® (adalimumab), can also be used.

All patent filings, websites, other publications, accession numbers and the like cited above or below are incorporated by reference in their entirety for all purposes to the same extent as if each individual item were specifically and individually indicated to be so incorporated by reference. If different versions of a sequence are associated with an accession number at different times, the version associated with the accession number at the effective filing date of this application is meant. The effective filing date means the earlier of the actual filing date or filing date of a priority application referring to the accession number if applicable. Likewise if different versions of a publication, website or the like are published at different times, the version most recently published at the effective filing date of the application is meant unless otherwise indicated. Any feature, step, element, embodiment, or aspect of the invention can be used in combination with any other unless specifically indicated otherwise. Although the present invention has been described in some detail by way of illustration and example for purposes of clarity and understanding, it will be apparent that certain changes and modifications may be practiced within the scope of the appended claims.

EXAMPLES

Example 1: General Methods and Materials

Manipulation of recombinant DNA and expression, purification and characterization of recombinant proteins were carried out with standard laboratory techniques such as those described by Green and Sambrook (Molecular Cloning, A Laboratory Manual, 4th ed., 2012, Cold Spring Harbor Laboratory Press, Cold Spring Harbor, NY), Greenfield (Antibodies, A Laboratory Manual, 2nd ed., 2014, Cold Spring Harbor Laboratory Press, Cold Spring Harbor, NY), Kostelny et al. (Int. J. Cancer 93:556-565, 2001), Cole et al. (J. Immunol. 159:3613-3621, 1997) and Tsurushita et al. (Methods 36:69-83, 2005).

Figure 2:
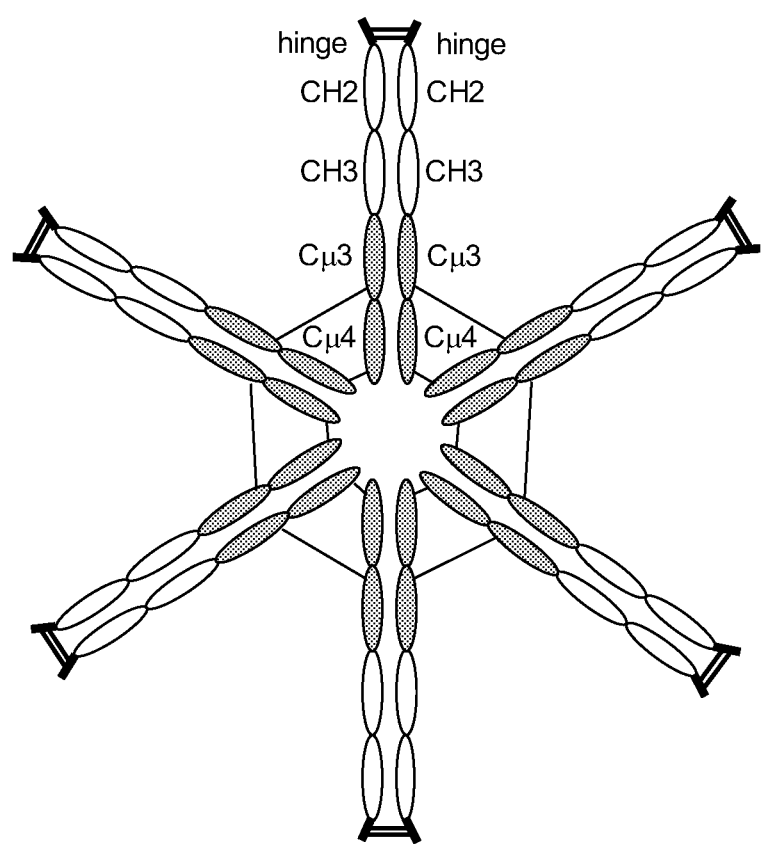
FIG. 2: Schematic structure of the hexameric hybrid Fc protein of this invention.

The mammalian expression vector pVF101 (FIG. 1), designed for production of multimeric hybrid Fc proteins comprising, from N- to C-terminus, an artificial signal peptide (sp), and the hinge, CH2 and CH3 regions of the human IgG1 isotype, and then the human Cµ3 and Cµ4 regions, contains the following genetic components. Proceeding clockwise from the SalI site of pVF101 in FIG. 1, the plasmid contains the human cytomegalovirus (CMV) major immediate early promoter and enhancer (CMV-P in the figure) to initiate transcription of the region encoding LS41A-Fc (defined hereunder). The CMV promoter is followed by an exon encoding the signal peptide (SEQ ID NO:1) fused to the hinge region (Hinge; SEQ ID NO:2), an exon encoding CH2 (SEQ ID NO: 3), an exon encoding CH3 (SEQ ID NO: 4) fused to Cµ3 (SEQ ID NO:5) and Cµ4 (SEQ ID NO:6), and the polyadenylation site with the intervening introns. The hinge (H in the figure), CH2 and CH3 regions and the polyadenylation site are derived from the human gamma-1 heavy chain gene. The transcription unit for the hybrid Fc protein is followed by the SV40 early promoter (SV40-P), the puromycin N-acetyl-transferase gene (puro) for resistance to puromycin, and a segment containing the SV40 polyadenylation site (SV40-A). Finally, pVF101 contains a part of the plasmid pUC19, comprising the bacterial origin of replication (pUC ori) and the β lactamase gene (β lactamase). Arrows in the figure indicate the orientation of transcription. The amino acid sequence of the mature hybrid Fc protein encoded in pVF101 (LS41A-Fc), which is composed of the hinge, CH2, CH3, Cμ3 and Cμ4 regions, is EPKSCDKTHTCPPCPA-PELLGGPSVFLFPPKPKDTLMISRTPEVTCVVVD-VSHEDPEV KFNWYVDGVEVHNAKTKPREEQYN-STYRVVSVLTVLHQDWLNGKEYKCKVSNKA LPA-PIEKTISKAKGQPREPQVYTLPPSRDELTKNQVSLT-CLVKGFYPSDIAVEWESNG QPENNYKTTPPVLDSD-GSFFLYSKLTVDKSRWQQGNVFSCSVMHEALHN-HYTQKSL SLSPGKDQDTAIRVFAIPPSFASIFLTKST-KLTCLVTDLTTYDSVTISWTRQNGEAVKT HTNISE-SHPNATFSAVGEASICEDDWNSGERFTCTVTHTDLPS-PLKQTISRPKGVALH RPDVYLLPPAREQLNLRE-SATITCLVTGFSPADVFVQWMQRGQPLSPEKYVT-SAPMP EPQAPGRYFAHSILTVSEEEWNTGETYTCV-VAHEALPNRVTERTVDKSTGKPTLYNV SLVMSDT-AGTCY (SEQ ID NO:7). A schematic structure of the hexameric form of disulfide-linked LS41A-Fc dimers is shown in FIG. 2.

The mammalian expression vector pVF101 was modified in the coding region of LS41A-Fc as described below to generate a new expression vector pVF102. The first five amino acid residues in the hinge region of the mature LS41A-Fc sequence were replaced with an artificial pentapeptide EPKSS (SEQ ID NO:8) in pVF102. Leucine residues at positions 234 and 235 in CH2 (Eu numbering of Kabat et al. Sequences of Proteins of Immunological Interests, Fifth edition, NIH Publication No. 91-3242, U.S. Department of Health and Human Services, 1991) were changed to alanine residues (L234A/L235A) (SEQ ID NO:9) to eliminate the potential of effector functions associated with IgG molecules (Xu et al. 2000 Cell. Immunol. 200:16-26; Hezareh et al. 2001 J. Virol. 75:12161-12168). A proline residue at position 433 and another proline residue at position 435 (Eu numbering) in Cμ3 were changed to alanine and serine residues, respectively (P433A/P435S) (SEQ ID NO:10) to eliminate the potential of the CDC activity associated with IgM molecules (Arya et al., 1994 J. Immunol. 152:1206-1212). No other changes were introduced into pVF101 for generation of pVF102. The amino acid sequence of the mature hybrid Fc protein encoded in pVF102 (LS41K-Fc.S), which is composed of the artificial pentapeptide, portion of Hinge, CH2, CH3, Cμ3 and Cμ4, is

```
                                            (SEQ ID NO: 11)
EPKSSDKTHTCPPCPAPEAAGGPSVFLFPPKPKDTLMISRTPEVTCVVVD

VSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSL

TCLVKGFYPSDIAVEWESNGQPENNYKTTPPVLDSDGSFFLYSKLTVDKS

RWQQGNVFSCSVMHEALHNHYTQKSLSLSPGKDQDTAIRVFAIPPSFASI

FLTKSTKLTCLVTDLTTYDSVTISWTRQNGEAVKTHTNISESHPNATFSA

VGEASICEDDWNSGERFTCTVTHTDLASSLKQTISRPKGVALHRPDVYLL

PPAREQLNLRESATITCLVTGFSPADVFVQWMQRGQPLSPEKYVTSAPMP

EPQAPGRYFAHSILTVSEEEWNTGETYTCVVAHEALPNRVTERTVDKSTG

KPTLYNVSLVMSDTAGTCY.
```

The mammalian expression vector pVF102 was modified by replacing a methionine residue at position 428 in CH3 with a leucine residue (Eu numbering) (SEQ ID NO:12) to generate a new expression vector pVF103. No other changes were introduced into pVF102 for generation of pVF103. The amino acid sequence of the mature hybrid Fc protein encoded in pVF103 (LS41K-Fc.SL), which is composed of the artificial pentapeptide, portion of Hinge, CH2, CH3, Cμ3 and Cμ4, is

```
                                            (SEQ ID NO: 13)
EPKSSDKTHTCPPCPAPEAAGGPSVFLFPPKPKDTLMISRTPEVTCVVVD

VSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSL

TCLVKGFYPSDIAVEWESNGQPENNYKTTPPVLDSDGSFFLYSKLTVDKS

RWQQGNVFSCSVLHEALHNHYTQKSLSLSPGKDQDTAIRVFAIPPSFASI

FLTKSTKLTCLVTDLTTYDSVTISWTRQNGEAVKTHTNISESHPNATFSA

VGEASICEDDWNSGERFTCTVTHTDLASSLKQTISRPKGVALHRPDVYLL

PPAREQLNLRESATITCLVTGFSPADVFVQWMQRGQPLSPEKYVTSAPMP

EPQAPGRYFAHSILTVSEEEWNTGETYTCVVAHEALPNRVTERTVDKSTG

KPTLYNVSLVMSDTAGTCY.
```

Concentration of LS41A-Fc, LS41K-Fc.S and LS41K-Fc.SL in culture supernatants or mouse serum was measured by sandwich ELISA. In a typical experiment, an ELISA plate was coated overnight at 4° C. with 100 μl/well of 1/2,000-diluted goat anti-human IgG Fcγ chain-specific antibody (Jackson ImmunoResearch, West Grove, PA) in PBS (phosphate-buffered saline, pH 7.4), washed with Wash Buffer (PBS containing 0.05% Tween 20), and blocked for 1 hr at room temperature with 200 μl/well of ELISA Buffer (PBS containing 2% skim milk and 0.05% Tween 20). After washing with Wash Buffer, 100 μl/well of test samples appropriately diluted in ELISA Buffer were applied to the ELISA plate. Either purified LS41A-Fc, LS41K-Fc.S or LS41K-Fc.SL was used as a standard. After incubating the ELISA plate for 1 hr at room temperature and washing with Wash Buffer, bound Fc proteins were detected using 100 μl/well of 1/2,000-diluted HRP-conjugated goat anti-human gamma chain antibody (SouthernBiotech, Birmingham, AL) in ELISA buffer. After incubating for 30 min at room temperature and washing with Wash Buffer, color development was initiated with 100 μl/well of ABTS substrate and stopped with 100 μl/well of 2% oxalic acid. Absorbance was read at 405 nm.

Concentration of mouse monoclonal anti-human CD122 IgG1/kappa antibody ABC2 (U.S. Pat. No. 9,028,830) in mouse serum was measured by sandwich ELISA as described above, except that (1) human CD122 extracellular region fused to six histidine residues generated at JN Biosciences (CD122-His; SEQ ID NO: 14) was used for coating of an ELISA plate, (2) HRP-conjugated goat anti-mouse kappa chain antibody (Bethyl Laboratories, Montgomery, TX) was used for detection of bound ABC2, and (3) ABC2 was used as a standard.

Concentration of mouse IgG in mouse serum was measured by sandwich ELISA as described above, except that (1) goat anti-mouse IgG Fcγ chain-specific antibody (Jackson ImmunoResearch) was used for coating, (2) HRP-conjugated goat anti-mouse kappa chain antibody (Bethyl Laboratories) was used for detection, and (3) ABC2 was used as a standard.

Example 2: Expression and Purification of Multimeric Hybrid Fc Proteins

The expression vectors pVF102 and pVF103 were individually introduced into the chromosomes of a Chinese hamster ovary cell line CHO-K1 to obtain cell lines stably producing LS41K-Fc.S and LS41K-Fc.SL, respectively. CHO-K1 cells were grown in SFM4CHO media (GE Healthcare, Chicago, IL) at 37° C. in a 7.5% $CO_2$ incubator. Stable transfection into CHO-K1 was carried out by electroporation. Before transfection, each expression vector was linearized using FspI. In a typical experiment, approximately $10^7$ cells were transfected with 20 μg of linearized plasmid, suspended in SFM4CHO media, and plated into several 96-well plates after appropriate dilutions of cells. After 48 hr, puromycin was added for isolation of stable transfectants. Approximately twelve days after the initiation of selection, culture supernatants of transfectants were assayed for antibody production.

Expression of LS41K-Fc.S and LS41K-Fc.SL was measured by sandwich ELISA as described above. Previously purified LS41K-Fc.S or LS41K-Fc.SL was used as a standard. CHO-K1 stable transfectants producing each of LS41K-Fc.S and LS41K-Fc.SL were expanded in SFM4CHO until the cell viability became less than 50%. After centrifugation and filtration, culture supernatants were loaded onto a Protein A column (HiTrap MABSelect SuRe, GE Healthcare). The column was washed with PBS before the hybrid Fc proteins were eluted with 0.1 M glycine-HCl (pH 3.0) containing 0.1 M NaCl. Buffer of eluted hybrid Fc proteins was neutralized with 1 M Tris-HCl (pH 8.0) and then changed to PBS by dialysis. The concentration of hybrid Fc proteins was determined by measuring absorbance at 280 nm (1 mg/ml=1 OD).

The molecular size of purified LS41K-Fc.S and LS41K-Fc.SL in the native form was analyzed by gel filtration using the AKTA Basic FPLC system with a Superose 6 10/300 GL column (GE Healthcare). PBS was used as running buffer. A single dominant peak was observed for each of purified LS41K-Fc.S and LS41K-Fc.SL. By comparison of the elution pattern with molecular size markers, the size of LS41K-Fc.S and LS41K-Fc.SL in the native form was estimated to be approximately 600 kDa, which is consistent with the size of a hexamer of the disulfide-linked hybrid Fc dimers of this invention comprising the hinge, CH2, CH3, $C\mu 3$ and $C\mu 4$ regions.

Example 3: Analysis of Pharmacokinetics (PK) and Pharmacodynamics (PD) of LS41K-Fc.S in Mice Fifty (50) μg of mouse monoclonal anti-human CD122 IgG1 antibody ABC2 in the absence and presence of 400 μg LS41K-Fc.S (Groups A and B, respectively) in 50 μl of PBS was intracardially administered into three Balb/c mice per group. Serum samples were collected from these mice at one day before administration (Day −1) and at two hours (2 HR), one day (Day 1), three days (Day 3), five days (Day 5) and eight days (Day 8) after the administration.

Figure 3:
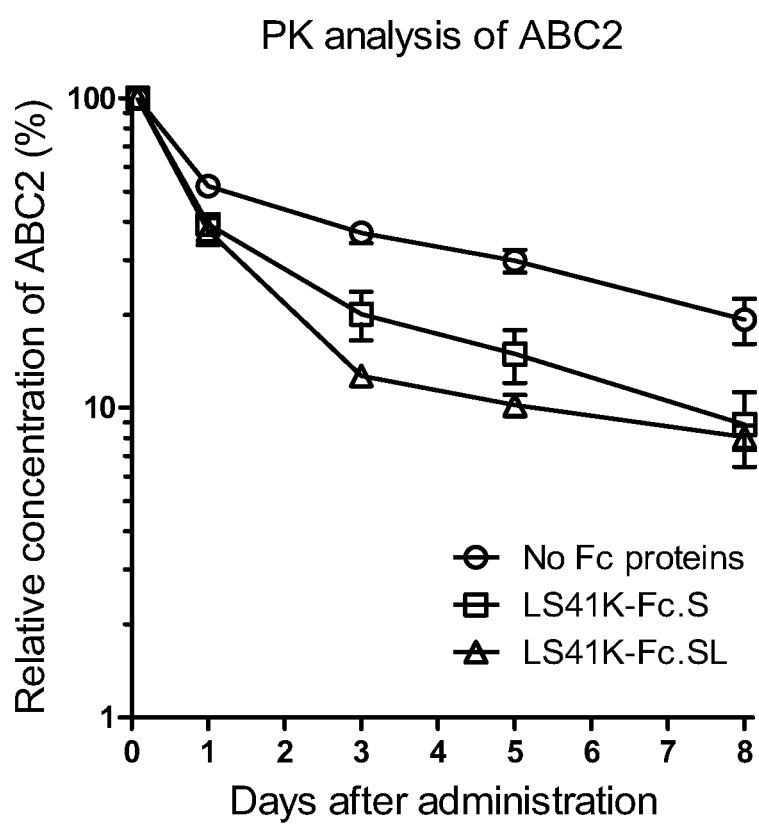
FIG. 3: Relative concentrations of mouse monoclonal IgG antibody ABC2 in mouse sera are shown with SEM (standard error of the mean) error bars. ABC2 was administered to three mice with no Fc proteins (Group A), LS41K-Fc.S (Group B), or LS41K-Fc.SL (Group C).

Concentration of ABC2 in the serum samples was measured by ELISA as described above. The ABC2 concentration at each time point (Day 1, Day 3, Day 5 and Day 8) was normalized to the concentration in the 2 HR sample for each mouse. The data are plotted in FIG. 3. The average relative concentration of ABC2 in the Group A (ABC2 alone) was 100% (2 HR), 52.0% (Day 1), 36.7% (Day 3) and 29.9% (Day 5) and 19.3% (Day 8). In contrast, the average percentage concentration of ABC2 in the Group B (ABC2 and LS41K-Fc.S) was 100% (2 HR), 39.1% (Day 1), 20.1% (Day 3), 14.9% (Day 5) and 8.8% (Day 8). Administration of LS41K-Fc.S with ABC2 more rapidly reduced the concentration of ABC2 in mouse serum than the administration of ABC2 alone. This is likely due to the high avidity of LS41K-Fc.S for binding to FcRn, which results in enhanced catabolism of ABC2 in lysosomes.

Figure 4:
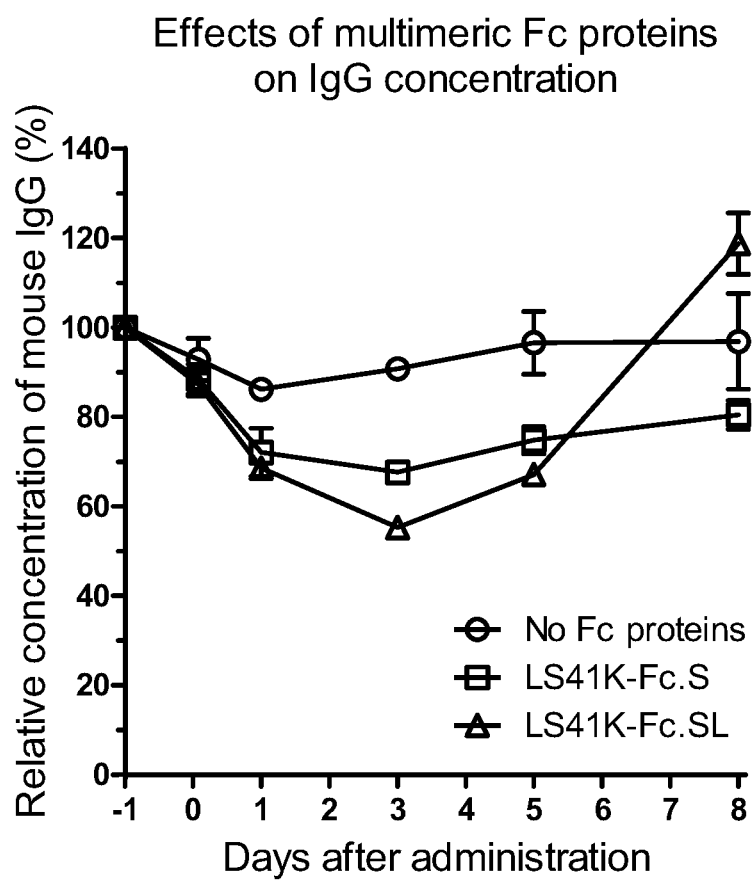
FIG. 4: Relative concentrations of mouse IgG in mouse sera from Groups A, B and C are shown with SEM error bars.

Concentration of mouse IgG in the serum samples was measured by ELISA as described above. The mouse IgG concentration at each time point (2 HR, Day 1, Day 3, Day 5 and Day 8) was normalized to the concentration in the Day −1 sample for each mouse. The data are plotted in FIG. 4. In the Group A (ABC2 alone), the average relative concentration of mouse IgG was mostly unchanged. The average mouse IgG concentration was 100% (Day −1), 92.8% (2 HR), 86.2% (Day 1), 90.7% (Day 3), 96.6% (Day 5) and 96.8% (Day 8). In contrast, the average relative IgG concentration in Group B (ABC2 and LS41K-Fc.S) dropped to two-thirds of the Day −1 level on Day 3 and returned to the 80% level on Day 8. The average relative IgG concentration was 100% (Day −1), 88.4% (2 HR), 72.1% (Day 1), 67.6% (Day 3), 74.8% (Day 5) and 80.4% (Day 8). These results indicate that LS41K-Fc.S efficiently competes against mouse IgG for binding to FcRn and blocks recycling of mouse IgG to the circulation.

Figure 5:
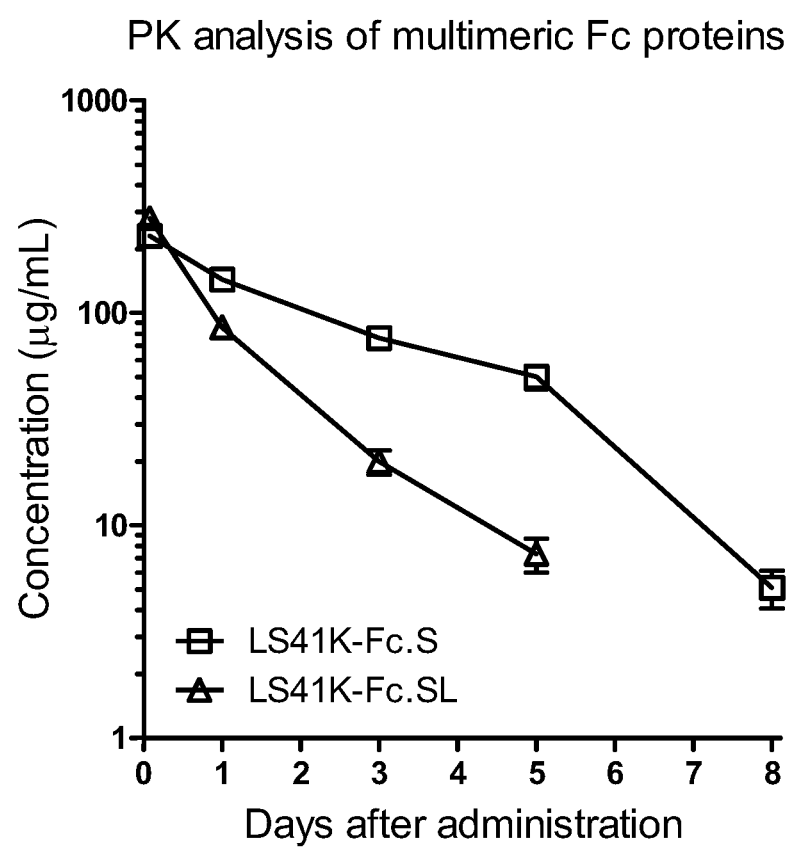
FIG. 5: Concentrations of LS41K-Fc.S and LS41K-Fc.SL in mouse sera from Groups B and C, respectively, are shown with SEM error bars.

Concentration of LS41K-Fc.S in the serum samples was measured by ELISA as described above. The data are plotted in FIG. 5. The average concentration of LS41K-Fc.S was 230 μg/ml (2 HR), 144 μg/ml (Day 1), 76.4 μg/ml (Day 3), 50.0 μg/ml (Day 5) and 5.1 μg/ml (Day 8). The sudden decrease of the concentration on Day 8 is likely due to immune reactions against the human-origin of LS41K-Fc.S in the mice. The half-life of LS41K-Fc.S in the mouse circulation calculated with Day 1, Day 3 and Day 5 samples was 62 hours.

Example 4: PK and PD Analysis of LS41K-Fc.SL in Mice

The substitution of a methionine residue at position 428 (Eu numbering) with a leucine residue (M428L) in the gamma heavy chain of human IgG is known to increase the serum half-life of such modified IgG antibodies (Hinton et al., J. Biol. Chem. 279:6213-6219, 2004; Hinton et al., J. Immunol. 176:346-356, 2006). In an attempt to increase the half-life in the circulation, a variant of LS41K-Fc.S termed LS41K-Fc.SL was generated in which a methionine residue at position 428 in CH3 was substituted by a leucine residue.

A mixture of 50 μg ABC2 and 400 μg LS41K-Fc.SL in 50 μl PBS was intracardially administered into three Balb/c mice (Group C). Serum samples were collected from these mice at one day before administration (Day −1) and at two hours (2 HR), one day (Day 1), three days (Day 3), five days (Day 5) and eight days (Day 8) after the administration. This experiment was carried out together with Group A (ABC2 alone) and Group B (ABC2 and LS41K-Fc.S) described above.

Concentration of LS41K-Fc.SL in the serum samples was measured by ELISA as described above. The average concentration of LS41K-Fc.SL was 279 μg/ml (2 HR), 86.0 μg/ml (Day 1), 20.1 μg/ml (Day 3) and 7.2 μg/ml (Day 5). The data are plotted in FIG. 5. The concentration in the Day 8 samples was below the detection limit. The LS41K-Fc.SL concentration on Day 5 was 2.6% of the concentration at 2 HR in Group C, whereas the LS41K-Fc.S concentration on Day 5 was 21.7% of the concentration at 2 HR in Group B. The half-life of LS41K-Fc.SL in the circulation calculated with Day 1, Day 3 and Day 5 was 27 hours. Despite the presence of the M428L mutation in the Fc region, LS41K-Fc.SL was more rapidly cleared from the circulation than LS41K-Fc.S.

Concentration of ABC2 in the serum samples was measured by ELISA as described above. The ABC2 concentration at each time point (Day 1, Day 3, Day 5 and Day 8) was normalized to the concentration in the 2 HR sample for each mouse. The data are plotted in FIG. 3. The average relative concentration of ABC2 in Group C (ABC2 and LS41K-Fc.SL) was 37.3% (Day 1), 12.7% (Day 3), 10.2% (Day 5) and 8.0% (Day 8). LS41K-Fc.SL reduced the concentration of ABC2 in the serum samples more drastically than LS41K-Fc.S on Days 3 and 5.

Concentration of mouse IgG in the serum samples was measured by ELISA as described above. The mouse IgG concentration at each time point (2 HR, Day 1, Day 3, Day 5 and Day 8) was normalized to the concentration in the Day −1 sample for each mouse. The data are plotted in FIG. 4. The average relative concentration of mouse IgG was 87.2% (2 HR), 68.6% (Day 1), 55.3% (Day 3), 67.1% (Day 5) and 118.8% (Day 8). The mouse IgG concentration on Day 3 reached nearly half of the predose concentration (Day −1) by LS41K-Fc.SL in Group C.

The presence of the M428L mutation in LS41K-Fc.SL resulted in a decrease, rather than an increase as anticipated, of the serum half-life when compared to its parental LS41K-Fc.S. In addition, LS41K-Fc.SL functioned more potently than LS41K-Fc.S to reduce the concentration of ABC2 and mouse IgG in the circulation.

Example 5: Dose Dependence of LS41K-Fc.SL

Fifty (50) μg of mouse monoclonal IgG1 antibody ABC2 together with either 100 μg (Group D) or 400 μg (Group E) of LS41K-Fc.SL was intracardially administered into three Balb/c mice per group. Serum samples were collected from these mice at two hours (2 HR), one day (Day 1), three days (Day 3), five days (Day 5) and eight days (Day 8) after the administration. Concentration of each of ABC2, mouse IgG and LS41K-Fc.SL in the serum samples was measured by ELISA as described above.

Figure 6:
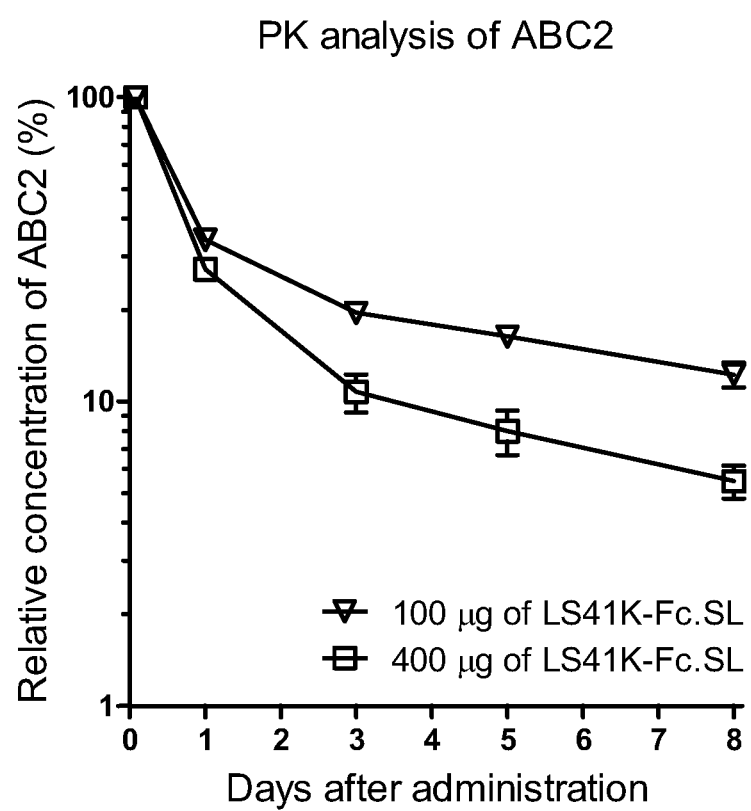
FIG. 6: Relative concentrations of ABC2 in mouse sera are shown with SEM error bars. ABC2 was administered to three mice together with 100 μg (Group D) or 400 μg of LS41K-Fc.SL (Group E).

The ABC2 concentration at each time point (Day 1, Day 3, Day 5 and Day 8) was normalized to the concentration in the 2 HR sample for each mouse. The data are plotted in FIG. 6. The average relative concentration of ABC2 with 100 μg of LS41K-Fc.SL (Group D) was 100% at 2 HR, 34.0% on Day 1, 19.6% on Day 3, 16.4% on Day 5 and 12.3% on Day 8. The average concentration of ABC2 with 400 μg of LS41K-Fc.SL (Group E) was 100% at 2 HR, 27.2% on Day 1, 10.7% on Day 3, 8.0% on Day 5, and 5.5% on Day 8. The decrease of the concentration of ABC2 in the serum samples was dependent on the dose of LS41K-Fc.SL. The administration of 400 μg of LS41K-Fc.SL (Group E) reduced the concentration of ABC2 in the circulation more rapidly than the administration of 100 μg of LS41K-Fc.SL (Group D).

Figure 7:
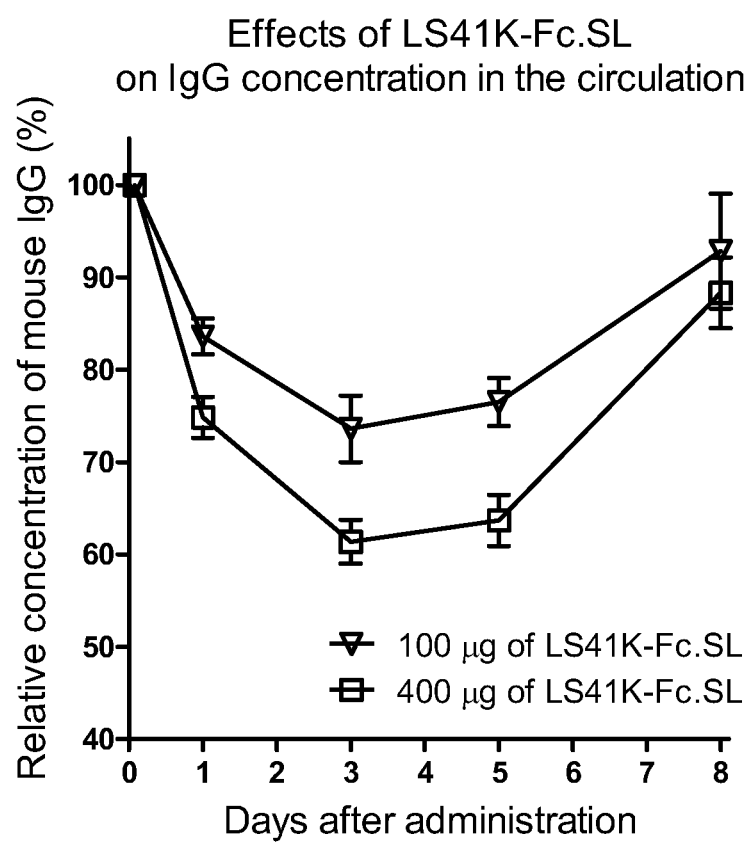
FIG. 7: Relative concentrations of mouse IgG in mouse sera from Groups D and E are shown with SEM error bars.

Concentration of mouse IgG in the serum samples was measured by ELISA as described above. The mouse IgG concentration at each time point (Day 1, Day 3, Day 5 and Day 8) was normalized to the concentration in the 2 HR sample for each mouse. The data are plotted in FIG. 7. The average relative mouse IgG concentration in Group D was 100% at 2 HR, 83.6% on Day 1, 73.6% on Day 3, 76.5% on Day 5, and 92.8% on Day 8. The average relative mouse IgG concentration in Group E was 100% at 2 HR, 74.8% on Day 1, 61.4% on Day 3, 63.6% on Day 5, and 88.3% on Day 8. The mouse IgG level decreased on Day 1 and Day 3, and started increasing gradually on Day 5 in both Groups D and E. Mouse IgG concentration was more drastically decreased in Group E (400 μg of LS41K-Fc.SL) than Group D (100 μg of LS41K-Fc.SL) on Days 1, 3 and 5.

Figure 8:
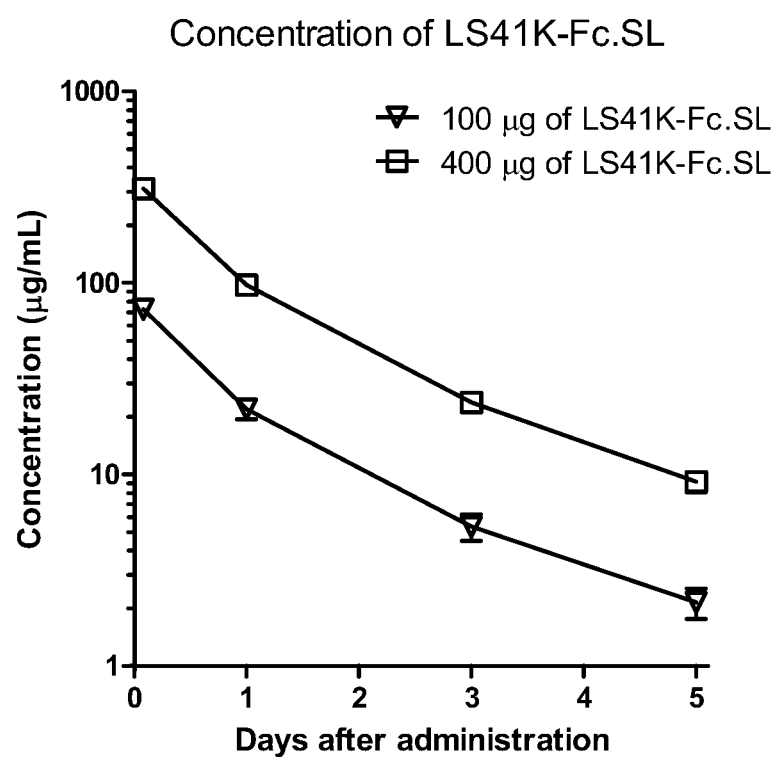
FIG. 8: Concentrations of LS41K-Fc.SL in mouse sera from Groups D and E are shown with SEM error bars.

FIG. 8 shows the concentration of LS41K-Fc.SL in the serum samples. The average LS41K-Fc.SL concentration in Group D was 72.8 μg/ml at 2 HR, 21.9 μg/ml on Day 1, 5.3 μg/ml on Day 3 and 2.1 μg/ml on Day 5. The average LS41K-Fc.SL concentration in Group E was 311.3 μg/ml at 2 HR, 97.4 μg/ml on Day 1, 23.8 μg/ml on Day 3 and 9.2 μg/ml on Day 5. The concentration of LS41K-Fc.SL on Day 8 was below the detection limit in both dosing groups. The average serum half-life of LS41K-Fc.SL calculated using the Day 1, Day 3 and Day 5 data was 28 hrs for both 100 μg and 400 μg dosing groups.

Example 6: Fc Mutations to Enhance Sialylation

An amino acid substitution of a phenylalanine residue at each of positions 241 and 243 (Eu numbering) to an alanine residue in the IgG Fc region (F241A and F243A, respectively) have been shown to enhance sialylation of N-linked glycans in IgG molecules and Fc proteins (Yu et al., J. Am. Chem. Soc. 135:9723-9732, 2013; Ahmed et al., J. Mol. Biol. 426: 3166-3179; Fiebiger et al. Proc. Natl. Acad. Sci. 112: E2385-E2394, 2015; Mimura et al., J. Immunol. Methods 428:30-36, 2016).

A variant of LS41K-Fc.SL was generated by substituting a phenylalanine residue at position 241 (Eu numbering) to an alanine residue in CH2 of the human gamma-1 chain in pVF103 to generate pVF104. The amino acid sequence of the mature hybrid Fc protein encoded in pVF104 (LS41K-Fc.SL.F241A), which is composed of the artificial pentapeptide, and a portion of Hinge, CH2, CH3, Cμ3 and Cμ4, is (SEQ ID NO: 15)
EPKSSDKTHTCPPCPAPEAAGGPSVALFPPKPKDTLMISRTPEVTCVVVD

VSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSL

TCLVKGFYPSDIAVEWESNGQPENNYKTTPPVLDSDGSFFLYSKLTVDKS

RWQQGNVFSCSVLHEALHNHYTQKSLSLSPGKDQDTAIRVFAIPPSFASI

FLTKSTKLTCLVTDLTTYDSVTISWTRQNGEAVKTHTNISESHPNATFSA

VGEASICEDDWNSGERFTCTVTHTDLASSLKQTISRPKGVALHRPDVYLL

PPAREQLNLRESATITCLVTGFSPADVFVQWMQRGQPLSPEKYVTSAPMP

EPQAPGRYFAHSILTVSEEEWNTGETYTCVVAHEALPNRVTERTVDKSTG

KPTLYNVSLVMSDTAGTCY.

Another variant of LS41K-Fc.SL was generated by substituting a phenylalanine residue at position 243 to an alanine residue in CH2 of the human gamma-1 chain in pVF103 to generate pVF105. The amino acid sequence of the mature hybrid Fc protein encoded in pVF105 (LS41K-Fc.SL.F243A), which is composed of the artificial pentapeptide, portion of Hinge, CH2, CH3, Cμ3 and Cμ4, is (SEQ ID NO: 16)
EPKSSDKTHTCPPCPAPEAAGGPSVFLAPPKPKDTLMISRTPEVTCVVVD

VSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSL

TCLVKGFYPSDIAVEWESNGQPENNYKTTPPVLDSDGSFFLYSKLTVDKS

RWQQGNVFSCSVLHEALHNHYTQKSLSLSPGKDQDTAIRVFAIPPSFASI

FLTKSTKLTCLVTDLTTYDSVTISWTRQNGEAVKTHTNISESHPNATFSA

VGEASICEDDWNSGERFTCTVTHTDLASSLKQTISRPKGVALHRPDVYLL

PPAREQLNLRESATITCLVTGFSPADVFVQWMQRGQPLSPEKYVTSAPMP

EPQAPGRYFAHSILTVSEEEWNTGETYTCVVAHEALPNRVTERTVDKSTG

KPTLYNVSLVMSDTAGTCY.

Example 7: Expression of Beta-Galactoside alpha-2,6-sialyltransferase 1 (ST6GAL1) and beta-1,4-galactosyltransferase 1 (B4GALT1)

Although IgG molecules expressed in mammalian cells are poorly sialylated (Wang et al. Biotech. Bioeng. 2018 115:1378-1393; Friedman et al. 1988 Cancer Lett. 43:79), sialylated IVIG has been reported to be responsible for anti-inflammatory activities (Anthony et al., J. Clin. Immunol. 30:9-14, 2010; Seite et al., Arthritis Rheum. 67:595-603, 2015). Terminal sialic acid can be attached to galactose in alpha-2,3-, alpha-2,6-, or alpha-2,8-linkages. CD22 and DC-SIGN binds only to alpha-2,6-linked sialic acid (Powell et al., J. Biol. Chem. 13:7523-7532, 1995; Anthony et al., Proc. Natl. Acad. Sci. 105:9571-19578, 2008). Two beta-galactoside alpha-2,6-sialyltransferases (ST6GAL1 and ST6GAL2) are responsible for attachment of alpha-2,6-linked sialic acid to a terminal galactose of N-linked carbohydrates in mammalian cells.

Raymond et al. (mAbs 7:571-583, 2015) reported that expression of recombinant ST6GAL1 in CHO-K1 cells increased the level of alpha-2,6-sialylated recombinant human IgG1 antibodies.

Coexpression of recombinant B4GALT1 (beta-1,4-galactosyltransferase 1), which catalyzes the addition of a galactose molecule to a terminal N-acetylglucosamine of the N-linked glycans, with recombinant ST6GAL1 in CHO-K1 cells further increased the level of alpha-2,6 sialylation of IgG molecules.

Genes encoding each of human ST6GAL1 and B4GALT1 were synthesized at Synbio Technologies (Monmouth Junction, NJ) as SpeI-EagI fragments. An expression vector for human ST6GAL1 (SEQ ID NO:17) (pFCm512; FIG. 9A) has the same structure as pVF101 (FIG. 1) except that (i) the SpeI-EagI fragment encoding LS41A-Fc was replaced with the synthetic gene encoding human ST6GAL1 and (ii) the puromycin N-acetyl-transferase gene (puro) was replaced with the blasticidin-S deaminase gene (Bsr in the figure). Another expression vector for human B4GALT1 (SEQ ID NO:18) (pFCm513; FIG. 9B) has the same structure as pVF101 except that (i) the SpeI-EagI fragment encoding LS41A-Fc was replaced with the synthetic gene encoding human B4GALT1 and (ii) the puromycin N-acetyl-transferase gene (puro) was replaced with the Streptoalloteichus hindustanus bleomycin resistant gene (Zeo in the figure).

Example 8: Engagement of CD22

Each of the expression vectors pVF103, pVF104 and pVF105 is transiently transfected into HEK293 cells to express LS41K-Fc.SL, LS41K-Fc.SL.F241A and LS41K-Fc.SL.F243A, respectively, by the polyethylenimine method (Durocher et al. Nucl. Acids Res. 30:e9, 2002). Each of these three expression vectors is also cotransfected with (i) pFCm512 or (ii) pFCm512 and pFCm513 into HEK293 cells.

Binding of such expressed LS41K-Fc.SL, LS41K-Fc.SL.F241A and LS41K-Fc.SL.F243A to CD22 is analyzed with human Burkitt lymphoma cell lines Ramos and Raji by flow cytometry. The activity of LS41K-Fc.SL, LS41K-Fc.SL.F241A and LS41K-Fc.SL.F243A to reduce the viability of Ramos cells via cross-linking of CD22 is analyzed by the method described by Seite et al. (Blood 116:1698-1704, 2010).

Example 9: PK and PD Analysis of LS41K-Fc.SL, LS41K-Fc.SL.F241A and LS41K-Fc.SL.F243A in Non-Human Primates Humanized anti-CD122 IgG1 antibody HuABC2 (U.S. Pat. No. 9,028,830) is intravenously administered at 5 mg/kg to a group of three cynomolgus monkeys. HuABC2 together with 20 mg/kg of either LS41K-Fc.SL, LS41K-Fc.SL.F241A or LS41K-Fc.SL.F243A is also administered intravenously to another group of three cynomolgus monkeys. Serum samples are collected from these monkeys at one day before administration (Day −1) and at two hours (2 HR), one day (Day 1), four days (Day 4), seven days (Day 7), ten days (Day 10) and fourteen days (Day 14) after the administration.

Concentration of HuABC2 in the serum samples is measured by ELISA as described above, except that (1) human CD122 extracellular region fused to six histidine residues generated at JN Biosciences (CD122-His; SEQ ID NO: 14) is used for coating of an ELISA plate, (2) HRP-conjugated goat anti-human kappa chain antibody is used for detection of bound antibodies, and (3) HuABC2 is used as a standard, to demonstrate that LS41K-Fc.SL, LS41K-Fc.SL.F241A and LS41K-Fc.SL.F243A have an ability to rapidly clear HuABC2 from the circulation of cynomolgus monkeys.

Concentration of total cynomolgus IgG in the serum samples is measured by ELISA as described above, except that (1) goat anti-cynomolgus IgG Fcγ chain-specific antibody is used for coating, (2) HRP-conjugated goat anti-cynomolgus kappa chain antibody is used for detection of bound antibodies, and (3) cynomolgus IgG is used as a standard, to demonstrate that LS41K-Fc.SL, LS41K-Fc.SL.F241A and LS41K-Fc.SL.F243A have an ability to reduce the IgG concentration in the circulation of cynomolgus monkeys.

B cells are isolated from the cynomolgus monkeys administered with LS41K-Fc.SL, LS41K-Fc.SL.F241A or LS41K-Fc.SL.F243A. For demonstration of the ability of LS41K-Fc.SL, LS41K-Fc.SL.F241A and LS41K-Fc.SL.F243A to suppress immune reactions, the activity of B cells to respond to antigens, such as endotoxin, is monitored by analyzing the production of anti-endotoxin antibodies. In addition, the immune response of B cells by conjugation of CD40 on the surface is analyzed by flow cytometry to measure the expression level of CD95 on the surface.

Example 10: Sialylation Level of LS41K-Fc.SL.F243A

CHO-K1 cells were stably transfected with pFCm512 that expresses human ST6GAL1 by electroporation as described above. CHO-K1 stable transfectants expressing ST6GAL1

(CHO-K1/ST6GAL1), which had been isolated by selection in the presence of blasticidin, were then used for stable transfection with pVF105 that expresses LS41K-Fc.SL.F243A. Puromycin-resistant CHO-K1/ST6GAL1 cells expressing LS41K-Fc.SL.F243A were expanded in SFM4CHO media as described above. LS41K-Fc.SL.F243A was purified using a protein A affinity column as described above. Purified LS41K-Fc.SL.F243A showed a single dominant peak of the expected size (approximately 600 kDa) in the gel filtration analysis with a Superose 6 column.

Sialylation of LS41K-Fc.SL.F243A purified from CHO-K1/ST6GAL1 cells was analyzed using EnzyChrom Sialic Acid Assay Kit (BioAssay Systems, Hayward, CA). Herceptin® (trastuzumab), a humanized IgG1 monoclonal antibody, was used as a reference in this assay. An average number of sialic acids attached to each LS41K-Fc.SL.F243A molecule was determined to be 21.3. An average number of sialic acids attached to each Herceptin was 0.14.

Example 11: Binding to FcRn

For expression of human FcRn on the cell surface, a new vector pFCm239 was constructed. The vector pFCm239 has the same structure as pVF101 (FIG. 1) except that (1) the Spe-EagI fragment was substituted with a DNA fragment encoding, from N-terminus to C-terminus, the signal peptide and extracellular region of human FcRn (SEQ ID NO: 19), a polypeptide linker Thr-Gly-Gly-Gly, the FLAG polypeptide (SEQ ID NO:20), a polypeptide linker Gly-Gly-Gly, and the GPI anchorage signal of human CD55 (SEQ ID NO:21) (hFcRn-FLAG-GPI; SEQ ID NO:22) and (2) the puromycin N-acetyl-transferase gene (puro) was substituted by the E. coli xanthine-guanine phosphoribosyltransferase for selection of transfectants in the presence of mycophenolic acid.

The expression vector pFCm240 has the same structure as pVF101 except that the Spe-EagI fragment was substituted with a DNA fragment encoding the entire human β2 microglobulin (SEQ ID NO:23).

The mouse myeloma cell line NS0 was maintained in DME medium containing 10% fetal bovine serum (FBS). NS0 cells were stably transfected with pFCm239 by electroporation (Bebbington et al. Bio/Technology 10:169-175, 1992), selected in DME medium containing 10% FBS, 1 µg/ml mycophenolic acid, HT media supplement (Sigma-Aldrich, St. Louis, MO) and 0.25 mg/ml xanthine, and then tested for expression of hFcRn-FLAG-GPI on the surface by flow cytometry using rat anti-FLAG peptide antibody L5 (BioLegend, San Diego, CA) and phycoerythrin-labeled goat anti-rat IgG antibody (SouthernBiotech, Birmingham, AL). NS0 cells expressing FcRn-FLAG-GPI were further stably transfected with pFCm240 by electroporation. Puromycin-resistant NS0 transfectants were tested for expression of human β2 microglobulin by flow cytometry using mouse anti-human β2 microglobulin antibody 2M2 (BioLegend) and phycoerythrin-labeled goat anti-mouse IgG antibody (SouthernBiotech). NS0 transfectant cell line expressing hFcRn-FLAG-GPI and human β2 microglobulin was named NS0/hFcRn. Human IgG antibodies bound to NS0/hFcRn at pH 6.0.

The expression vector pFCm380 has the same structure as pVF101 (FIG. 1) except that the Spe-EagI fragment was substituted with a DNA fragment encoding, from N-terminus to C-terminus, the signal peptide and extracellular region of mouse FcRn (SEQ ID NO:24), a polypeptide linker Thr-Gly-Gly-Gly, the FLAG polypeptide (SEQ ID NO:20), a polypeptide linker Gly-Gly-Gly, and the GPI anchorage signal of human CD55 (SEQ ID NO:21) (mFcRn-FLAG-GPI; SEQ ID NO:25). NS0 cells were stably transfected with pFCm380 by electroporation. Puromycin-resistant NS0 cells were tested for expression of mFcRn-FLAG-GPI on the surface by flow cytometry using rat anti-FLAG peptide antibody L5 and phycoerythrin-labeled goat anti-rat IgG antibody. NS0 transfectant cell line expressing mFcRn-FLAG-GPI associated with endogenous mouse β2 microglobulin on the surface was named NS0/mFcRn. Mouse IgG antibodies bound to NS0/mFcRn cells at pH 6.0.

Binding of Erbitux (cetuximab; mouse-human chimeric anti-EGFR IgG1 antibody) and LS41K-Fc.SL to NS0/hFcRn cells was tested in PBS with 0.5% BSA and 0.05% sodium azide at pH 7.5 (FACS Buffer (pH 7.5)) and pH 6.0 (FACS Buffer (pH 6.0). For FcRn binding, each of Erbitux and LS41K-SL was incubated at 2,000 ng/ml, 400 ng/ml and 80 ng/ml with approximately one hundred thousand NS0/hFcRn cells in 200 µl of FACS Buffer (pH7.5) or FACS Buffer (pH 6.0) for 30 min at room temperature. After washing, NS0/hFcRn cells were incubated with 1 µg/ml of phycoerythrin-labeled donkey anti-human IgG F(ab')2 antibody (Bethyl Laboratories, Montgomery, TX) for 30 min at room temperature in FACS Buffer of the same pH used at the initial binding step. Cells were washed with and suspended in FACS Buffer of the same pH used at the initial binding step, and then subjected to flow cytometry.

Erbitux showed binding to human FcRn in a dose-dependent manner at pH 6.0. The binding of Erbitux to human FcRn was severely reduced at pH 7.5 when compared to FcRn binding at pH 6.0 (FIG. 11A). This is consistent with the reported observation that the binding of human IgG antibodies to human FcRn is pH-dependent; strong binding at pH 6.0 and little binding at pH 7.5 (Hinton et al. 2006 J. Immunol. 176: 346-356). In contrast, the hybrid Fc fusion protein of this invention (LS41K-Fc.SL) bound to human FcRn in a dose-dependent manner at both pH 6.0 and 7.5 (FIG. 11B). No major difference was observed with the binding of LS41K-Fc.SL to human FcRn between pH 6.0 and pH 7.5.

Binding of Erbitux and LS41K-Fc.SL to mouse FcRn was also tested at pH 6.0 and pH 7.5 using NS0/mFcRn cells as shown above. Erbitux showed binding to mouse FcRn in a dose-dependent manner at pH 6.0 whereas its binding to mouse FcRn was nearly undetectable at pH 7.5 (FIG. 11C). LS41K-Fc.SL bound to mouse FcRn in a dose-dependent manner at both pH 6.0 and pH 7.5 (FIG. 11D). No major difference was observed with the binding of LS41K-Fc.SL to mouse FcRn between pH 6.0 and pH 7.5.

Example 12: Hybrid Fc Proteins Comprising Human IgG2, IgG3 and IgG4 Fc Regions

The coding sequences of the hinge, CH2 and CH3 regions in pVF103, which encodes LS41K-Fc.SL, are replaced by the coding sequences of the hinge, CH2 and CH3 regions of human IgG2, respectively, to construct pVF103-G2. The amino acid sequence of human IgG2-based hybrid Fc protein encoded in pVF103-G2 is (SEQ ID NO: 26)
ERKCCVECPPCPAPPVAGPSVFLFPPKPKDTLMISRTPEVTWVVVDVSHE

DPEVQFNWYVDGVEVHNAKTKPREEQFNSTFCVVSVLTVVHQDWLNGKEY

KCKVSNKGLPAPIEKTISKTKGQPREPQVYTLPPSREEMTKNQVSLTCLV

KGFYPSDIAVEWESNGQPENNYKTTPPMLDSDGSFFLYSKLTVDKSRWQQ

GNVFSCSVMHEALHNHYTQKSLSLSPGKDQDTAIRVFAIPPSFASIFLTK

STKLTCLVTDLTTYDSVTISWTRQNGEAVKTHTNISESHPNATFSAVGEA

SICEDDWNSGERFTCTVTHTDLASSLKQTISRPKGVALHRPDVYLLPPAR

EQLNLRESATITCLVTGFSPADVFVQWMQRGQPLSPEKYVTSAPMPEPQA

PGRYFAHSILTVSEEEWNTGETYTCVVAHEALPNRVTERTVDKSTGKPTL

YNVSLVMSDTAGTCY.

The coding sequences of the hinge, CH2 and CH3 regions in pVF103 are replaced by the coding sequences of the last repeat of hinge, CH2 and CH3 regions of human IgG3, respectively, to construct pVF103-G3. The amino acid sequence of human IgG3-based hybrid Fc protein encoded in pVF103-G3 is (SEQ ID NO: 27)
EPKSCDTPPPCPRCPAPELLGGPSVFLFPPKPKDTLMISRTPEVTCVVVD

VSHEDPEVQFKWYVDGVEVHNAKTKPREEQYNSTFRVVSVLTVLHQDWLN

GKEYKCKVSNKALPAPIEKTISKTKGQPREPQVYTLPPSREEMTKNQVSL

TCPVKGFYPSDIAVEWESSGQPENNYNTTPPMLDSDGSFFLYSKLTVDKS

RWQQGNIFSCSVMHEALHNRFTQKSLSLSPGKDQDTAIRVFAIPPSFASI

FLTKSTKLTCLVTDLTTYDSVTISWTRQNGEAVKTHTNISESHPNATFSA

VGEASICEDDWNSGERFTCTVTHTDLASSLKQTISRPKGVALHRPDVYLL

PPAREQLNLRESATITCLVTGFSPADVFVQWMQRGQPLSPEKYVTSAPMP

EPQAPGRYFAHSILTVSEEEWNTGETYTCVVAHEALPNRVTERTVDKSTG

KPTLYNVSLVMSDTAGTCY.

The coding sequences of the hinge, CH2 and CH3 regions in pVF103 are replaced by the coding sequences of the hinge, CH2 and CH3 regions of human IgG4, respectively, to construct pVF103-G4. The amino acid sequence of human IgG4-based hybrid Fc protein encoded in pVF103-G4 is (SEQ ID NO: 28)
ESKYGPPCPSCPAPEFLGGPSVFLFPPKPKDTLMISRTPEVTCVVVDVSQ

EDPEVQFNWYVDGVEVHNAKTKPREEQFNSTYRVVRVLTVLHQDWLNGKE

YKCKVSNKGLPSSIEKTISKAKGQPREPQVYTLPPSQEEMTKNQVSLTCL

VKGFYPSDIAVEWESNGQPEDNYKTTPPVLDSDGSFFLYSRLTVDKSRWQ

EGNVFSCSVMHEALHNHYTQKSLSLSPGKDQDTAIRVFAIPPSFASIFLT

KSTKLTCLVTDLTTYDSVTISWTRQNGEAVKTHTNISESHPNATFSAVGE

ASICEDDWNSGERFTCTVTHTDLASSLKQTISRPKGVALHRPDVYLLPPA

REQLNLRESATITCLVTGFSPADVFVQWMQRGQPLSPEKYVTSAPMPEPQ

APGRYFAHSILTVSEEEWNTGETYTCVVAHEALPNRVTERTVDKSTGKPT

LYNVSLVMSDTAGTCY.

SEQUENCE LIST

Amino acid sequence of the signal peptide used for LS41A-Fc encoded in pVF101
SEQ ID NO: 1
MGWSWIFFFLLSGTASVLS Amino acid sequence of the hinge region of human gamma-1 heavy chain encoded in pVF101
SEQ ID NO: 2
EPKSCDKTHTCPPCP Amino acid sequence of the CH2 region of human gamma-1 heavy chain encoded in pVF101
SEQ ID NO: 3
APELLGGPSVFLFPPKPKDTLMISRTPEVIC

VVVDVSHEDPEVKFNWYVDGVEVHNAKTKPR

EEQYNSTYRVVSVLTVLHQDWLNGKEYKCKV

SNKALPAPIEKTISKAK

Amino acid sequence of the CH3 region of human gamma-1 heavy chain encoded in pVF101
SEQ ID NO: 4
GQPREPQVYTLPPSRDELTKNQVSLTCLVKG

FYPSDIAVEWESNGQPENNYKTTPPVLDSDG

SFFLYSKLTVDKSRWQQGNVFSCSVMHEALH

NHYTQKSLSLSPGK

Amino acid sequence of the Cμ3 region of human mu heavy chain encoded in pVF101
SEQ ID NO: 5
DQDTAIRVFAIPPSFASIFLTKSTKLTCLVT

DLTTYDSVTISWTRQNGEAVKTHTNISESHP

NATFSAVGEASICEDDWNSGERFTCTVTHTD

LPSPLKQTISRPK

Amino acid sequence of the Cμ4 region of human mu heavy chain encoded in pVF101
SEQ ID NO: 6
GVALHRPDVYLLPPAREQLNLRESATITCLV

TGFSPADVFVQWMQRGQPLSPEKYVTSAPMP

EPQAPGRYFAHSILTVSEEEWNTGETYTCVV

AHEALPNRVTERTVDKSTGKPTLYNVSLVMS

DTAGTCY

Amino acid sequence of the mature LS41A-Fc protein encoded in pVF101
SEQ ID NO: 7
EPKSCDKTHTCPPCPAPELLGGPSVFLFPPK

PKDTLMISRTPEVTCVVVDVSHEDPEVKFNW

YVDGVEVHNAKTKPREEQYNSTYRVVSVLTV

LHQDWLNGKEYKCKVSNKALPAPIEKTISKA

KGQPREPQVYTLPPSRDELTKNQVSLTCLVK

GFYPSDIAVEWESNGQPENNYKTTPPVLDSD

GSFFLYSKLTVDKSRWQQGNVFSCSVMHEAL

HNHYTQKSLSLSPGKDQDTAIRVFAIPPSFA

SIFLTKSTKLTCLVTDLTTYDSVTISWTRQN

GEAVKTHTNISESHPNATFSAVGEASICEDD

WNSGERFTCTVTHTDLPSPLKQTISRPKGVA

LHRPDVYLLPPAREQLNLRESATITCLVTGF

SPADVFVQWMQRGQPLSPEKYVTSAPMPEPQ

APGRYFAHSILTVSEEEWNTGETYTCVVAHE

ALPNRVTERTVDKSTGKPTLYNVSLVMSDTA

GTCY

Amino acid sequence of the
pentapeptide fused to the portion
of the hinge regions encoded in
pVF102
SEQ ID NO: 8
EPKSS Amino acid sequence of the modified
CH2 region of human gamma-
1 heavy chain encoded in pVF102
SEQ ID NO: 9
APEAAGGPSVFLFPPKPKDTLMISRTPEVTC

VVVDVSHEDPEVKFNWYVDGVEVHNAKTKPR

EEQYNSTYRVVSVLTVLHQDWLNGKEYKCKV

SNKALPAPIEKTISKAK

Amino acid sequence of the Cμ3
region of human mu heavy chain
encoded in pVF102
SEQ ID NO: 10
DQDTAIRVFAIPPSFASIFLTKSTKLTCLVT

DLTTYDSVTISWTRQNGEAVKTHTNISESHP

NATFSAVGEASICEDDWNSGERFTCTVTHTD

LASSLKQTISRPK

Amino acid sequence of the mature
LS41K-Fc.S protein encoded
in pVF102
SEQ ID NO: 11
EPKSSDKTHTCPPCPAPEAAGGPSVFLFPPK

PKDTLMISRTPEVTCVVVDVSHEDPEVKFNW

YVDGVEVHNAKTKPREEQYNSTYRVVSVLTV

LHQDWLNGKEYKCKVSNKALPAPIEKTISKA

KGQPREPQVYTLPPSRDELTKNQVSLTCLVK

GFYPSDIAVEWESNGQPENNYKTTPPVLDSD

GSFFLYSKLTVDKSRWQQGNVFSCSVMHEAL

HNHYTQKSLSLSPGKDQDTAIRVFAIPPSFA

SIFLTKSTKLTCLVTDLTTYDSVTISWTRQN

GEAVKTHTNISESHPNATFSAVGEASICEDD

WNSGERFTCTVTHTDLASSLKQTISRPKGVA

LHRPDVYLLPPAREQLNLRESATITCLVTGF

SPADVFVQWMQRGQPLSPEKYVTSAPMPEPQ

APGRYFAHSILTVSEEEWNTGETYTCVVAHE

ALPNRVTERTVDKSTGKPTLYNVSLVMSDTA

GTCY

Amino acid sequence of the
modified CH3 region of human
gamma-1 heavy chain encoded
in pVF103
SEQ ID NO: 12
GQPREPQVYTLPPSRDELTKNQVSLTCLVKG

FYPSDIAVEWESNGQPENNYKTTPPVLDSDG

SFFLYSKLTVDKSRWQQGNVFSCSVLHEALH

NHYTQKSLSLSPGK

Amino acid sequence of the mature
LS41K-Fc.SL protein encoded
in pVF103
SEQ ID NO: 13
EPKSSDKTHTCPPCPAPEAAGGPSVFLFPPK

PKDTLMISRTPEVTCVVVDVSHEDPEVKFNW

YVDGVEVHNAKTKPREEQYNSTYRVVSVLTV

LHQDWLNGKEYKCKVSNKALPAPIEKTISKA

KGQPREPQVYTLPPSRDELTKNQVSLTCLVK

GFYPSDIAVEWESNGQPENNYKTTPPVLDSD

GSFFLYSKLTVDKSRWQQGNVFSCSVLHEAL

HNHYTQKSLSLSPGKDQDTAIRVFAIPPSFA

SIFLTKSTKLTCLVTDLTTYDSVTISWTRQN

GEAVKTHTNISESHPNATFSAVGEASICEDD

WNSGERFTCTVTHTDLASSLKQTISRPKGVA

LHRPDVYLLPPAREQLNLRESATITCLVTGF

SPADVFVQWMQRGQPLSPEKYVTSAPMPEPQ

APGRYFAHSILTVSEEEWNTGETYTCVVAHE

ALPNRVTERTVDKSTGKPTLYNVSLVMSDTA

GTCY

Amino acid sequence of the mature
form of the human CD122
extracellular region fused at
the C-terminus to six histidine
residues (CD122-His)
SEQ ID NO: 14
SAAVNGTSQFTCFYNSRANISCVWSQDGALQ

DTSCQVHAWPDRRRWNQICELLPVSQASWAC

NLILGAPDSQKLTTVDIVTLRVLCREGVRWR

VMAIQDFKPFENLRLMAPISLQVVHVETHRC

NISWEISQASHYFERHLEFEARTLSPGHTWE

EAPLLTLKQKQEWICLETLTPDTQYEFQVRV

KPLQGEFTTWSPWSQPLAFRTKPAALGKDTT

GGGAHHHHHH

Amino acid sequence of the mature
LS41K-Fc.SL.F241A protein
encoded in pVF104
SEQ ID NO: 15
EPKSSDKTHTCPPCPAPEAAGGPSVALFPPK

PKDTLMISRTPEVTCVVVDVSHEDPEVKFNW

YVDGVEVHNAKTKPREEQYNSTYRVVSVLTV

LHQDWLNGKEYKCKVSNKALPAPIEKTISKA

KGQPREPQVYTLPPSRDELTKNQVSLTCLVK

GFYPSDIAVEWESNGQPENNYKTTPPVLDSD

GSFFLYSKLTVDKSRWQQGNVFSCSVLHEAL

HNHYTQKSLSLSPGKDQDTAIRVFAIPPSFA

SIFLTKSTKLTCLVTDLTTYDSVTISWTRQN

GEAVKTHTNISESHPNATFSAVGEASICEDD

WNSGERFTCTVTHTDLASSLKQTISRPKGVA

LHRPDVYLLPPAREQLNLRESATITCLVTGF

SPADVFVQWMQRGQPLSPEKYVTSAPMPEPQ

APGRYFAHSILTVSEEEWNTGETYTCVVAHE

ALPNRVTERTVDKSTGKPTLYNVSLVMSDTA

GTCY

Amino acid sequence of the mature
LS41K-Fc.SL.F243A protein
encoded in pVF105
SEQ ID NO: 16
EPKSSDKTHTCPPCPAPEAAGGPSVFLAPPK

PKDTLMISRTPEVTCVVVDVSHEDPEVKFNW

YVDGVEVHNAKTKPREEQYNSTYRVVSVLTV

LHQDWLNGKEYKCKVSNKALPAPIEKTISKA

KGQPREPQVYTLPPSRDELTKNQVSLTCLVK

GFYPSDIAVEWESNGQPENNYKTTPPVLDSD

GSFFLYSKLTVDKSRWQQGNVFSCSVLHEAL

HNHYTQKSLSLSPGKDQDTAIRVFAIPPSFA

SIFLTKSTKLTCLVTDLTTYDSVTISWTRQN

GEAVKTHTNISESHPNATFSAVGEASICEDD

WNSGERFTCTVTHTDLASSLKQTISRPKGVA

LHRPDVYLLPPAREQLNLRESATITCLVTGF

SPADVFVQWMQRGQPLSPEKYVTSAPMPEPQ

APGRYFAHSILTVSEEEWNTGETYTCVVAHE

ALPNRVTERTVDKSTGKPTLYNVSLVMSDTA

GTCY

Amino acid sequence of human
beta-galactoside alpha-2,6-
sialyltransferases 1 (ST6GAL1)
encoded in pFCm512
SEQ ID NO: 17
MIHTNLKKKFSCCVLVFLLFAVICVWKEKKK

GSYYDSFKLQTKEFQVLKSLGKLAMGSDSQS

VSSSSTQDPHRGRQTLGSLRGLAKAKPEASF

QVWNKDSSSKNLIPRLQKIWKNYLSMNKYKV

SYKGPGPGIKFSAEALRCHLRDHVNVSMVEV

TDFPFNTSEWEGYLPKESIRTKAGPWGRCAV

VSSAGSLKSSQLGREIDDHDAVLRFNGAPTA

NFQQDVGTKTTIRLMNSQLVTTEKRFLKDSL

YNEGILIVWDPSVYHSDIPKWYQNPDYNFFN

NYKTYRKLHPNQPFYILKPQMPWELWDILQE

ISPEEIQPNPPSSGMLGIIIMMTLCDQVDIY

EFLPSKRKTDVCYYYQKFFDSACTMGAYHPL

LYEKNLVKHLNQGTDEDIYLLGKATLPGFRT

IHC

Amino acid sequence of human
beta-1,4-galactosyltransferase 1
(B4GALT1) encoded in pFCm513
SEQ ID NO: 18
MRLREPLLSGSAAMPGASLQRACRLLVAVCA

LHLGVTLVYYLAGRDLSRLPQLVGVSTPLQG

GSNSAAAIGQSSGELRTGGARPPPPLGASSQ

PRPGGDSSPVVDSGPGPASNLTSVPVPHTTA

LSLPACPEESPLLVGPMLIEFNMPVDLELVA

KQNPNVKMGGRYAPRDCVSPHKVAIIIPFRN

RQEHLKYWLYYLHPVLQRQQLDYGIYVINQA

GDTIFNRAKLLNVGFQEALKDYDYTCFVFSD

VDLIPMNDHNAYRCFSQPRHISVAMDKFGFS

LPYVQYFGGVSALSKQQFLTINGFPNNYWGW

GGEDDDIFNRLVFRGMSISRPNAVVGRCRMI

RHSRDKKNEPNPQRFDRIAHTKETMLSDGLN

SLTYQVLDVQRYPLYTQITVDIGTPS

Amino acid sequence of the signal
peptide and extracellular
region of human FcRn
SEQ ID NO: 19
MGVPRPQPWALGLLLFLLPGSLGAESHLSLL

YHLTAVSSPAPGTPAFWVSGWLGPQQYLSYN

SLRGEAEPCGAWVWENQVSWYWEKETTDLRI

KEKLFLEAFKALGGKGPYTLQGLLGCELGPD

NTSVPTAKFALNGEEFMNFDLKQGTWGGDWP

EALAISQRWQQQDKAANKELTFLLFSCPHRL

REHLERGRGNLEWKEPPSMRLKARPSSPGFS

VLTCSAFSYPPELQLRFLRNGLAAGTGQGD

FGPNSDGSFHASSSLTVKSGDEHHYCCIVQH

AGLAQPLRVELESPAKSS

Amino acid sequence of the
FLAG peptide
SEQ ID NO: 20
DYKDDDDK

Amino acid sequence of the GPI
anchorage signal of human CD55
SEQ ID NO: 21
PNKGSGTTSGTTRLLSGHTCFTLTGLLGTLV

TMGLLT

Amino acid sequence of
hFcRn-FLAG-GPI encoded in pFCm239
SEQ ID NO: 22
MGVPRPQPWALGLLLFLLPGSLGAESHLSLL

YHLTAVSSPAPGTPAFWVSGWLGPQQYLSYN

SLRGEAEPCGAWVWENQVSWYWEKETTDLRI

KEKLFLEAFKALGGKGPYTLQGLLGCELGPD

NTSVPTAKFALNGEEFMNFDLKQGTWGGDWP

EALAISQRWQQQDKAANKELTFLLFSCPHRL

REHLERGRGNLEWKEPPSMRLKARPSSPGFS

VLTCSAFSYPPELQLRFLRNGLAAGTGQGD

FGPNSDGSFHASSSLTVKSGDEHHYCCIVQH

AGLAQPLRVELESPAKSSTGGGDYKDDDDKG

GGPNKGSGTTSGTTRLLSGHTCFTLTGLLGT

LVTMGLLT

Amino acid sequence of human β2
microglobulin
SEQ ID NO: 23
MSRSVALAVLALLSLSGLEAIQRTPKIQVYS

RHPAENGKSNFLNCYVSGFHPSDIEVDLLKN

GERIEKVEHSDLSFSKDWSFYLLYYTEFTPT

EKDEYACRVNHVTLSQPKIVKWDRDM

Amino acid sequence of the signal
peptide and extracellular
region of mouse FcRn
SEQ ID NO: 24
MGMPLPWALSLLLVLLPQTWGSETRPPLMYH

LTAVSNPSTGLPSFWATGWLGPQQYLTYNSL

RQEADPCGAWMWENQVSWYWEKETTDLKSKE

QLFLEALKTLEKILNGTYTLQGLLGCELASD

NSSVPTAVFALNGEEFMKFNPRIGNWTGEWP

ETEIVANLWMKQPDAARKESEFLLNSCPERL

LGHLERGRRNLEWKEPPSMRLKARPGNSGSS

VLTCAAFSFYPPELKFRFLRNGLASGSGNCS

TGPNGDGSFHAWSLLEVKRGDEHHYCQVEH

EGLAQPLTVDLDSSARSS

Amino acid sequence of mFcRn-FLAG-
GPI encoded in pFCm380
SEQ ID NO: 25
MGMPLPWALSLLLVLLPQTWGSETRPPLMYH

LTAVSNPSTGLPSFWATGWLGPQQYLTYNSL

RQEADPCGAWMWENQVSWYWEKETTDLKSKE

QLFLEALKTLEKILNGTYTLQGLLGCELASD

NSSVPTAVFALNGEEFMKFNPRIGNWTGEWP

ETEIVANLWMKQPDAARKESEFLLNSCPERL

LGHLERGRRNLEWKEPPSMRLKARPGNSGSS

VLTCAAFSFYPPELKFRFLRNGLASGSGNCS

TGPNGDGSFHAWSLLEVKRGDEHHYCQVEH

EGLAQPLTVDLDSSARSSTGGGDYKDDDDKG

GGPNKGSGTTSGTTRLLSGHTCFTLTGLLGT

LVTMGLLT

Amino acid sequence of human
IgG2-based hybrid Fc protein
SEQ ID NO: 26
ERKCCVECPPCPAPPVAGPSVFLFPPKPKDT

LMISRTPEVTWVVVDVSHEDPEVQFNWYVDG

VEVHNAKTKPREEQFNSTFCVVSVLTVVHQD

WLNGKEYKCKVSNKGLPAPIEKTISKTKGQP

REPQVYTLPPSREEMTKNQVSLTCLVKGFYP

SDIAVEWESNGQPENNYKTTPPMLDSDGSFF

LYSKLTVDKSRWQQGNVFSCSVMHEALHNHY

TQKSLSLSPGKDQDTAIRVFAIPPSFASIFL

TKSTKLTCLVTDLTTYDSVTISWTRQNGEAV

KTHTNISESHPNATFSAVGEASICEDDWNSG

ERFTCTVTHTDLASSLKQTISRPKGVALHRP

DVYLLPPAREQLNLRESATITCLVTGFSPAD

VFVQWMQRGQPLSPEKYVTSAPMPEPQAPGR

YFAHSILTVSEEEWNTGETYTCVVAHEALPN

RVTERTVDKSTGKPTLYNVSLVMSDTAGTCY

Amino acid sequence of human
IgG3-based hybrid Fc protein
SEQ ID NO: 27
EPKSCDTPPPCPRCPAPELLGGPSVFLFPPK

PKDTLMISRTPEVTCVVVDVSHEDPEVQFKW

| SEQUENCE LIST |
|---|
| YVDGVEVHNAKTKPREEQYNSTFRVVSVLTV |
| LHQDWLNGKEYKCKVSNKALPAPIEKTISKT |
| KGQPREPQVYTLPPSREEMTKNQVSLTCPVK |
| GFYPSDIAVEWESSGQPENNYNTTPPMLDSD |
| GSFFLYSKLTVDKSRWQQGNIFSCSVMHEAL |
| HNRFTQKSLSLSPGKDQDTAIRVFAIPPSFA |
| SIFLTKSTKLTCLVTDLTTYDSVTISWTRQN |
| GEAVKTHTNISESHPNATFSAVGEASICEDD |
| WNSGERFTCTVTHTDLASSLKQTISRPKGVA |
| LHRPDVYLLPPAREQLNLRESATITCLVTGF |
| SPADVFVQWMQRGQPLSPEKYVTSAPMPEPQ |
| APGRYFAHSILTVSEEEWNTGETYTCVVAHE |
| ALPNRVTERTVDKSTGKPTLYNVSLVMSDTA |
| GTCY |

| SEQUENCE LIST |
|---|
| Amino acid sequence of human IgG4-based hybrid Fc protein<br>SEQ ID NO: 28 |
| ESKYGPPCPSCPAPEFLGGPSVFLFPPKPKD |
| TLMISRTPEVTCVVVDVSQEDPEVQFNWYVD |
| GVEVHNAKTKPREEQFNSTYRVVRVLTVLHQ |
| DWLNGKEYKCKVSNKGLPSSIEKTISKAKGQ |
| PREPQVYTLPPSQEEMTKNQVSLTCLVKGFY |
| PSDIAVEWESNGQPEDNYKTTPPVLDSDGSF |
| FLYSRLTVDKSRWQEGNVFSCSVMHEALHNH |
| YTQKSLSLSPGKDQDTAIRVFAIPPSFASIF |
| LTKSTKLTCLVTDLTTYDSVTISWTRQNGEA |
| VKTHTNISESHPNATFSAVGEASICEDDWNS |
| GERFTCTVTHTDLASSLKQTISRPKGVALHR |
| PDVYLLPPAREQLNLRESATITCLVTGFSPA |
| DVFVQWMQRGQPLSPEKYVTSAPMPEPQAPG |
| RYFAHSILTVSEEEWNTGETYTCVVAHEALP |
| NRVTERTVDKSTGKPTLYNVSLVMSDTAGTC |
| Y |

What is claimed is:

1. A hybrid Fc protein, the amino acid sequence of which consists essentially of any one of SEQ ID NOS: 11, 13, 15 and 16.

2. The hybrid Fc protein of claim 1, the amino acid sequence of which consists of any one of SEQ ID NOS: 11, 13, 15 and 16.

3. The hybrid Fc protein of claim 1, wherein molecules of the hybrid Fc protein have formed a duplex via interchain disulfide bonding between cysteine residues in a portion of the hinge region of SEQ ID NO: 11, 13, 15 or 16, and the duplexes have multimerized with one another via Cμ3 and Cμ4 regions of SEQ ID NOS: 11, 13, 15 or 16 to form a multimer.

4. The hybrid Fc protein of claim 3, wherein the multimer is a hexamer.

5. The hybrid Fc protein of claim 4 having more than 12 sialic acid molecules per hexamer.

6. The hybrid Fc protein of claim 1 that is at least 99% by weight pure.

7. A pharmaceutical composition comprising a hybrid Fc protein of claim 1 and a pharmaceutically acceptable carrier.

8. The hybrid Fc protein of claim 1, the amino acid sequence of which consists of SEQ ID NO:11.

9. The hybrid Fc protein of claim 1, the amino acid sequence of which consists of SEQ ID NO:13.

10. The hybrid Fc protein of claim 1, the amino acid sequence of which consists of SEQ ID NO:15.

11. The hybrid Fc protein of claim 1, the amino acid sequence of which consists of SEQ ID NO:16.

* * * * *